(12) United States Patent
Guerin et al.

(10) Patent No.: US 11,908,111 B2
(45) Date of Patent: Feb. 20, 2024

(54) IMAGE PROCESSING INCLUDING NOISE REDUCTION

(71) Applicant: GoPro, Inc., San Mateo, CA (US)

(72) Inventors: Guillaume Matthieu Guerin, Renens (CH); Bruno Faure, Fresnes (FR); Vincent Vacquerie, Longnes (FR); Bruno César Douady, Orsay (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/751,981

(22) Filed: May 24, 2022

(65) Prior Publication Data

US 2022/0284554 A1 Sep. 8, 2022

Related U.S. Application Data

(63) Continuation of application No. 16/968,707, filed as application No. PCT/US2019/017450 on Feb. 11, 2019, now Pat. No. 11,341,623.

(Continued)

(51) Int. Cl.
  *G06T 5/00* (2006.01)
  *G06T 3/40* (2006.01)
  (Continued)

(52) U.S. Cl.
  CPC ........... *G06T 5/009* (2013.01); *G06T 3/40* (2013.01); *G06T 5/002* (2013.01); *G06T 5/003* (2013.01);
  (Continued)

(58) Field of Classification Search
  CPC ........... G06T 2207/10024; G06T 5/002; G06T 2207/20208; G06T 5/003;
  (Continued)

(56) References Cited

U.S. PATENT DOCUMENTS 7,002,627 B1  2/2006  Raffy
7,369,161 B2  5/2008  Easwar
(Continued)

OTHER PUBLICATIONS

A. Boschetti, N. Adami, R. Leonardi and M. Okuda, "High Dynamic Range image tone mapping based on local Histogram Equalization," 2010 IEEE International Conference on Multimedia and Expo, Singapore, 2010, pp. 1130-1135, doi: 10.1109/ICME.2010. 5583305.*

(Continued)

*Primary Examiner* — Li Liu
(74) *Attorney, Agent, or Firm* — Young Basile Hanlon & MacFarlane, P.C.

(57) ABSTRACT

Image analysis and processing may include a first sensor readout unit receiving first Bayer format image data corresponding to a first input image, a second sensor readout unit receiving second Bayer format image data corresponding to a second input image, a first Bayer-to-RGB unit obtaining first RGB format image data based on the first Bayer format image data, a second Bayer-to-RGB unit obtaining second RGB format image data based on the second Bayer format image data, a high dynamic range unit configured obtaining high dynamic range image data based on a combination of the first RGB format image data and the second RGB format image data, an RGB-to-YUV unit obtaining YUV format image data based on the high dynamic range image data, and a three-dimensional noise reduction unit obtaining processed image data based on the YUV format image data.

16 Claims, 22 Drawing Sheets

Related U.S. Application Data

(60) Provisional application No. 62/632,815, filed on Feb. 20, 2018, provisional application No. 62/629,486, filed on Feb. 12, 2018.

(51) Int. Cl.
  *G06T 5/50* (2006.01)
  *G06T 9/00* (2006.01)
  *H04N 9/64* (2023.01)
  *H04N 23/10* (2023.01)

(52) U.S. Cl.
  CPC .................. *G06T 5/50* (2013.01); *G06T 9/00* (2013.01); *H04N 9/646* (2013.01); *H04N 23/10* (2023.01); *G06T 2207/10016* (2013.01); *G06T 2207/10024* (2013.01); *G06T 2207/20208* (2013.01)

(58) Field of Classification Search
  CPC ........... G06T 2207/10016; G06T 5/009; G06T 2207/20012; G06T 2207/10144; G06T 2207/20021; G06T 5/00; G06T 5/007; G06T 7/00; G06V 10/267; G06V 10/36; G06V 10/758; G06V 10/803; H04N 23/741; H04N 23/843; H04N 9/646
  See application file for complete search history.

(56) References Cited

U.S. PATENT DOCUMENTS

| | | | |
|---|---|---|---|
| 8,508,624 B1 * | 8/2013 | Linzer | H04N 9/646 348/241 |
| 9,160,936 B1 | 10/2015 | Rivard | |
| 9,219,870 B1 | 12/2015 | Mills | |
| 9,538,093 B2 | 1/2017 | Chen | |
| 9,560,290 B2 | 1/2017 | Jo | |
| 9,832,388 B2 | 11/2017 | Motta | |
| 10,863,105 B1 | 12/2020 | Rosengaus | |
| 11,341,623 B2 | 5/2022 | Guerin | |
| 2005/0141607 A1 * | 6/2005 | Kaplinsky | H04N 23/698 348/E7.086 |
| 2009/0310015 A1 * | 12/2009 | El-Mahdy | G09G 5/02 348/E11.007 |
| 2010/0165122 A1 | 7/2010 | Castorina | |
| 2011/0199520 A1 * | 8/2011 | Katou | H04N 25/134 348/E5.091 |
| 2013/0004071 A1 | 1/2013 | Chang | |
| 2014/0152686 A1 | 6/2014 | Narasimha | |
| 2015/0229913 A1 | 8/2015 | Bei | |
| 2016/0093029 A1 | 3/2016 | Micovic | |
| 2017/0061234 A1 | 3/2017 | Lim | |
| 2017/0061236 A1 | 3/2017 | Pope | |
| 2017/0287149 A1 | 10/2017 | Thivin | |
| 2017/0289515 A1 | 10/2017 | Li | |
| 2021/0073956 A1 | 3/2021 | Guerin | |

OTHER PUBLICATIONS

International Preliminary Report on Patentability and Written Opinion for Application No. PCT/US2019/017450, dated Aug. 27, 2020, 6 pages.

International Search Report and Written Opinion for Application No. PCT/US2019/017450, dated Jun. 13, 2019, 7 pages.

* cited by examiner

IMAGE PROCESSING INCLUDING NOISE REDUCTION

CROSS-REFERENCE TO RELATED APPLICATIONS

This application is a continuation of U.S. application Ser. No. 16/968,707, filed Aug. 10, 2020, which is a 371 of International Application No. PCT/US2019/017450 filed on Feb. 11, 2019, which claims priority to U.S. Provisional Application No. 62/629,486, filed on Feb. 12, 2018 and U.S. Provisional Patent Application No. 62/632,815, filed on Feb. 20, 2018, the entire disclosures of which are hereby incorporated by reference.

TECHNICAL FIELD

The present disclosure relates to digital image and video processing, including temporal and spatial image noise reduction, local motion compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing and encoding.

An aspect of the disclosure relates to an apparatus for image analysis and processing, including include a first sensor readout unit receiving first Bayer format image data corresponding to a first input image, a second sensor readout unit receiving second Bayer format image data corresponding to a second input image, a first Bayer-to-RGB unit obtaining first RGB format image data based on the first Bayer format image data, a second Bayer-to-RGB unit obtaining second RGB format image data based on the second Bayer format image data, a high dynamic range unit configured obtaining high dynamic range image data based on a combination of the first RGB format image data and the second RGB format image data, an RGB-to-YUV unit obtaining YUV format image data based on the high dynamic range image data, and a three-dimensional noise reduction unit obtaining processed image data based on the YUV format image data.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

All figures disclosed herein are © Copyright 2022 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image analysis unit may receive the image signal from one or more image sensors and may analyze the image signal to obtain image analysis information. An image signal processor (ISP) may receive the image signal from one or more image sensors and may process the image signal to generate one or more processed images, pictures, or frames, such as based on the image analysis information.

Figure 1:
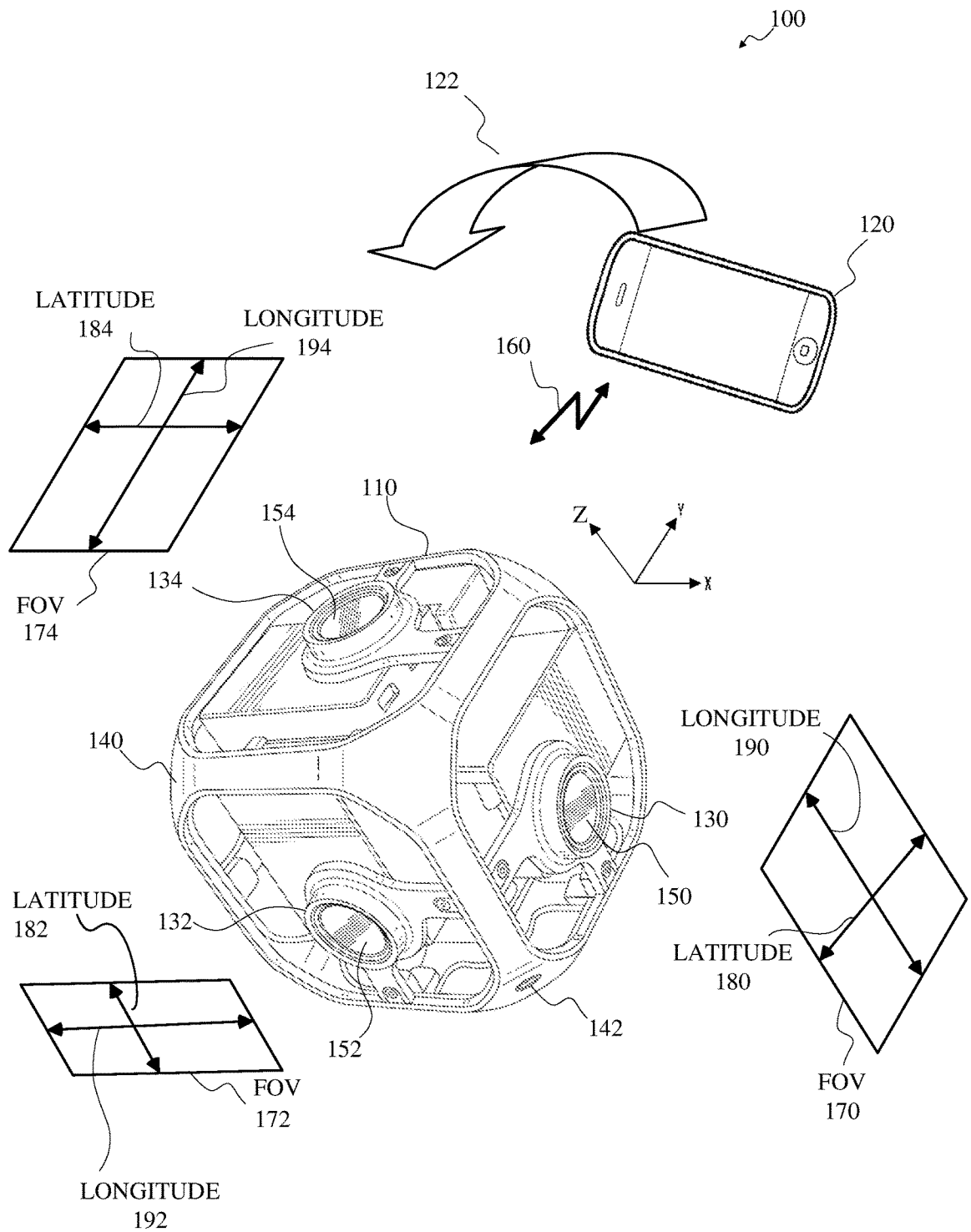
FIG. 1 is a diagram of an example of an image capture system for content capture in accordance with implementations of this disclosure.

FIG. 1 is a diagram of an example of an image capture system 100 for content capture in accordance with implementations of this disclosure. The image capture system 100 shown in FIG. 1 includes an image capture apparatus 110 and an external user interface (UI) device 120. Other configurations of the image capture system 100 may be used. For example, the external user interface device 120 may be omitted.

The image capture apparatus 110 shown in FIG. 1 is a multi-face apparatus, which includes multiple image capture devices 130, 132, 134, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

The structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

Each respective image capture device 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

An image capture device 130, 132, 134 may include a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

The user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

The image capture apparatus 110 may transmit images, such as panoramic images, or portions thereof, to the user interface device 120 via the computing communication link 160, and the user interface device 120 may store, process, display, or a combination thereof the panoramic images.

The user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

The user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

The image capture apparatus 110 may communicate with one or more other external devices (not shown) via wired or wireless computing communication links (not shown).

Data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

The user interface device 120 may implement or execute one or more applications, such as GoPro Studio, the GoPro App, or both, to manage or control the image capture apparatus 110. For example, the user interface device 120 may include an application for controlling camera configuration, video acquisition, video display, or any other configurable or controllable aspect of the image capture apparatus 110.

The user interface device 120, such as via an application, such as the GoPro App, may generate and share, such as via a cloud-based or social media service, one or more images, or short video clips, such as in response to user input.

The user interface device 120, such as via an application, such as the GoPro App, may remotely control the image capture apparatus 110, such as in response to user input.

The user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

The user interface device 120, such as via an application, such as the GoPro App, may mark one or more key moments contemporaneously with capturing the images or video by the image capture apparatus 110, such as with a HiLight Tag, such as in response to user input.

The user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

The user interface device 120, such as via an application, such as the GoPro App, may wirelessly control camera software, hardware, or both. For example, the user interface device 120 may include a web-based graphical interface accessible by a user for selecting a live or previously recorded video stream from the image capture apparatus 110 for display on the user interface device 120.

The user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
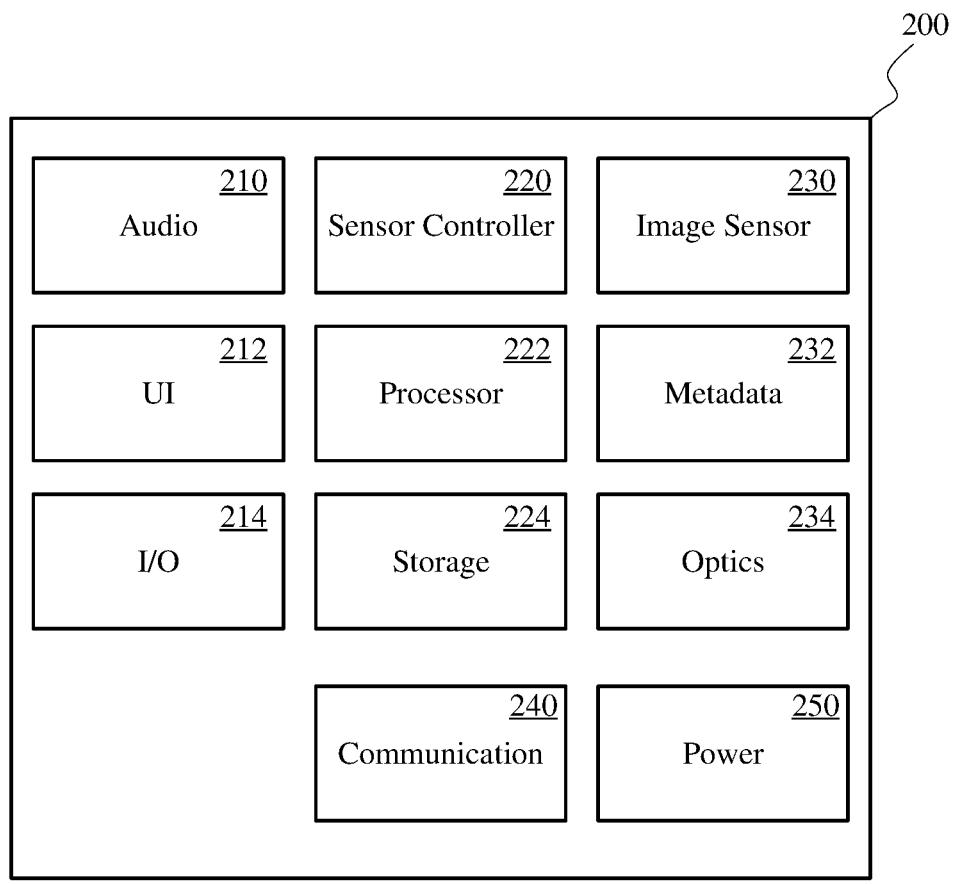
FIG. 2 is a block diagram of an example of an image capture device in accordance with implementations of this disclosure.

FIG. 2 is a block diagram of an example of an image capture device 200 in accordance with implementations of this disclosure. The image capture device 200, which may be one of the image capture devices 130, 132, 134 shown in FIG. 1, such as an action camera, shown in FIG. 2 includes an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, and a power system 250. Other configurations of the image capture device 200 may be used. For example, the user interface unit 212 may be omitted.

The audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

The user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

The user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

The user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

The I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

The I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

The sensor controller 220 may operate or control the image sensor 230, such as in response to input, such as user input. In some implementations, the sensor controller 220 may receive image and/or video input from the image sensor 230 and may receive audio information from the audio component 210.

The processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

The sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

The sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

The electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

The electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

The image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

The image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

The metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

The metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

The optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

The communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

The one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
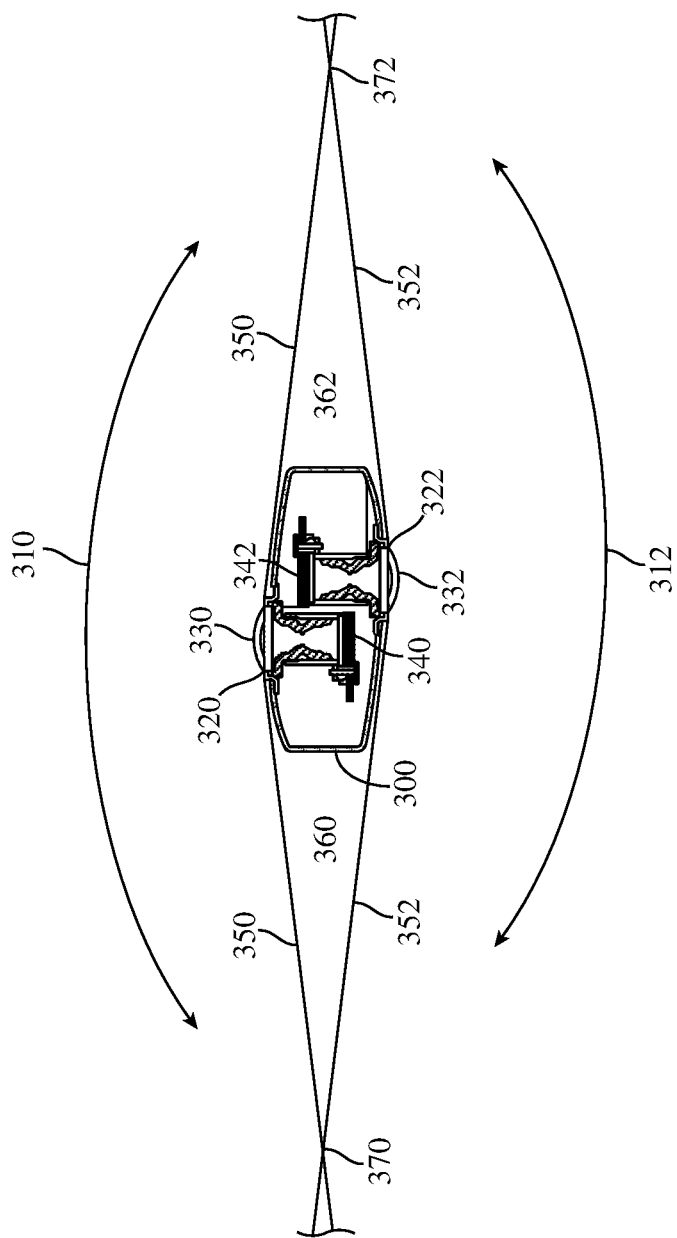
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

One or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

The fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

Images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

A small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

Incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

Optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

The lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

Images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
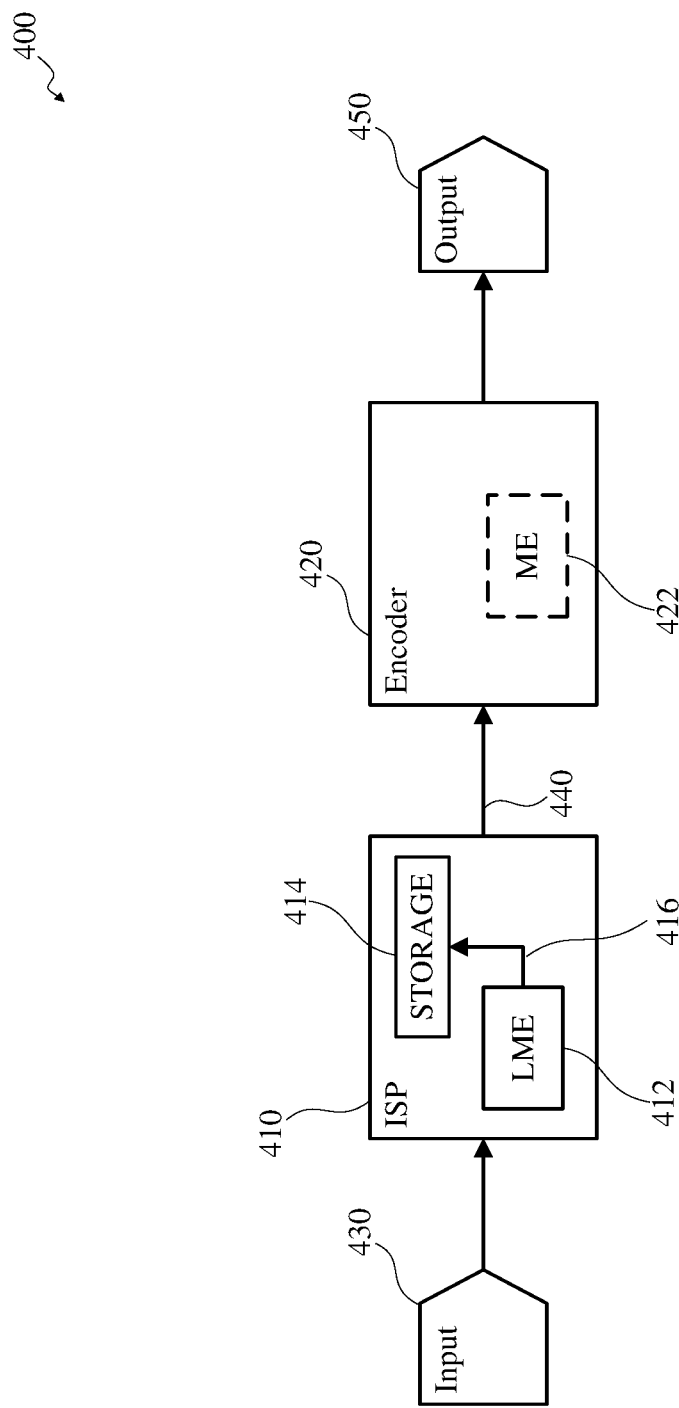
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

The image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

The local motion estimation unit 412 may compare pixel values of blocks of pixels between image frames, such as successive image frames, from the input image signal 430 to determine displacement, or movement, between frames. The local motion estimation unit 412 may produce motion vectors, such as an 'x' component and a 'y' component of motion, at multiple locations within an image frame. The motion vectors may be represented by a translational model or other models that may approximate camera motion, such as rotation and translation in three dimensions, and zooming.

The image signal processor 410 of the image processing and coding pipeline 400 may include an internal electronic storage unit 414, such as shared memory, such as random-access memory (RAM), flash, or other types of memory. The internal electronic storage unit 414 may store local motion estimation information 416 determined by the local motion estimation unit 412 for one or more frames. The local motion estimation information 416 and associated image or images may be output 440 to the encoder 420. In some implementations, the internal electronic storage unit 414 may include a buffer, or cache, and may buffer the input image signal as an input, or source, image, or frame.

The image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

The encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

The encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

The image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

The image signal processor 410 may store motion information, such as the local motion estimation information 416, in a memory, such as the internal electronic storage unit 414, and the encoder 420 may read the motion information from the internal electronic storage unit 414 or otherwise receive the motion information from the image signal processor 410. The encoder 420 may use the motion estimation information determined by the image signal processor 410 for motion compensation processing.

Figure 5:
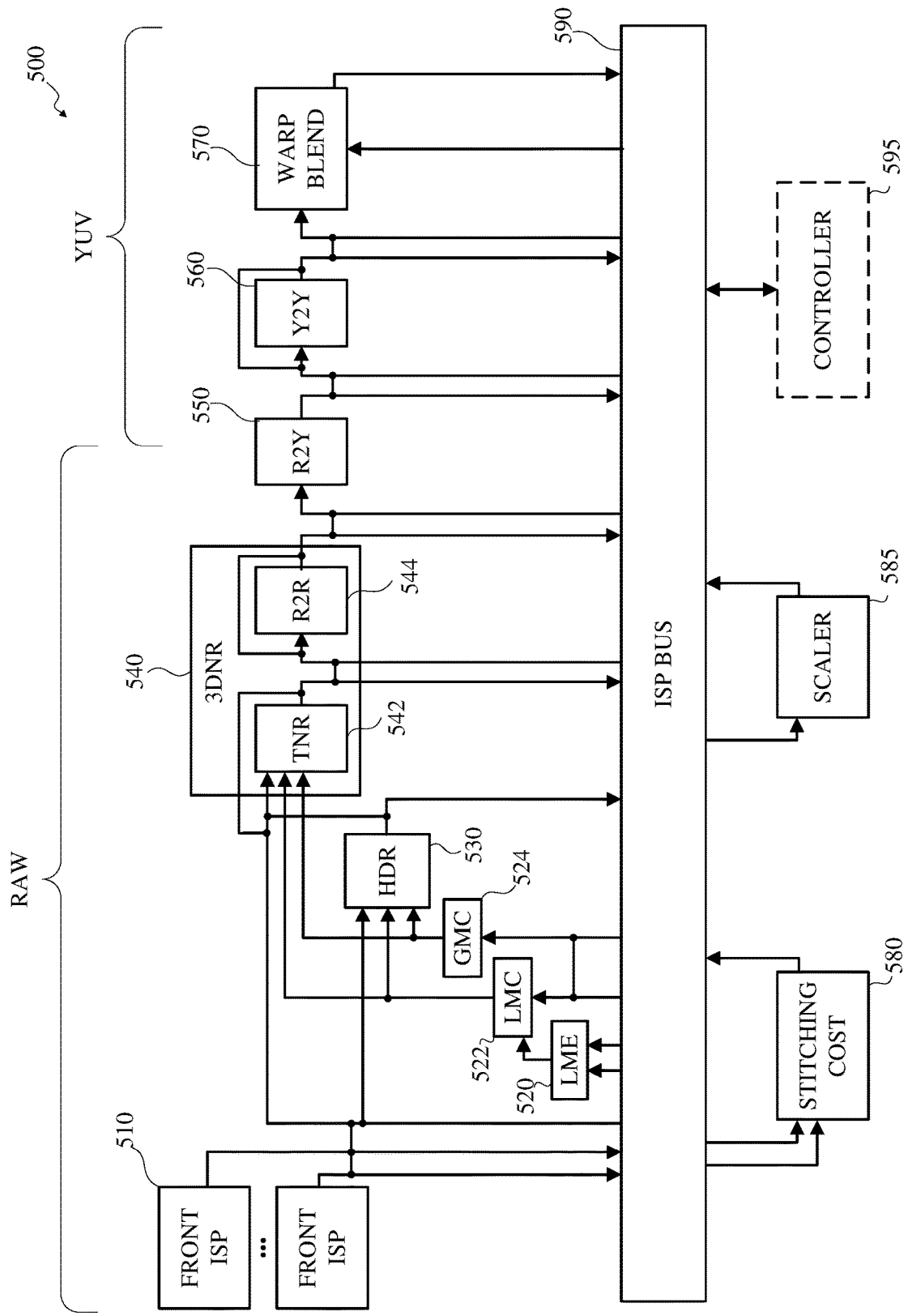
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw-to-raw (R2R) unit 544, a raw-to-YUV (R2Y) unit 550, a YUV-to-YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the HDR unit 530, the three-dimensional noise reduction unit 540, the temporal noise reduction unit 542, the raw-to-raw unit 544, the raw-to-YUV unit 550, the YUV-to-YUV unit 560, the warp and blend unit 570, the stitching cost unit 580, the scaler 585, the image signal processing bus 590, the configuration controller 595, or any combination thereof, may include a respective clock, power domain, or both.

The front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a ¹⁄₁₆×¹⁄₁₆ resolution frame, a ¹⁄₃₂×¹⁄₃₂ resolution frame, or any combination thereof.

A multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

The local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The HDR unit 530 may receive, or otherwise access, the current input frame, or one or more portions thereof, such as from the front image signal processor 510. The current input frame may be a long exposure input frame corresponding to the short exposure reference frame. The HDR unit 530 may receive, or otherwise access, the local motion compensated reference frame from the local motion compensation unit 522. The HDR unit 530 may receive, or otherwise access, the global motion compensated reference frame from the global motion compensation unit 524.

The HDR unit 530 may generate a high dynamic range image based on the current input image and the local motion compensated reference frame, the global motion compensated reference frame, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The HDR unit 530 may output the high dynamic range image. For example, the HDR unit 530 may output the high dynamic range image by storing the high dynamic range image in memory, such as shared memory, via the image signal processor bus 590, or the HDR unit 530 may output the high dynamic range image directly to another unit of the image signal processor 500, such as the temporal noise reduction unit 542.

The HDR unit 530 may be omitted, or high dynamic range processing by the HDR unit 530 may be omitted.

The three-dimensional noise reduction unit 540 may include the temporal noise reduction (TNR) unit 542, the raw-to-raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the HDR unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The temporal noise reduction unit 542 may generate output including a pixel value and associated noise variance for the pixel value for one or more pixels of the current input frame.

The raw-to-raw unit 544 may perform spatial denoising of frames of raw images based on noise variance values received from the temporal noise reduction unit 542. For example, spatial denoising in the raw-to-raw unit 544 may include multiple passes of image signal processing, including passes at various resolutions.

The raw-to-YUV unit 550 may demosaic, and/or color process, the frames of raw images, which may include representing respective pixels in the YUV format, which may include a combination of a luminance (Y) component and two chrominance (UV) components.

The YUV-to-YUV unit 560 may perform local tone mapping of YUV images. In some implementations, the YUV-to-YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

The warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw-to-raw unit 544, the raw-to-YUV unit 550, the YUV-to-YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the HDR unit 530, the three-dimensional noise reduction unit 540, the temporal noise reduction unit 542, the raw-to-raw unit 544, the raw-to-YUV unit 550, the YUV-to-YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
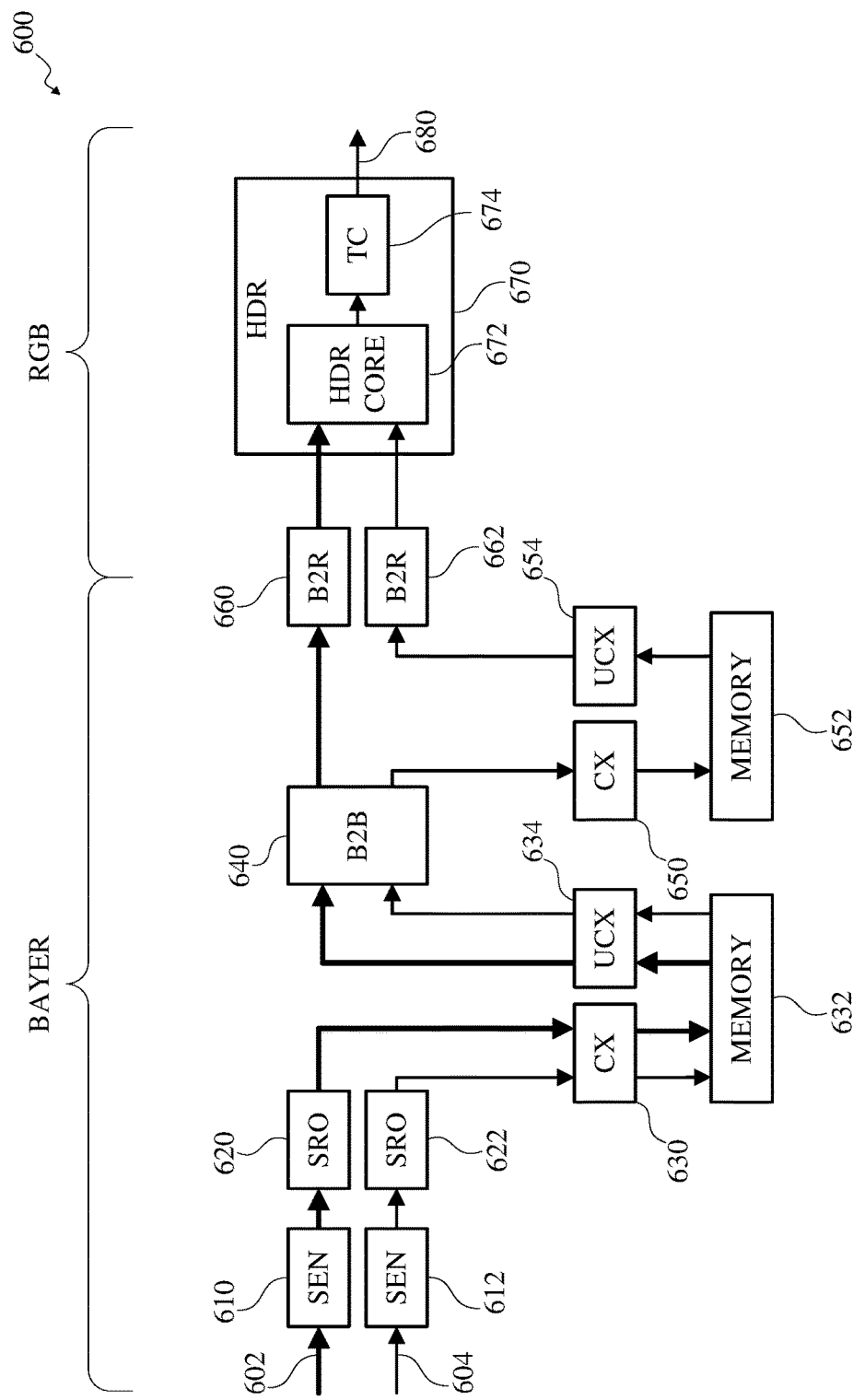
FIG. 6 is a functional block diagram of an example of an image processing and coding pipeline portion in accordance with implementations of this disclosure.

FIG. 6 is a functional block diagram of an example of an image processing and coding pipeline portion 600 in accordance with implementations of this disclosure. The image processing and coding pipeline portion 600 may be included in an image capture device, such as the image capture device 200 shown in FIG. 2, or an image capture apparatus, such as the image capture apparatus 110 shown in FIG. 1 or the image capture apparatus 300 shown in FIG. 3. The portion of the image processing and coding pipeline portion 600 shown in FIG. 6 may implement High Dynamic Range (HDR) processing for video data.

The image processing and coding pipeline portion 600 may be similar to the image processing and coding pipeline 400 shown in FIG. 4, or a portion thereof, except as described herein or otherwise clear from context. The image processing and coding pipeline portion 600 may be similar to the image signal processor 500 shown in FIG. 5, or a portion thereof, except as described herein or otherwise clear from context.

The portion of the image processing and coding pipeline portion 600 may receive a first image signal 602 and a second image signal 604. For simplicity and clarity, the first image signal 602 and the second image signal 604 may be collectively referred to as input image signals 602, 604. The input image signals 602, 604 may be received from one or more image sensors (not shown), such as the image sensor 230 shown in FIG. 2. For example, the first image signal 602 may be received as first image data, and the second image signal 604 may be received as second image data. An example of a data path for the first image data is shown using bold directional lines, and an example of a data path for the second image data is shown using unbolded directional lines, for clarity. The second image signal 604 may be received subsequently to the first image signal 602.

The input image signals 602, 604 may be received in a defined format, such as a format of the image sensor, which may be referred to herein as "raw," such as "a raw image," "raw image data," "raw data," "a raw signal," or "a raw image signal." As shown in FIG. 6, the input image signals 602, 604 may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. Other configurations may be used. For example, the raw image signal may be in a format such as RGB format, which may represent individual pixels using a combination of values or components, such as a red component (R), a green component (G), and a blue component (B). In some implementations, the image processing and coding pipeline portion 600 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats. In an example, the first image signal 602 may include first image data in an unsigned 14-bit Bayer format. The second image signal 604 may include second image data in the unsigned 14-bit Bayer format.

As shown in FIG. 6, the portion of the image processing and coding pipeline portion 600 includes a first sensor input (SEN) unit 610 for receiving the first image signal 602 as first image data. A data path for the first image data is shown using a bold line for clarity. The first sensor input unit 610 may decompress the first image signal 602 to obtain the first image data. The first sensor input unit 610 may perform blackpoint removal for the first image data.

As shown in FIG. 6, the portion of the image processing and coding pipeline portion 600 includes a second sensor input unit (SEN) 612 for receiving the second image signal 604 as second image data. The second sensor input unit 612 may decompress the second image signal 604 to obtain the second image data. The second sensor input unit 612 may perform blackpoint removal for the second image data.

As shown in FIG. 6, the portion of the image processing and coding pipeline portion 600 includes a first sensor readout (SRO) unit 620. The first sensor input unit 610 may output the first image data to the first sensor readout unit 620 and the first sensor readout unit 620 may receive the first image data from the first sensor input unit 610. The first sensor readout unit 620 may perform dead pixel correction for the first image data. The first sensor readout unit 620 may perform scaling for the first image data. The first sensor readout unit 620 may obtain, such as generate or determine, image capture and processing control statistics, such as Auto-Exposure (AE) control statistics, Auto-White-Balance (AWB) control statistics, Global-Tone-Mapping (GTM) control statistics, Auto Color Lens Shading (ACLS) control statistics, or any other image capture control statistics, based on the first image data.

The first sensor readout unit 620 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

Figure 22:
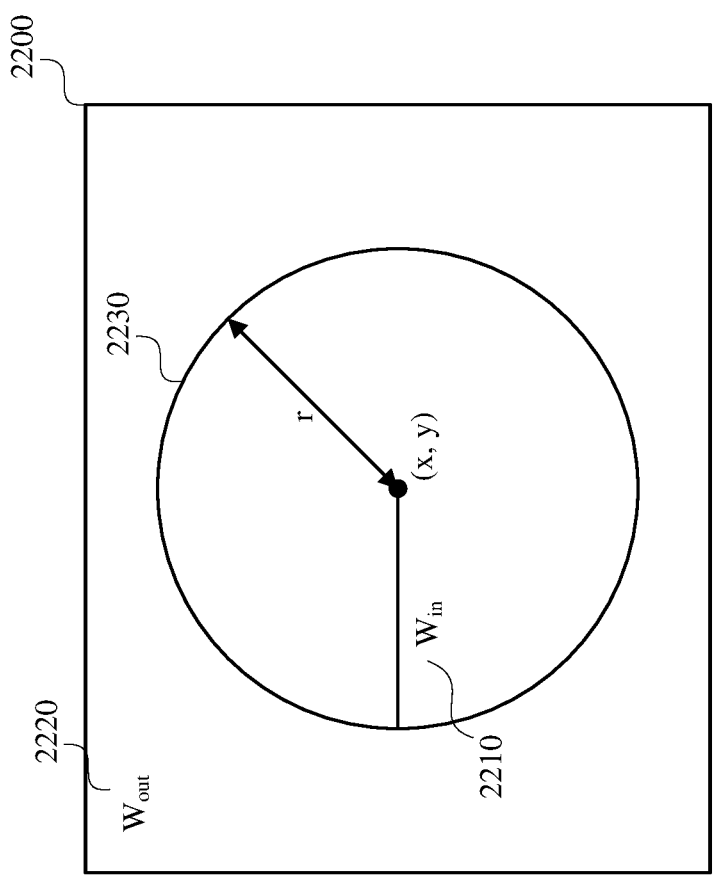
FIG. 22 is a diagram of an example of a radial map for image processing parameters in accordance with implementations of this disclosure.

The radial model may be configurable using a lookup table, which may include 1024 weighting values, and a configurable center. For example, the radial model may have defined center coordinates (x and y). The radial model may have a defined radius (r). The weighting values may be applied within a defined area ($W_{in}$), such as a circular area defined by the configurable center and the defined radius as shown in FIG. 22. A defined, configurable, weight may be applied outside the defined area ($W_{out}$). The radial model may have a defined weight precision, such as a 6-bit integer part and a 10-bit fractional part.

The two-dimensional map may be configurable using a lookup table, which may include 1024 weighting values. The two-dimensional map may be low-resolution map, such as a map having a maximum size of 64×64. Using the two-dimensional map may include using a configurable position. The two-dimensional map may include a defined grid, which may be a non-uniform grid. A defined, configurable, weight may be applied outside the two-dimensional map. The two-dimensional map may have a defined weight precision, such as a 6-bit integer part and a 10-bit fractional part.

As shown in FIG. 6, the portion of the image processing and coding pipeline portion 600 includes a second sensor readout unit 622. The second sensor input unit 612 may output the second image data to the second sensor readout unit 622 and the second sensor readout unit 622 may receive the second image data from the second sensor input unit 612. The second sensor readout unit 622 may perform dead pixel correction for the second image data. The second sensor readout unit 622 may perform scaling for the second image data. The second sensor readout unit 622 may obtain image capture and processing control statistics based on the second image data.

The second sensor readout unit 622 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 6, the portion of the image processing and coding pipeline portion 600 includes a first image compression (CX) unit 630. The first sensor readout unit 620 may output the first image data to the first image compression unit 630 and the first image compression unit 630 may receive the first image data from the first sensor readout unit 620. The first image compression unit 630 may compress the first image data. The second sensor readout unit 622 may output the second image data to the first image compression unit 630 and the first image compression unit 630 may receive the second image data from the second sensor readout unit 622. The first image compression unit 630 may compress the second image data. The compression may be performed using a lossy compression mode or a lossless compression mode. The compression mode may be obtained based on bandwidth constraints. Compressing the image data may reduce bandwidth and memory resource utilization. In some implementations, knee tables may be used. The knee tables may be modified or updated periodically, such as on a per-frame basis. Using knee tables may include double-buffering. For example, the first image compression unit 630 may compress the unsigned 14-bit Bayer format image data, or a signed 15-bit Bayer format, to an unsigned X-bit Bayer format.

As shown in FIG. 6, the portion of the image processing and coding pipeline portion 600 includes a first memory, such as RAM, unit 632. The first image compression unit 630 may output the first image data to the first memory unit 632 and the first memory unit 632 may receive the first image data from the first image compression unit 630. The first image compression unit 630 may output the second image data to the first memory unit 632 and the first memory unit 632 may receive the second image data from the first image compression unit 630. The first memory unit 632 may store the first image data, the second image data, or both.

As shown in FIG. 6, the portion of the image processing and coding pipeline portion 600 includes a first image uncompression (UCX) unit 634. The first memory unit 632 may output the first image data to the first image uncompression unit 634 and the first image uncompression unit 634 may receive the first image data from the first memory unit 632. The first image uncompression unit 634 may uncompress the first image data. The first memory unit 632 may output the second image data to the first image uncompression unit 634 and the first image uncompression unit 634 may receive the second image data from the first memory unit 632. The first image uncompression unit 634 may uncompress the second image data. For example, the first image uncompression unit 634 may uncompress the unsigned X-bit Bayer format image data to a signed 15-bit Bayer format.

As shown in FIG. 6, the portion of the image processing and coding pipeline portion 600 includes a Bayer-to-Bayer (B2B) unit 640. The first image uncompression unit 634 may output the first image data to the Bayer-to-Bayer unit 640 and the Bayer-to-Bayer unit 640 may receive the first image data from the first image uncompression unit 634. The first image uncompression unit 634 may output the second image data to the Bayer-to-Bayer unit 640 and the Bayer-to-Bayer unit 640 may receive the second image data from the first image uncompression unit 634. The Bayer-to-Bayer unit 640 may convert the signed 15-bit Bayer format data to the unsigned 14-bit Bayer format. The Bayer-to-Bayer unit 640 may obtain, such as generate or determine, HDR Tone Control statistics, based on the first image data, the second image data, or both. The Bayer-to-Bayer unit 640 may implement denoising.

As shown in FIG. 6, the portion of the image processing and coding pipeline portion 600 includes a second image compression unit 650. Although the first image compression unit 630 and the second image compression unit 650 are shown separately, the first image compression unit 630 and the second image compression unit 650 may be a combined unit. The Bayer-to-Bayer unit 640 may output the second image data to the second image compression unit 650 and the second image compression unit 650 may receive the second image data from the Bayer-to-Bayer unit 640. The second image compression unit 650 may compress the second image data. The compression may be performed using a lossy compression mode or a lossless compression mode. The compression mode may be obtained based on bandwidth constraints. For example, the second image compression unit 650 may compress the unsigned 14-bit Bayer format second image data to an unsigned X-bit Bayer format.

As shown in FIG. 6, the portion of the image processing and coding pipeline portion 600 includes a second memory, such as RAM, unit 652. Although the first memory unit 632 and the second memory unit 652 are shown separately, the first memory unit 632 and the second memory unit 652 may be a combined unit. The second image compression unit 650 may output the second image data to the second memory unit 652 and the second memory unit 652 may receive the second image data from the second image compression unit 650. The second memory unit 652 may store the second image data.

As shown in FIG. 6, the portion of the image processing and coding pipeline portion 600 includes a second image uncompression (UCX) unit 654. Although the first image uncompression unit 634 and the second image uncompression unit 654 are shown separately, the first image uncompression unit 634 and the second image uncompression unit 654 may be a combined unit. The second memory unit 652 may output the second image data to the second image uncompression unit 654 and the second image uncompression unit 654 may receive the second image data from the second memory unit 652. The second image uncompression unit 654 may uncompress the second image data. For example, the second image uncompression unit 654 may uncompress the unsigned X-bit Bayer format image data to the unsigned 14-bit Bayer format.

As shown in FIG. 6, the portion of the image processing and coding pipeline portion 600 includes a first Bayer-to-RGB (B2R) unit 660. The Bayer-to-Bayer unit 640 may output the first image data to the first Bayer-to-RGB unit 660 and the first Bayer-to-RGB unit 660 may receive the first image data from the Bayer-to-Bayer unit 640. The first Bayer-to-RGB unit 660 may convert the first image data from Bayer format to an RGB format, such as an unsigned 14-bit RGB format. The first Bayer-to-RGB unit 660 may implement white balancing and demosaicing.

As shown in FIG. 6, the portion of the image processing and coding pipeline portion 600 includes a second Bayer-to-RGB unit 662. The second image uncompression unit 654 may output the second image data to the second Bayer-to-RGB 662 and the second Bayer-to-RGB unit 662 may receive the second image data from the second image uncompression unit 655. The second Bayer-to-RGB unit 662 may convert the second image data from Bayer format to RGB format, such as the unsigned 14-bit RGB format. The second Bayer-to-RGB unit 662 may implement white balancing and demosaicing.

As shown in FIG. 6, the portion of the image processing and coding pipeline portion 600 includes a High Dynamic Range (HDR) unit 670, which may include an HDR core unit 672 and a Tone Control (TC) unit 674. The first Bayer-to-RGB unit 660 may output the first image data to the HDR core unit 672 and the HDR core unit 672 may receive the first image data from the first Bayer-to-RGB unit 660. The second Bayer-to-RGB unit 662 may output the second image data to the HDR core unit 672 and the HDR core unit 672 may receive the second image data from the second Bayer-to-RGB unit 662. The HDR core unit 672 may obtain combined image data, such as an HDR image, by merging, fusing, or combining the first image data with the second image data (HDR fusion). The HDR core unit 672 may convert the unsigned 14-bit RGB format image data to an unsigned 23-bit RGB format (full dynamic data). The HDR core unit 672 may output the combined image data to the Tone Control unit 674.

The Tone Control unit 674 may receive the combined image data from the HDR core unit 672. The Tone Control unit 674 may compress the combined image data. For example, the HDR core unit 672 may output the combined image data in the unsigned 23-bit RGB format and the Tone Control unit 674 may convert or compress the unsigned 23-bit RGB format data to an unsigned 17-bit RGB format (enhanced dynamic data). One or more parameters for the Tone Control unit 674 may be obtained, such as configurable, per frame or image. For example, one or more of the Tone Control parameters may be obtained from the Bayer-to-Bayer unit 640. A look-up-table may include a double-buffer. The Tone Control unit 674 may output the combined image data, such as in the unsigned 17-bit RGB format, as indicated at 680.

Figure 7:
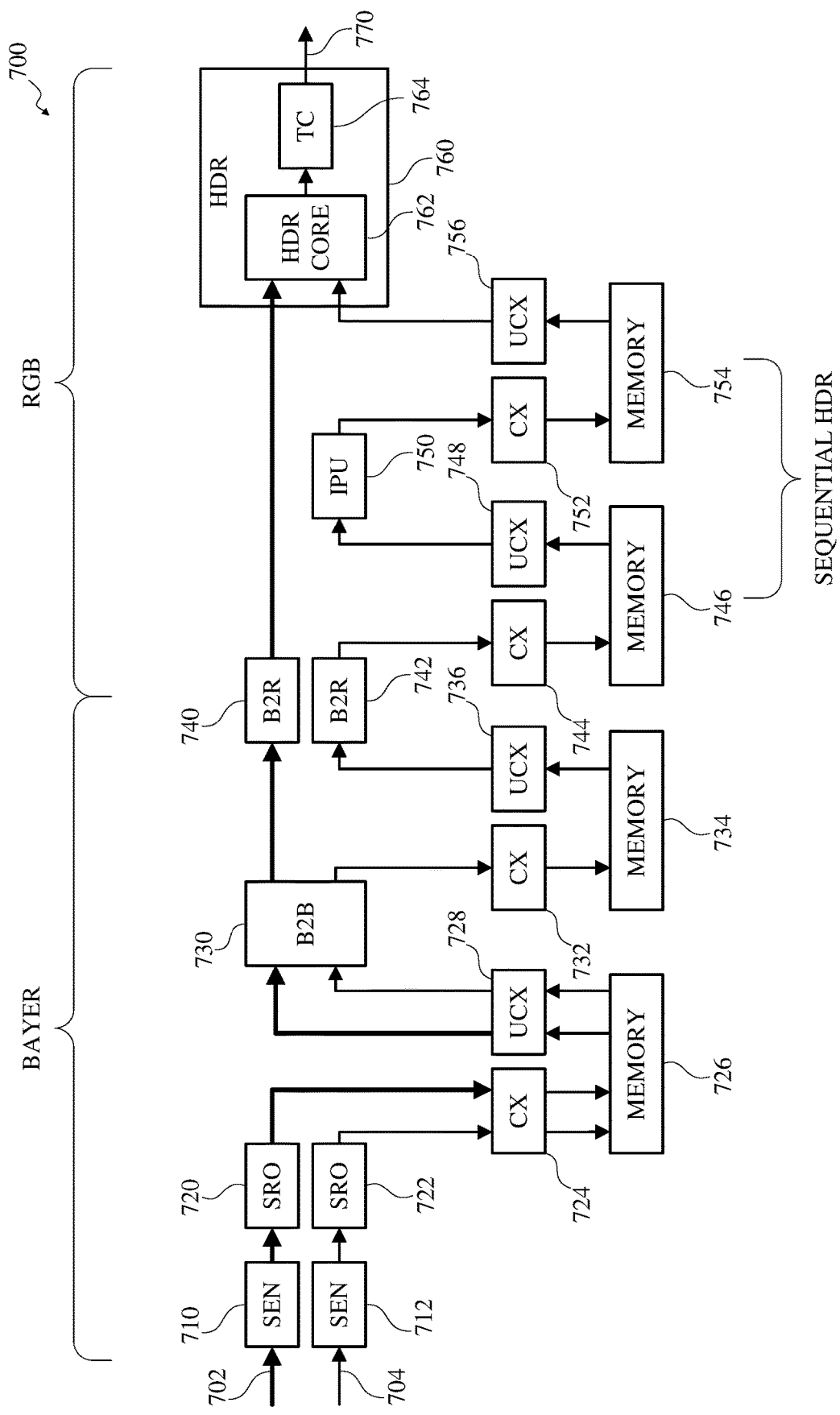
FIG. 7 is a functional block diagram of another example of an image processing and coding pipeline portion in accordance with implementations of this disclosure.

FIG. 7 is a functional block diagram of another example of an image processing and coding pipeline portion 700 in accordance with implementations of this disclosure. The image processing and coding pipeline portion 700 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 700 shown in FIG. 7 may implement High Dynamic Range (HDR) processing for still image data.

The image processing and coding pipeline portion 700 may be similar to the image processing and coding pipeline 400 shown in FIG. 4, or a portion thereof, except as described herein or otherwise clear from context. The image processing and coding pipeline portion 700 may be similar to the image signal processor 500 shown in FIG. 5, or a portion thereof, except as described herein or otherwise clear from context. The image processing and coding pipeline portion 700 may be similar to the image processing and coding pipeline portion 600 shown in FIG. 6, except as described herein or otherwise clear from context.

The portion of the image processing and coding pipeline portion 700 may receive a first image signal 702 and a second image signal 704. For simplicity and clarity, the first image signal 702 and the second image signal 704 may be collectively referred to as input image signals 702, 704. The input image signals 702, 704 may be received from one or more image sensors (not shown), such as the image sensor 230 shown in FIG. 2. For example, the first image signal 702 may be received as first image data, and the second image signal 704 may be received as second image data. An example of a data path for the first image data is shown using bold directional lines, and an example of a data path for the second image data is shown using unbolded directional lines, for clarity. The second image signal 704 may be received subsequently to the first image signal 702.

The input image signals 702, 704 may be received in a defined format, such as a format of the image sensor, which may be referred to herein as "raw," such as "a raw image," "raw image data," "raw data," "a raw signal," or "a raw image signal." As shown in FIG. 7, the input image signals 702, 704 may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. Other configurations may be used. For example, the raw image signal may be in a format such as RGB format, which may represent individual pixels using a combination of values or components, such as a red component (R), a green component (G), and a blue component (B). In some implementations, the image processing and coding pipeline portion 700 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats. In an example, the first image signal 702 may include first image data in an unsigned 14-bit Bayer format. The second image signal 704 may include second image data in the unsigned 14-bit Bayer format.

As shown in FIG. 7, the portion of the image processing and coding pipeline portion 700 includes a first sensor input (SEN) unit 710 for receiving the first image signal 702 as first image data. A data path for the first image data is shown using a bold line for clarity. The first sensor input unit 710 may decompress the first image signal 702 to obtain the first image data. The first sensor input unit 710 may perform blackpoint removal for the first image data.

As shown in FIG. 7, the portion of the image processing and coding pipeline portion 700 includes a second sensor input unit (SEN) 712 for receiving the second image signal 704 as second image data. The second sensor input unit 712 may decompress the second image signal 704 to obtain the second image data. The second sensor input unit 712 may perform blackpoint removal for the second image data.

As shown in FIG. 7, the portion of the image processing and coding pipeline portion 700 includes a first sensor readout (SRO) unit 720. The first sensor input unit 710 may output the first image data to the first sensor readout unit 720 and the first sensor readout unit 720 may receive the first image data from the first sensor input unit 710. The first sensor readout unit 720 may perform dead pixel correction, color lens shading, lateral chromatic processing, Bayer resizing, or the like, for the first image data. The first sensor readout unit 720 may perform scaling for the first image data. The first sensor readout unit 720 may obtain, such as generate or determine, image capture and processing control statistics, such as Auto-Exposure (AE) control statistics, Auto-White-Balance (AWB) control statistics, Global-Tone-Mapping (GTM) control statistics, Auto Color Lens Shading (ACLS) control statistics, or any other image capture control statistics, based on the first image data. The first sensor readout unit 720 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 7, the portion of the image processing and coding pipeline portion 700 includes a second sensor readout (SRO) unit 722. The second sensor input unit 712 may output the second image data to the second sensor readout unit 722 and the second sensor readout unit 722 may receive the second image data from the second sensor input unit 712. The second sensor readout unit 722 may perform dead pixel correction, color lens shading, lateral chromatic processing, Bayer resizing, or the like, for the second image data. The second sensor readout unit 722 may perform scaling for the second image data. The second sensor readout unit 722 may obtain image capture and processing control statistics based on the second image data. The second sensor readout unit 722 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 7, the portion of the image processing and coding pipeline portion 700 includes a first image compression (CX) unit 724. The first sensor readout unit 720 may output the first image data to the first image compression unit 724 and the first image compression unit 724 may receive the first image data from the first sensor readout unit 720. The first image compression unit 724 may compress the first image data. The second sensor readout unit 722 may output the second image data to the first image compression unit 724 and the first image compression unit 724 may receive the second image data from the second sensor readout unit 722. The first image compression unit 724 may compress the second image data. The compression may be performed using a lossy compression mode or a lossless compression mode. The compression mode may be obtained based on bandwidth constraints. Compressing the image data may reduce bandwidth and memory resource utilization. In some implementations, knee tables may be used. The knee tables may be modified or updated periodically, such as on a per-frame basis. Using knee tables may include double-buffering. For example, the first image compression unit 724 may compress the unsigned 14-bit Bayer format image data, or a signed 15-bit Bayer format, to an unsigned X-bit Bayer format.

As shown in FIG. 7, the portion of the image processing and coding pipeline portion 700 includes a first memory, such as RAM, unit 726. The first image compression unit 724 may output the first image data to the first memory unit 726 and the first memory unit 726 may receive the first image data from the first image compression unit 724. The first image compression unit 724 may output the second image data to the first memory unit 726 and the first memory unit 726 may receive the second image data from the first image compression unit 724. The first memory unit 726 may store the first image data, the second image data, or both.

As shown in FIG. 7, the portion of the image processing and coding pipeline portion 700 includes a first image uncompression (UCX) unit 728. The first memory unit 726 may output the first image data to the first image uncompression unit 728 and the first image uncompression unit 728 may receive the first image data from the first memory unit 726. The first image uncompression unit 728 may uncompress the first image data. The first memory unit 726 may output the second image data to the first image uncompression unit 728 and the first image uncompression unit 728 may receive the second image data from the first memory unit 726. The first image uncompression unit 728 may uncompress the second image data. For example, the first image uncompression unit 728 may uncompress the unsigned X-bit Bayer format image data to the signed 15-bit Bayer format.

As shown in FIG. 7, the portion of the image processing and coding pipeline portion 700 includes a Bayer-to-Bayer (B2B) unit 730. The first image uncompression unit 728 may output the first image data to the Bayer-to-Bayer unit 730 and the Bayer-to-Bayer unit 730 may receive the first image data from the first image uncompression unit 728. The first image uncompression unit 728 may output the second image data to the Bayer-to-Bayer unit 730 and the Bayer-to-Bayer unit 730 may receive the second image data from the first image uncompression unit 728. The Bayer-to-Bayer unit 730 may convert the signed 15-bit Bayer format data to the unsigned 14-bit Bayer format. The Bayer-to-Bayer unit 730 may obtain, such as generate or determine, HDR Tone Control statistics, based on the first image data, the second image data, or both. The Bayer-to-Bayer unit 730 may implement denoising.

As shown in FIG. 7, the portion of the image processing and coding pipeline portion 700 includes a second image compression unit 732. Although the first image compression unit 724 and the second image compression unit 732 are shown separately, the first image compression unit 724 and the second image compression unit 732 may be one combined unit. The Bayer-to-Bayer unit 730 may output the second image data to the second image compression unit 732 and the second image compression unit 732 may receive the second image data from the Bayer-to-Bayer unit 730. The second image compression unit 732 may compress the second image data. The compression may be performed using a lossy compression mode or a lossless compression mode. The compression mode may be obtained based on bandwidth constraints. For example, the second image compression unit 732 may compress the unsigned 14-bit Bayer format second image data to an unsigned X-bit Bayer format.

As shown in FIG. 7, the portion of the image processing and coding pipeline portion 700 includes a second memory, such as RAM, unit 734. Although the first memory unit 726 and the second memory unit 734 are shown separately, the first memory unit 726 and the second memory unit 734 may be one combined unit. The second image compression unit 732 may output the second image data to the second memory unit 734 and the second memory unit 734 may receive the second image data from the second image compression unit 732. The second memory unit 734 may store the second image data.

As shown in FIG. 7, the portion of the image processing and coding pipeline portion 700 includes a second image uncompression (UCX) unit 736. Although the first image uncompression unit 728 and the second image uncompression unit 736 are shown separately, the first image uncompression unit 728 and the second image uncompression unit 736 may be one combined unit. The second memory unit 734 may output the second image data to the second image uncompression unit 736 and the second image uncompression unit 736 may receive the second image data from the second memory unit 734. The second image uncompression unit 736 may uncompress the second image data. For example, the second image uncompression unit 736 may uncompress the unsigned X-bit Bayer format image data to the unsigned 14-bit Bayer format.

As shown in FIG. 7, the portion of the image processing and coding pipeline portion 700 includes a first Bayer-to-RGB (B2R) unit 740. The Bayer-to-Bayer unit 730 may output the first image data to the first Bayer-to-RGB unit 740 and the first Bayer-to-RGB unit 740 may receive the first image data from the Bayer-to-Bayer unit 730. The first Bayer-to-RGB unit 740 may convert the first image data from Bayer format to an RGB format, such as an unsigned 14-bit RGB format. The first Bayer-to-RGB unit 740 may implement white balancing and demosaicing.

As shown in FIG. 7, the portion of the image processing and coding pipeline portion 700 includes a second Bayer-to-RGB (B2R) unit 742. The second image uncompression unit 736 may output the second image data to the second Bayer-to-RGB 742 and the second Bayer-to-RGB unit 742 may receive the second image data from the second image uncompression unit 736. The second Bayer-to-RGB unit 742 may convert the second image data from Bayer format to RGB format, such as the unsigned 14-bit RGB format. The second Bayer-to-RGB unit 742 may implement white balancing and demosaicing.

As shown in FIG. 7, the portion of the image processing and coding pipeline portion 700 includes a third image compression unit 744. Although the first image compression unit 724, the second image compression unit 732, and the third image compression unit 744 are shown separately, the first image compression unit 724, the second image compression unit 732, and the third image compression unit 744 may be a combined unit. The second Bayer-to-RGB unit 742 may output the second image data to the third image compression unit 744 and the third image compression unit 744 may receive the second image data from the second Bayer-to-RGB unit 742. The third image compression unit 744 may compress the second image data. The compression may be performed using a lossy compression mode or a lossless compression mode. The compression mode may be obtained based on bandwidth constraints. For example, the third image compression unit 744 may compress the unsigned 14-bit Bayer format second image data to an unsigned X-bit Bayer format.

As shown in FIG. 7, the portion of the image processing and coding pipeline portion 700 includes a third memory, such as RAM, unit 746. Although the first memory unit 726, the second memory unit 734, and the third memory unit 746 are shown separately, the first memory unit 726, the second memory unit 734, and the third memory unit 746 may be a combined unit. The third image compression unit 744 may output the second image data to the third memory unit 746 and the third memory unit 746 may receive the second image data from the third image compression unit 744. The third memory unit 746 may store the second image data.

As shown in FIG. 7, the portion of the image processing and coding pipeline portion 700 includes a third image uncompression (UCX) unit 748. Although the first image uncompression unit 728, the second image uncompression unit 736, and the third image uncompression unit 748 are shown separately, the first image uncompression unit 728, the second image uncompression unit 736, and the third image uncompression unit 748 may be a combined unit. The third memory unit 746 may output the second image data to the third image uncompression unit 748 and the third image uncompression unit 748 may receive the second image data from the third memory unit 746. The third image uncompression unit 748 may uncompress the second image data. For example, the third image uncompression unit 748 may uncompress the unsigned X-bit Bayer format image data to the unsigned 14-bit Bayer format.

As shown in FIG. 7, the portion of the image processing and coding pipeline portion 700 includes an Image Processing (IPU) unit 750. The third image uncompression unit 748 may output the second image data to the image processing unit 750 and the image processing unit 750 may receive the second image data from the third image uncompression unit 748. The image processing unit 750 may perform warping, image registration, electronic image stabilization, motion detection, object detection, or the like. For example, the image processing unit 750 may perform registration between the first input image data (first input image) and the second input image data (second input image), which may reduce ghost artifacts prior to HDR processing.

As shown in FIG. 7, the portion of the image processing and coding pipeline portion 700 includes a fourth image compression unit 752. Although the first image compression unit 724, the second image compression unit 732, the third image compression unit 744, and the fourth image compression unit 752 are shown separately, the first image compression unit 724, the second image compression unit 732, the third image compression unit 744, and the fourth image compression unit 752 may be a combined unit. The image processing unit 750 may output the second image data to the fourth image compression unit 752 and the fourth image compression unit 752 may receive the second image data from the image processing unit 750. The fourth image compression unit 752 may compress the second image data. The compression may be performed using a lossy compression mode or a lossless compression mode. The compression mode may be obtained based on bandwidth constraints. For example, the fourth image compression unit 752 may compress the unsigned 14-bit Bayer format second image data to an unsigned X-bit Bayer format.

As shown in FIG. 7, the portion of the image processing and coding pipeline portion 700 includes a fourth memory, such as RAM, unit 754. Although the first memory unit 726, the second memory unit 734, the third memory unit 746, and the fourth memory unit 754 are shown separately, the first memory unit 726, the second memory unit 734, the third memory unit 746, and the fourth memory unit 754 may be a combined unit. The fourth image compression unit 752 may output the second image data to the fourth memory unit 754 and the fourth memory unit 754 may receive the second image data from the fourth image compression unit 752. The fourth memory unit 754 may store the second image data.

As shown in FIG. 7, the portion of the image processing and coding pipeline portion 700 includes a fourth image uncompression (UCX) unit 756. Although the first image uncompression unit 728, the second image uncompression unit 736, the third image uncompression unit 748, and the fourth image uncompression unit 756 are shown separately, the first image uncompression unit 728, the second image uncompression unit 736, the third image uncompression unit 748, and the fourth image uncompression unit 756 may be a combined unit. The fourth memory unit 754 may output the second image data to the fourth image uncompression unit 756 and the fourth image uncompression unit 756 may receive the second image data from the fourth memory unit 754. The fourth image uncompression unit 756 may uncompress the second image data. For example, the fourth image uncompression unit 756 may uncompress the unsigned X-bit Bayer format image data to the unsigned 14-bit Bayer format.

As shown in FIG. 7, the portion of the image processing and coding pipeline portion 700 includes a High Dynamic Range (HDR) unit 760, which may include an HDR core unit 762 and a Tone Control (TC) unit 764. The first Bayer-to-RGB unit 740 may output the first image data to the HDR core unit 762 and the HDR core unit 762 may receive the first image data from the first Bayer-to-RGB unit 740. The fourth image uncompression unit 756 may output the second image data to the HDR core unit 762 and the HDR core unit 762 may receive the second image data from the fourth image uncompression unit 756. The HDR core unit 762 may obtain combined image data, such as an HDR image, by merging, fusing, or combining the first image data with the second image data (HDR fusion). The HDR core unit 762 may convert the unsigned 14-bit RGB format image data to an unsigned 23-bit RGB format (full dynamic data). The HDR core unit 762 may output the combined image data to the Tone Control unit 764.

The Tone Control unit 764 may receive the combined image data from the HDR core unit 762. The Tone Control unit 764 may compress the combined image data. For example, the HDR core unit 762 may output the combined image data in the unsigned 23-bit RGB format and the Tone Control unit 764 may convert or compress the unsigned 23-bit RGB format data to an unsigned 17-bit RGB format (enhanced dynamic data). One or more parameters for the Tone Control unit 764 may be obtained, such as configurable, per frame or image. For example, one or more of the Tone Control parameters may be obtained from the Bayer-to-Bayer unit 730. A look-up-table may include a double-buffer. The Tone Control unit 764 may output the combined image data, such as in the unsigned 17-bit RGB format, as indicated at 770.

Figure 8:
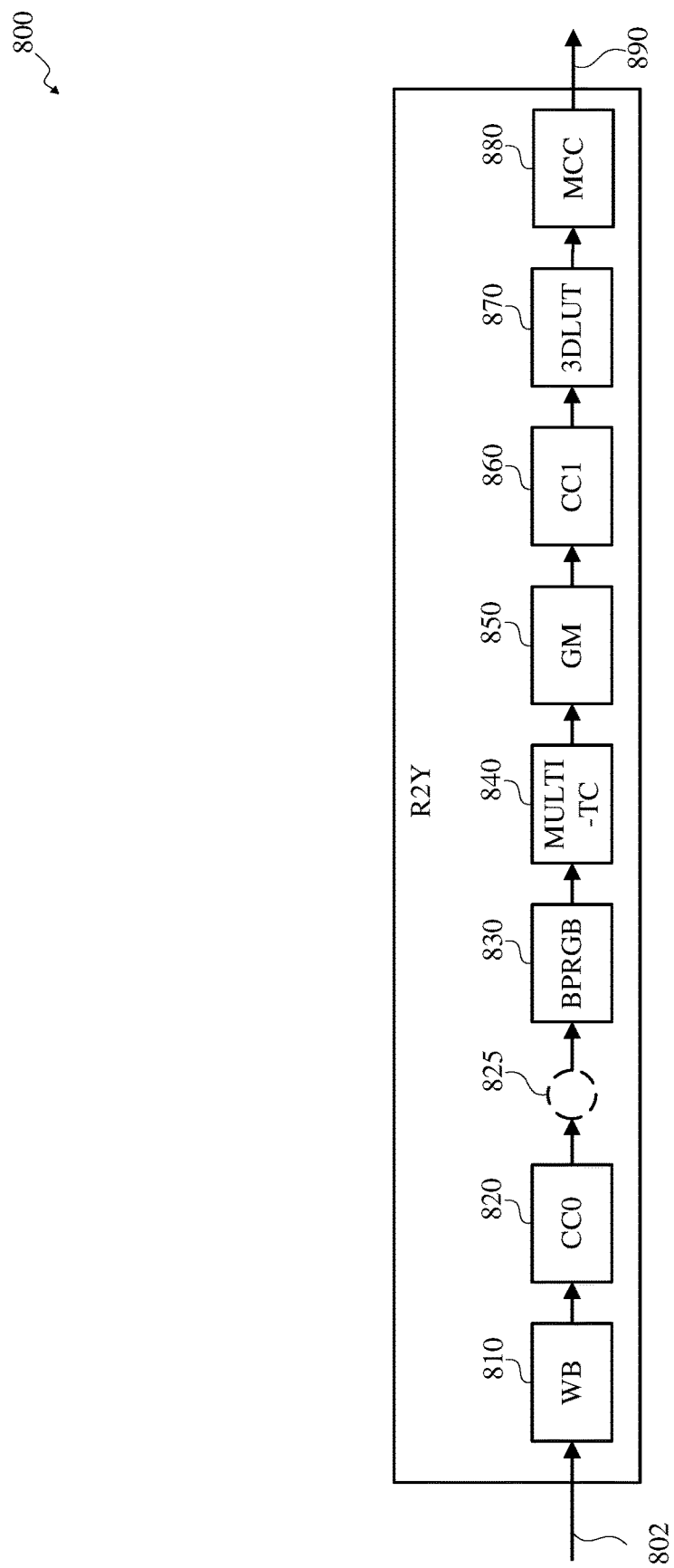
FIG. 8 is a functional block diagram of an example of an RGB-to-YUV unit of an image processing and coding pipeline in accordance with implementations of this disclosure.

FIG. 8 is a functional block diagram of an example of an RGB-to-YUV (R2Y) unit 800 of an image processing and coding pipeline in accordance with implementations of this disclosure. The RGB-to-YUV unit 800 may be included in an image capture device, such as the image capture device 200 shown in FIG. 2, or an image capture apparatus, such as the image capture apparatus 110 shown in FIG. 1 or the image capture apparatus 300 shown in FIG. 3. The RGB-to-YUV unit 800 shown in FIG. 8 may be included in an image processing pipeline including High Dynamic Range (HDR) processing for still image data and video data. The RGB-to-YUV unit 800 may convert image data from an RGB format to a YUV format and may implement color correction and chroma denoising. The RGB-to-YUV unit 800 may include other elements not shown in FIG. 8 for simplicity and clarity.

The RGB-to-YUV unit 800 may be similar to the image processing and coding pipeline 400 shown in FIG. 4, or a portion thereof, except as described herein or otherwise clear from context. The RGB-to-YUV unit 800 may be similar to the image signal processor 500 shown in FIG. 5, or a portion thereof, except as described herein or otherwise clear from context. For example, an image processor may include the image processing and coding pipeline portion 600 shown in FIG. 6 and, subsequently, the RGB-to-YUV unit 800 shown in FIG. 8. In another example, an image processor may include the image processing and coding pipeline portion 700 shown in FIG. 7 and, subsequently, the RGB-to-YUV unit 800 shown in FIG. 8.

The RGB-to-YUV unit 800 may receive HDR image data 802, such as the HDR image data 680 output as shown in FIG. 6 or the HDR image data 770 output as shown in FIG. 7. The HDR image data 802 may be enhanced dynamic range unsigned 17-bit RGB image data.

As shown in FIG. 8, the RGB-to-YUV unit 800 includes a white balance (WB) unit 810. The white balance unit 810 may receive the HDR image data 802, such as from the HDR unit 670 shown in FIG. 6 or from the HDR unit 760 shown in FIG. 7. The HDR image data received at the white balance unit 810 may be enhanced dynamic range unsigned 17-bit RGB image data. The white balance unit 810 may perform white balance correction on the image data.

As shown in FIG. 8, the RGB-to-YUV unit 800 includes a first color correction (CC0) unit 820. The white balance unit 810 may output the HDR image data to the first color correction unit 820 and the first color correction unit 820 may receive the HDR image data from the white balance unit 810. The HDR image data received at the first color correction unit 820 may be enhanced dynamic range unsigned 17-bit RGB image data. The first color correction unit 820 may implement linear color rendering, which may include applying a 3×3 color matrix.

A broken line circle is shown at 825 to indicate that, in some implementations, the RGB-to-YUV unit 800 may include a three-dimensional lookup table unit (not shown) subsequent to the first color correction unit 820, an MCC unit (not shown) subsequent to the three-dimensional lookup table unit, or both, that may be omitted for HDR image data processing.

As shown in FIG. 8, the RGB-to-YUV unit 800 includes a blackpoint RGB removal (BPRGB) unit 830. The first color correction unit 820 may output the HDR image data to the blackpoint RGB removal unit 830 and the blackpoint RGB removal unit 830 may receive the HDR image data from the first color correction unit 820. The HDR image data received at the blackpoint RGB removal unit 830 may be enhanced dynamic range unsigned 17-bit RGB image data, which may include respective R (red), G (green), and B (blue) channel 8-bit weighted least-significant-bit (LSB) histogram data. In some implementations, low intensity values, such as values within a defined intensity threshold, such as less than or equal to, $2^8$, may be processed for obtaining the histogram data and values exceeding the intensity threshold may be omitted from the histogram data processing.

As shown in FIG. 8, the RGB-to-YUV unit 800 includes a Multiple Tone Control (Multi-TC) unit 840. The blackpoint RGB removal unit 830 may output the HDR image data to the Multiple Tone Control unit 840 and the Multiple Tone Control unit 840 may receive the HDR image data from the blackpoint RGB removal unit 830. The HDR image data received at the Multiple Tone Control unit 840 may be enhanced dynamic range unsigned 17-bit RGB image data, which may include Y (luminance) channel 12-bit and 10-bit weighted histogram data and thumbnail data. The Multiple Tone Control unit 840 may convert the unsigned 17-bit RGB image data to unsigned 14-bit RGB image data. The Multiple Tone Control unit 840 may apply dynamic tone mapping to the Y channel (luminance) data, which may be based on, for example, image capture conditions, such as light conditions or scene conditions. The tone mapping may include local tone mapping, global tone mapping, or a combination thereof.

As shown in FIG. 8, the RGB-to-YUV unit 800 includes a Gamma (GM) unit 850. The Multiple Tone Control unit 840 may output the HDR image data to the Gamma unit 850 and the Gamma unit 850 may receive the HDR image data from the Multiple Tone Control unit 840. The HDR image data received at the GM unit 850 may be unsigned 14-bit RGB image data. The Gamma unit 850 may convert the unsigned 14-bit RGB image data to unsigned 10-bit RGB image data. The Gamma unit 850 may apply a lookup-table independently per channel for color rendering (gamma curve application). Using a lookup-table, which may be an array, may reduce resource utilization, such as processor utilization, using an array indexing operation rather than more complex computation.

As shown in FIG. 8, the RGB-to-YUV unit 800 includes a second color correction (CC1) unit 860. The Gamma unit 850 may output the HDR image data to the second color correction unit 860 and the second color correction unit 860 may receive the HDR image data from the Gamma unit 850. The HDR image data received at the second color correction unit 860 may be unsigned 10-bit RGB image data. The second color correction unit 860 may implement linear color rendering, which may include applying a 3×3 color matrix.

As shown in FIG. 8, the RGB-to-YUV unit 800 includes a three-dimensional lookup table (3DLUT) unit 870. The CC1 unit 860 may output the HDR image data to the three-dimensional lookup table unit 870 and the three-dimensional lookup table unit 870 may receive the HDR image data from the CC1 unit 860. The HDR image data received at the three-dimensional lookup table unit 870 may be unsigned 10-bit RGB image data. The three-dimensional lookup table unit 870 may be a three-dimensional lookup table, which may map RGB input values to RGB output values through a non-linear function for non-linear color rendering.

As shown in FIG. 8, the RGB-to-YUV unit 800 includes a Multi-Axis Color Correction (MCC) unit 880. The three-dimensional lookup table unit 870 may output the HDR image data to the multi-axis color correction unit 880 and the multi-axis color correction unit 880 may receive the HDR image data from the three-dimensional lookup table unit 870. The HDR image data received at the multi-axis color correction unit 880 may be unsigned 10-bit RGB image data. The multi-axis color correction unit 880 may implement non-linear color rendering. For example, the multi-axis color correction unit 880 perform color non-linear rendering, such as in Hue, Saturation, Value (HSV) space.

Although not shown in FIG. 8, the RGB-to-YUV unit 800 may include other elements, such as a unit to convert the RGB format image data to YUV format image data. The RGB-to-YUV unit 800 may output the image data, such as in an unsigned 10-bit YUV format as indicated at 890.

Figure 9:
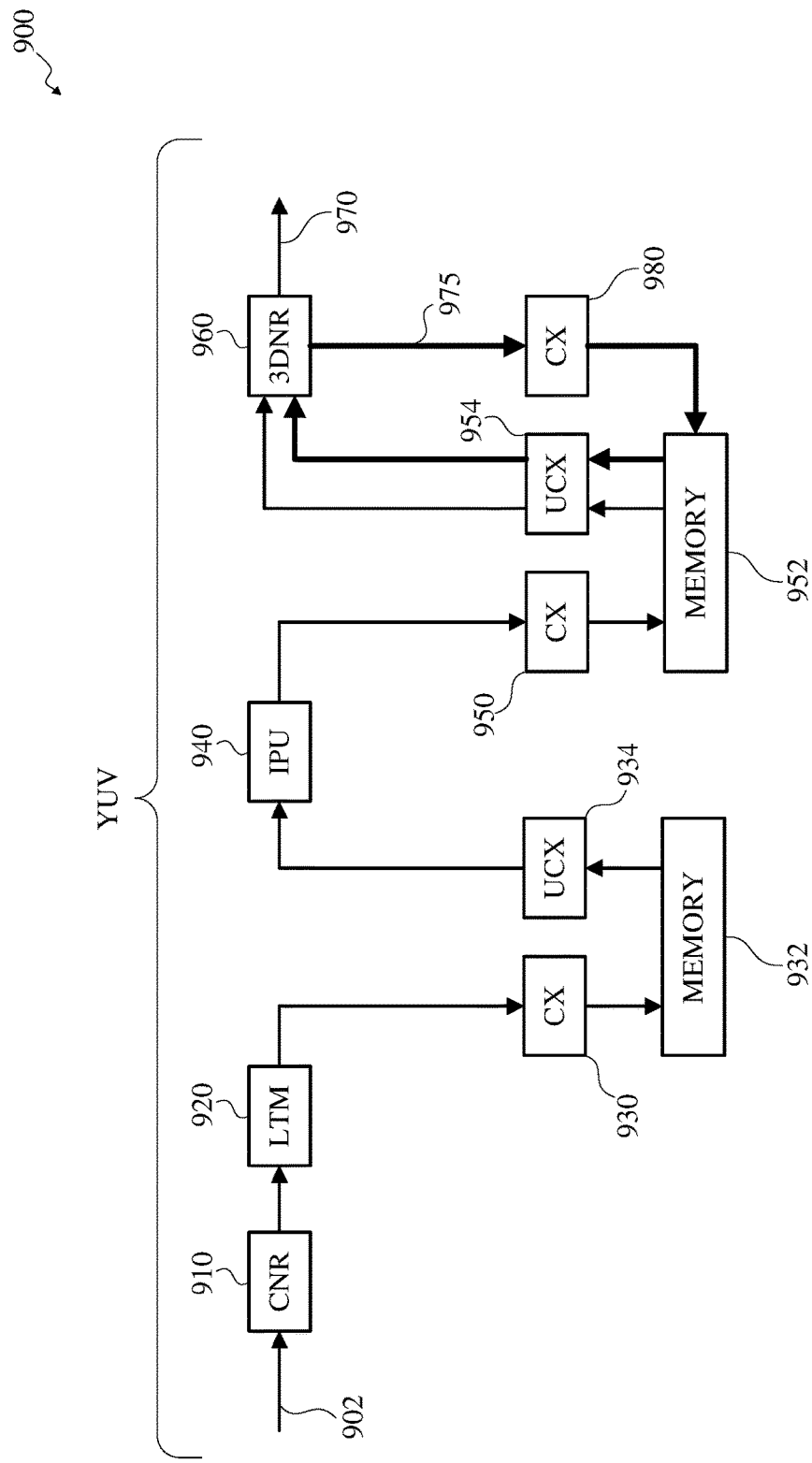
FIG. 9 is a functional block diagram of an example of another image processing and coding pipeline portion in accordance with implementations of this disclosure.

FIG. 9 is a functional block diagram of an example of another image processing and coding pipeline portion 900 in accordance with implementations of this disclosure. The Image processing and coding pipeline portion 900 may be included in an image capture device, such as the image capture device 200 shown in FIG. 2, or an image capture apparatus, such as the image capture apparatus 110 shown in FIG. 1 or the image capture apparatus 300 shown in FIG. 3. The Image processing and coding pipeline portion 900 shown in FIG. 9 may be included in an image processing pipeline including High Dynamic Range (HDR) processing for still image data and video data.

The Image processing and coding pipeline portion 900 may be similar to the image processing and coding pipeline 400 shown in FIG. 4, or a portion thereof, except as described herein or otherwise clear from context. The Image processing and coding pipeline portion 900 may be similar to the image signal processor 500 shown in FIG. 5, or a portion thereof, except as described herein or otherwise clear from context. For example, an image processor may include the RGB-to-YUV unit 800 subsequent to the image processing and coding pipeline portion 600 shown in FIG. 6 or subsequent to the image processing and coding pipeline portion 700 shown in FIG. 7, and may include the Image processing and coding pipeline portion 900 shown in FIG. 9, subsequent to the RGB-to-YUV image processing and coding pipeline portion.

The portion of the Image processing and coding pipeline portion 900 may receive HDR image data 902, such as the HDR image data 890 output as shown in FIG. 8. The HDR image data 902 may be unsigned 10-bit YUV image data.

As shown in FIG. 9, the portion of the Image processing and coding pipeline portion 900 includes a Chroma Noise Reduction (CNR) unit 910. The Chroma Noise Reduction unit 910 may receive the HDR image data 902, such as from the RGB-to-YUV image processing and coding pipeline portion shown in FIG. 8. The HDR image data received at the Chroma Noise Reduction unit 910 may be unsigned 10-bit YUV image data. The Chroma Noise Reduction unit 910 may implement chroma denoising, luma denoising, or both.

As shown in FIG. 9, the portion of the Image processing and coding pipeline portion 900 includes a Local Tone Mapping (LTM) unit 920. The Chroma Noise Reduction 910 may output the HDR image data to the Local Tone Mapping unit 920 and the Local Tone Mapping unit 920 may receive the HDR image data from the Chroma Noise Reduction 910. The HDR image data received at the Local Tone Mapping unit 920 may be unsigned 10-bit YUV image data. The Local Tone Mapping unit 920 may enhance detail and may omit introducing artifacts. For example, the Local Tone Mapping unit 920 may apply tone mapping, which may be similar to applying an unsharp-mask.

In some implementations, a low-resolution map for local tone mapping may be obtained prior to the Local Tone Mapping unit 920, and the low-resolution map may be processed, prior to Local Tone Mapping and may be used in Local Tone Mapping. Processing the low-resolution map may include processing by the image processing unit 940 for warped images. Processing the low-resolution map may include processing the low-resolution map in response to gamma correction, tone control, or both.

As shown in FIG. 9, the portion of the image processing and coding pipeline portion 900 includes a first image compression (CX) unit 930. The Local Tone Mapping unit 920 may output the HDR image data to the first image compression unit 930 and the first image compression unit 930 may receive the HDR image data from the Local Tone Mapping unit 920. The first image compression unit 930 may compress the HDR image data. For example, the first image compression unit 930 may compress the unsigned 10-bit YUV format image data to an unsigned N-bit YUV format.

As shown in FIG. 9, the portion of the image processing and coding pipeline portion 900 includes a first memory, such as RAM, unit 932. The first image compression unit 930 may output the HDR image data to the first memory unit 932 and the first memory unit 932 may receive the HDR image data from the first image compression unit 930. The first memory unit 932 may store the HDR image data, such as in the unsigned N-bit YUV format.

As shown in FIG. 9, the portion of the image processing and coding pipeline portion 900 includes a first image uncompression (UCX) unit 934. The first memory unit 932 may output the HDR image data to the first image uncompression unit 934 and the first image uncompression unit 934 may receive the HDR image data from the first memory unit 932. The first image uncompression unit 934 may uncompress the HDR image data. For example, the first image uncompression unit 934 may uncompress the unsigned N-bit YUV format image data to the unsigned 10-bit YUV format.

As shown in FIG. 9, the portion of the image processing and coding pipeline portion 900 includes an image processing unit 940. The first image uncompression unit 934 may output the HDR image data to the image processing unit 940 and the image processing unit 940 may receive the HDR image data from the first image uncompression unit 934, such as in the unsigned 10-bit YUV format. The image processing unit 940 may perform warping, image registration, electronic image stabilization, or a combination thereof.

As shown in FIG. 9, the portion of the image processing and coding pipeline portion 900 includes a second image compression (CX) unit 950. The image processing unit 940 may output the HDR image data to the second image compression unit 950 and the second image compression unit 950 may receive the HDR image data from the image processing unit 940. The second image compression unit 950 may compress the HDR image data. For example, the second image compression unit 950 may compress the unsigned 10-bit YUV format image data to an unsigned N-bit YUV format.

As shown in FIG. 9, the portion of the image processing and coding pipeline portion 900 includes a second memory, such as RAM, unit 952. The second image compression unit 950 may output the HDR image data to the second memory unit 952 and the second memory unit 952 may receive the HDR image data from the second image compression unit 950. The second memory unit 952 may store the HDR image data, such as in the unsigned N-bit YUV format.

As shown in FIG. 9, the portion of the image processing and coding pipeline portion 900 includes a second image uncompression (UCX) unit 954. The second memory unit 952 may output the HDR image data to the second image uncompression unit 954 and the second image uncompression unit 954 may receive the HDR image data from the second memory unit 952. The second image uncompression unit 954 may uncompress the HDR image data. For example, the second image uncompression unit 954 may uncompress the unsigned N-bit YUV format image data to the unsigned 10-bit YUV format.

As shown in FIG. 9, the portion of the image processing and coding pipeline portion 900 includes a three-dimensional noise reduction (3DNR) unit 960. The second image uncompression unit 954 may output the HDR image data to the three-dimensional noise reduction unit 960 and the three-dimensional noise reduction unit 960 may receive the HDR image data from the second image uncompression unit 954, such as in the unsigned 10-bit YUV format. The three-dimensional noise reduction unit 960 may reduce image noise for a frame based on one or more previously processed frames. The three-dimensional noise reduction unit 960 may output processed image data as indicated at 970. The three-dimensional noise reduction unit 960 may output three-dimensional noise reduction data as indicated at 975. A data path for the three-dimensional noise reduction data is shown using bold directional lines for clarity.

As shown in FIG. 9, the portion of the image processing and coding pipeline portion 900 includes a third image compression (CX) unit 980. The three-dimensional noise reduction unit 960 may output three-dimensional noise reduction data as indicated at 975 to the third image compression unit 980 and the third image compression unit 980 may receive the three-dimensional noise reduction data from the three-dimensional noise reduction data unit 960. The third image compression unit 980 may compress the three-dimensional noise reduction data. For example, the third image compression unit 980 may compress the three-dimensional noise reduction data to an unsigned N-bit YUV format. The third image compression unit 980 may output the three-dimensional noise reduction data to the second memory unit 952 and the second memory unit 952 may receive the three-dimensional noise reduction data from the third image compression unit 980. The second memory unit 952 may store the three-dimensional noise reduction data, such as in the unsigned N-bit YUV format. The second memory unit 952 may output the three-dimensional noise reduction data to the second image uncompression unit 954 and the second image uncompression unit 954 may receive the three-dimensional noise reduction data from the second memory unit 952. The second image uncompression unit 954 may uncompress the three-dimensional noise reduction data. For example, the second image uncompression unit 954 may uncompress the unsigned N-bit YUV format three-dimensional noise reduction data to the unsigned 10-bit YUV format.

Although the image compression units 630, 650 shown in FIG. 6, the image compression units 724, 732, 744, 752 shown in FIG. 7, and the image compression units 930, 950, 980 shown in FIG. 9 are shown separately, any of the image compression units 630, 650 shown in FIG. 6, the image compression units 724, 732, 744, 752 shown in FIG. 7, and the image compression units 930, 950, 980 shown in FIG. 9 may be implemented as one or more combined units. Although the memory units 632, 652 shown in FIG. 6, the memory units 726, 734, 746, 754 shown in FIG. 7, and the memory units 932, 952 shown in FIG. 9 are shown separately, any of the memory units 632, 652 shown in FIG. 6, the memory units 726, 734, 746, 754 shown in FIG. 7, and the memory units 932, 952 shown in FIG. 9 may be implemented as one or more combined units. Although the image uncompression units 634, 654 shown in FIG. 6, the image uncompression units 728, 736, 748, 756 shown in FIG. 7, and the image uncompression units 934, 954 shown in FIG. 9 are shown separately, any of the image uncompression units 634, 654 shown in FIG. 6, the image uncompression units 728, 736, 748, 756 shown in FIG. 7, and the image uncompression units 934, 954 shown in FIG. 9 may be implemented as one or more combined units.

Implementations of sequential (still) HDR may implement Multi-Frame Noise Reduction (MFNR), which may include using multiple, such as four, still images to reduce noise. Implementations of sequential (still) HDR may that omit Multi-Frame Noise Reduction may omit one or more of the first image compression unit 930, the first memory unit 932, the first image uncompression unit 934, the image processing unit 940, the second image compression unit 950, the second memory unit 952, the second image uncompression unit 954, the three-dimensional noise reduction unit 960, and the third image compression unit 980.

Figure 10:
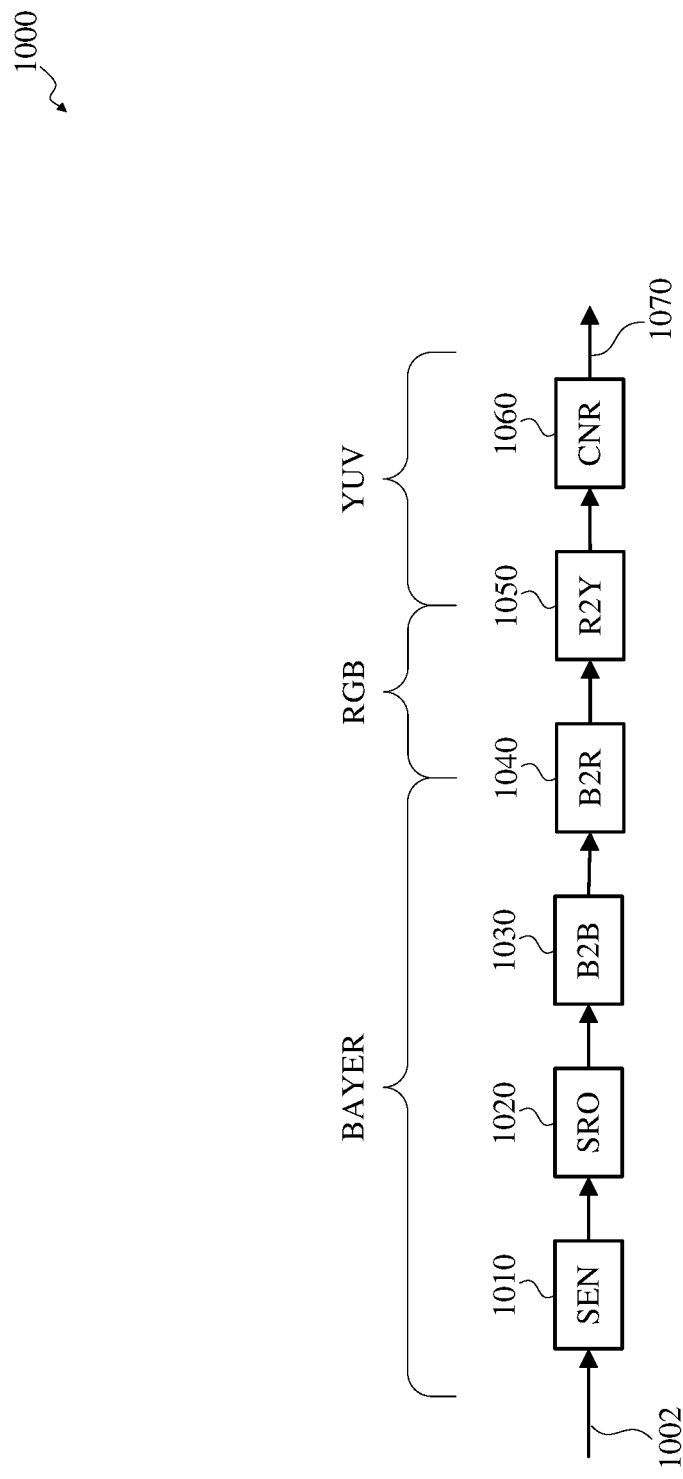
FIG. 10 is a functional block diagram of an example of an image processing and coding pipeline portion for three-dimensional noise reduction in accordance with implementations of this disclosure.

FIG. 10 is a functional block diagram of an example of an image processing and coding pipeline portion 1000 for three-dimensional noise reduction in accordance with implementations of this disclosure. The image processing and coding pipeline portion 1000 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 1000 may be similar to the image processing and coding pipelines, or pipeline portions, shown in FIGS. 4-9, except as described herein or otherwise clear from context. The portion of the image processing and coding pipeline portion 1000 shown in FIG. 10 may implement three-dimensional noise reduction including electronic image stabilization, which may include image quality enhancements and power efficiency enhancements.

The portion of the image processing and coding pipeline portion 1000 may receive an image signal 1002, such as from one or more image sensors (not shown), such as the image sensor 230 shown in FIG. 2. For example, the image signal 1002 may be received as input image data. The input image signal 1002 may be received in a defined format, such an unsigned 14-bit Bayer format.

As shown in FIG. 10, the portion of the image processing and coding pipeline portion 1000 includes a sensor input (SEN) unit 1010 for receiving the image signal 1002 as input image data. The sensor input unit 1010 may be similar to the sensor input units 610, 612, 710, 712 shown in FIGS. 6 and 7, except as described herein or otherwise clear from context. The sensor input unit 1010 may process the input image data and may output image data.

As shown in FIG. 10, the portion of the image processing and coding pipeline portion 1000 includes a sensor readout (SRO) unit 1020. The sensor input unit 1010 may output the input image data to the sensor readout unit 1020 and the sensor readout unit 1020 may receive the input image data from the sensor input unit 1010. The sensor readout unit 1020 may be similar to the sensor readout units 620, 622, 720, 722 shown in FIGS. 6 and 7, except as described herein or otherwise clear from context. The sensor readout unit 1020 may output the image data as 15-bit Bayer format data. Although not shown in FIG. 10, the image data output by the sensor readout unit 1020 may be stored in memory, which may include compression of the image data, as described in relation to FIGS. 6 and 7. The sensor readout unit 1020 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 10, the portion of the image processing and coding pipeline portion 1000 includes a Bayer-to-Bayer (B2B) unit 1030. The sensor readout unit 1020 may output the image data to the Bayer-to-Bayer unit 1030 and the Bayer-to-Bayer unit 1030 may receive the image data from the sensor readout unit 1020. The Bayer-to-Bayer unit 1030 may convert the 15-bit Bayer format data to the 14-bit Bayer format. The Bayer-to-Bayer unit 1030 may be similar to the Bayer-to-Bayer units 640, 730 shown in FIGS. 6 and 7, except as described herein or otherwise clear from context. The Bayer-to-Bayer unit 1030 may output the image data as 14-bit Bayer format data.

As shown in FIG. 10, the portion of the image processing and coding pipeline portion 1000 includes a Bayer-to-RGB (B2R) unit 1040. The Bayer-to-Bayer unit 1030 may output the image data to the Bayer-to-RGB unit 1040 and the Bayer-to-RGB unit 1040 may receive the image data from the Bayer-to-Bayer unit 1030. The Bayer-to-RGB unit 1040 may convert the image data from Bayer format to an RGB format, such as a 14-bit RGB format. The Bayer-to-RGB unit 1040 may be similar to the Bayer-to-RGB units 660, 662, 740, 742 shown in FIGS. 6 and 7, except as described herein or otherwise clear from context.

As shown in FIG. 10, the portion of the image processing and coding pipeline portion 1000 includes an RGB-to-YUV (R2Y) unit 1050. The Bayer-to-RGB unit 1040 may output the image data to the RGB-to-YUV unit 1050 and the RGB-to-YUV unit 1050 may receive the image data from the Bayer-to-RGB unit 1040. The RGB-to-YUV unit 1050 may convert the image data from RGB format to a YUV format, such as a 10-bit YUV format. The RGB-to-YUV unit 1050 may be similar to the RGB-to-YUV unit 800 shown in FIG. 8, except as described herein or otherwise clear from context.

As shown in FIG. 10, the portion of the image processing and coding pipeline portion 1000 includes a Chroma Noise Reduction (CNR) unit 1060. The RGB-to-YUV unit 1050 may output the image data to the Chroma Noise Reduction unit 1060 and the Chroma Noise Reduction unit 1060 may receive the image data from the RGB-to-YUV unit 1050. The HDR image data received at the Chroma Noise Reduction unit 1060 may be unsigned 10-bit YUV image data. The Chroma Noise Reduction unit 1060 may be similar to the Chroma Noise Reduction unit 910 shown in FIG. 9, except as described herein or otherwise clear from context. The Chroma Noise Reduction unit 1060 may output partially processed image data as indicated at 1070.

Figure 11:
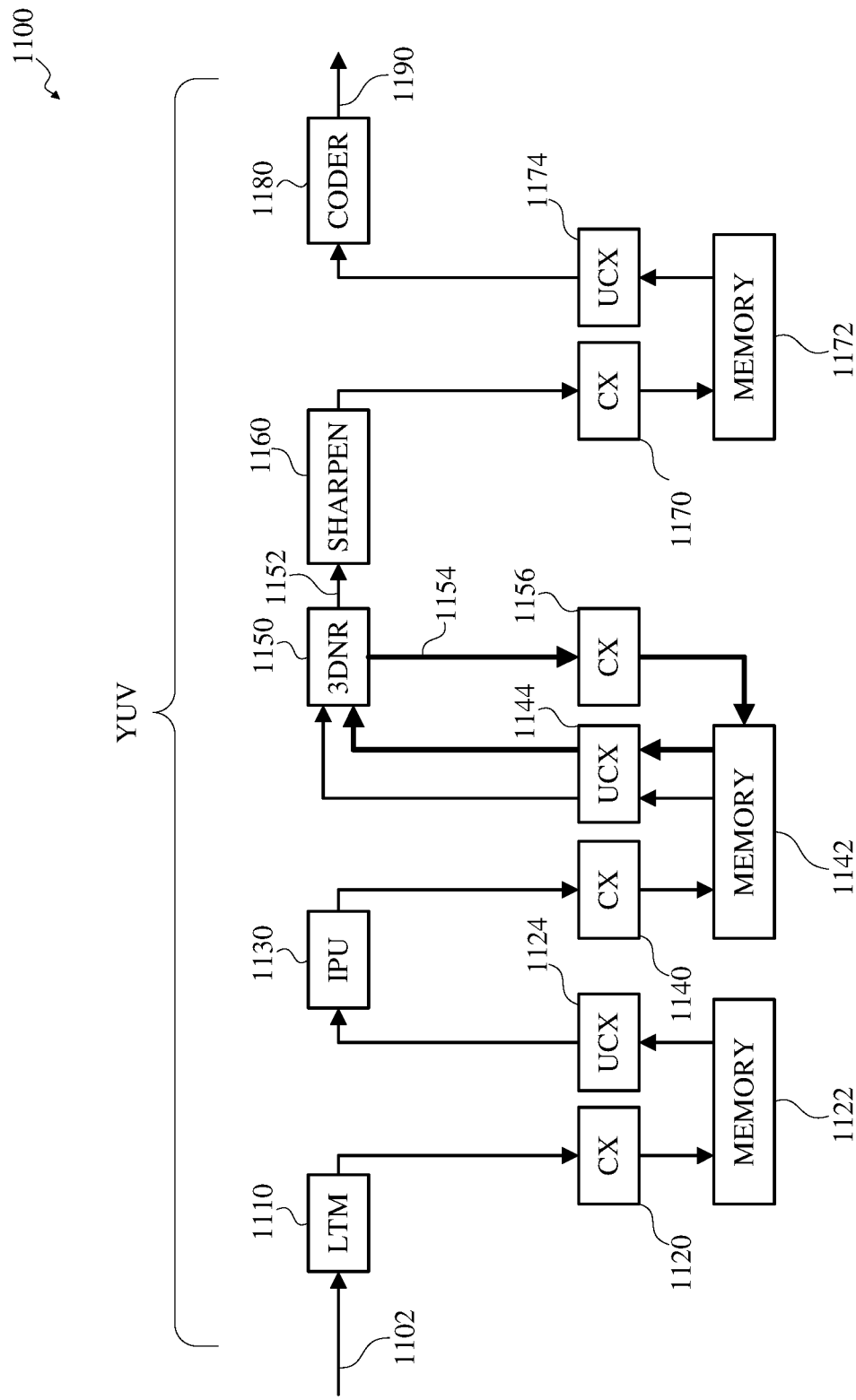
FIG. 11 is a functional block diagram of an example of another image processing and coding pipeline portion for three-dimensional noise reduction in accordance with implementations of this disclosure.

FIG. 11 is a functional block diagram of an example of another image processing and coding pipeline portion 1100 for three-dimensional noise reduction in accordance with implementations of this disclosure. The image processing and coding pipeline portion 1100 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 1100 may be similar to the image processing and coding pipelines, or pipeline portions, shown in FIGS. 4-9, except as described herein or otherwise clear from context. The portion of the image processing and coding pipeline portion 1100 shown in FIG. 11 may implement three-dimensional noise reduction including electronic image stabilization, which may include image quality enhancements and power efficiency enhancements.

The portion of the image processing and coding pipeline portion 1100 may receive a partially processed image signal 1102, such as from the Chroma Noise Reduction unit 1060 shown in FIG. 10. For example, the image signal 1102 may be received in a 10-bit YUV format.

As shown in FIG. 11, the portion of the image processing and coding pipeline portion 1100 includes a Local Tone Mapping (LTM) unit 1110. The Local Tone Mapping unit 1110 may be similar to the Local Tone Mapping unit 920 shown in FIG. 9, except as described herein or otherwise clear from context.

As shown in FIG. 11, the portion of the image processing and coding pipeline portion 1100 includes a first image compression (CX) unit 1120. The Local Tone Mapping unit 1110 may output the partially processed image data to the first image compression unit 1120 and the first image compression unit 1120 may receive the partially processed image data from the Local Tone Mapping unit 1110. The first image compression unit 1120 may be similar to the first image compression unit 930 shown in FIG. 9, except as described herein or otherwise clear from context.

As shown in FIG. 11, the portion of the image processing and coding pipeline portion 1100 includes a first memory, such as RAM, unit 1122. The first image compression unit 1120 may output the partially processed image data to the first memory unit 1122 and the first memory unit 1122 may receive the partially processed image data from the first image compression unit 1120. The first memory unit 1122 may store the partially processed image data, such as in the unsigned N-bit YUV format. The first memory unit 1122 may be similar to the first image memory 932 shown in FIG. 9, except as described herein or otherwise clear from context.

As shown in FIG. 11, the portion of the image processing and coding pipeline portion 1100 includes a first image uncompression (UCX) unit 1124. The first memory unit 1122 may output the partially processed image data to the first image uncompression unit 1124 and the first image uncompression unit 1124 may receive the partially processed image data from the first memory unit 1122. The first image uncompression unit 1124 may uncompress the partially processed image data. For example, the first image uncompression unit 1124 may uncompress the unsigned N-bit YUV format image data to the unsigned 10-bit YUV format. The first image uncompression unit 1124 may be similar to the first image uncompression unit 934 shown in FIG. 9, except as described herein or otherwise clear from context.

As shown in FIG. 11, the portion of the image processing and coding pipeline portion 1100 includes an Image Processing (IPU) unit 1130. The first image uncompression unit 1124 may output the partially processed image data to the image processing unit 1130 and the image processing unit 1130 may receive the partially processed image data from the first image uncompression unit 1124, such as in the unsigned 10-bit YUV format. The image processing unit 1130 may be similar to the image processing unit 940 shown in FIG. 9, except as described herein or otherwise clear from context.

As shown in FIG. 11, the portion of the image processing and coding pipeline portion 1100 includes a second image compression (CX) unit 1140. The image processing unit 1130 may output the partially processed image data to the second image compression unit 1140 and the second image compression unit 1140 may receive the partially processed image data from the image processing unit 1130. The second image compression unit 1140 may be similar to the second image compression unit 950 shown in FIG. 9, except as described herein or otherwise clear from context.

As shown in FIG. 11, the portion of the image processing and coding pipeline portion 1100 includes a second memory, such as RAM, unit 1142. The second image compression unit 1140 may output the partially processed image data to the second memory unit 1142 and the second memory unit 1142 may receive the partially processed image data from the second image compression unit 1140. The second memory unit 1142 may be similar to the second memory unit 952 shown in FIG. 9, except as described herein or otherwise clear from context.

As shown in FIG. 11, the portion of the image processing and coding pipeline portion 1100 includes a second image uncompression (UCX) unit 1144. The second memory unit 1142 may output the partially processed image data to the second image uncompression unit 1144 and the second image uncompression unit 1144 may receive the partially processed image data from the second memory unit 1142. The second image uncompression unit 1144 may be similar to the second image uncompression unit 954 shown in FIG. 9, except as described herein or otherwise clear from context.

As shown in FIG. 11, the portion of the image processing and coding pipeline portion 1100 includes a three-dimensional noise reduction (3DNR) unit 1150. The second image uncompression unit 1144 may output the partially processed image data to the three-dimensional noise reduction unit 1150 and the three-dimensional noise reduction unit 1150 may receive the partially processed image data from the second image uncompression unit 1144, such as in the unsigned 10-bit YUV format. The three-dimensional noise reduction unit 1150 be similar to the three-dimensional noise reduction unit 960 shown in FIG. 9, except as described herein or otherwise clear from context. The three-dimensional noise reduction unit 1150 may output partially processed image data as indicated at 1152. The three-dimensional noise reduction unit 1150 may output three-dimensional noise reduction data as indicated at 1154. A data path for the three-dimensional noise reduction data is shown using bold directional lines for clarity.

As shown in FIG. 11, the portion of the image processing and coding pipeline portion 1100 includes a third image compression (CX) unit 1156. The three-dimensional noise reduction unit 1150 may output three-dimensional noise reduction data as indicated at 1154 to the third image compression unit 1156 and the third image compression unit 1156 may receive the three-dimensional noise reduction data from the three-dimensional noise reduction data unit 1150. The third image compression unit 1156 may be similar to the third image compression unit 980 shown in FIG. 9, except as described herein or otherwise clear from context. The third image compression unit 1156 may output the three-dimensional noise reduction data to the second memory unit 1142 and the second memory unit 1142 may receive the three-dimensional noise reduction data from the third image compression unit 1156. The second memory unit 1142 may store the three-dimensional noise reduction data, such as in the unsigned N-bit YUV format. The second memory unit 1142 may output the three-dimensional noise reduction data to the second image uncompression unit 1144 and the second image uncompression unit 1144 may receive the three-dimensional noise reduction data from the second memory unit 1142. The second image uncompression unit 1144 may uncompress the three-dimensional noise reduction data. For example, the second image uncompression unit 1144 may uncompress the unsigned N-bit YUV format three-dimensional noise reduction data to the unsigned 10-bit YUV format.

As shown in FIG. 11, the portion of the image processing and coding pipeline portion 1100 includes an image sharpening (sharpen) unit 1160. The three-dimensional noise reduction unit 1150 may output the partially processed image data to the image sharpening unit 1160 and the image sharpening unit 1160 may receive the partially processed image data from the three-dimensional noise reduction unit 1150. The sharpening unit 1160 may recover image detail reduced by temporal denoising or warping.

As shown in FIG. 11, the portion of the image processing and coding pipeline portion 1100 includes a third image compression (CX) unit 1170. The image sharpening unit 1160 may output the partially processed image data to the third image compression unit 1170 and the third image compression unit 1170 may receive the partially processed image data from the image sharpening unit 1160. The third image compression unit 1170 may be similar to the first image compression unit 1120 or the second image compression unit 1140, except as described herein or otherwise clear from context.

As shown in FIG. 11, the portion of the image processing and coding pipeline portion 1100 includes a third memory, such as RAM, unit 1172. The third image compression unit 1170 may output the partially processed image data to the third memory unit 1172 and the third memory unit 1172 may receive the partially processed image data from the third image compression unit 1170. The third memory unit 1172 may be similar to the first memory unit 1122 or the second memory unit 1142, except as described herein or otherwise clear from context.

As shown in FIG. 11, the portion of the image processing and coding pipeline portion 1100 includes a third image uncompression (UCX) unit 1174. The third memory unit 1172 may output the partially processed image data to the third image uncompression unit 1174 and the third image uncompression unit 1174 may receive the partially processed image data from the third memory unit 1172. The third image uncompression unit 1174 may be similar to the first image uncompression unit 1124 or the second image uncompression unit 1144, except as described herein or otherwise clear from context.

As shown in FIG. 11, the portion of the image processing and coding pipeline portion 1100 includes an encoding (coder) unit 1180. The third image uncompression unit 1174 may output the partially processed image data to the encoding unit 1180 and the encoding unit 1180 may receive the partially processed image data from the third image uncompression unit 1174. The encoding unit 1180 may output encoded image data as indicated at 1190.

Figure 12:
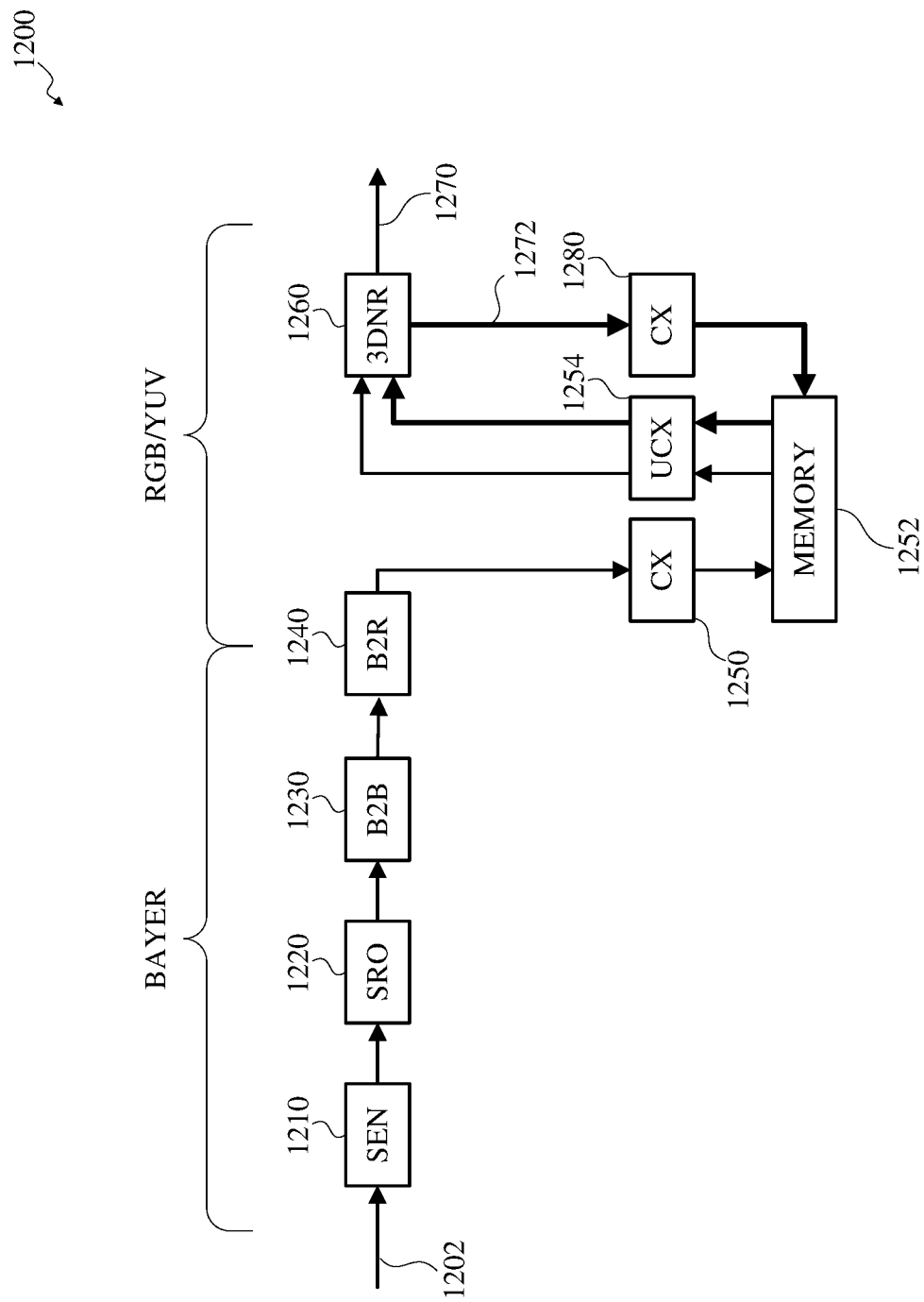
FIG. 12 is a functional block diagram of an example of another image processing and coding pipeline portion for three-dimensional noise reduction in accordance with implementations of this disclosure.

FIG. 12 is a functional block diagram of an example of another image processing and coding pipeline portion 1200 for three-dimensional noise reduction in accordance with implementations of this disclosure. The image processing and coding pipeline portion 1200 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 1200 may be similar to the image processing and coding pipelines, or pipeline portions, shown in FIGS. 4-9, except as described herein or otherwise clear from context. The portion of the image processing and coding pipeline portion 1200 shown in FIG. 12 may implement three-dimensional noise reduction omitting electronic image stabilization.

The portion of the image processing and coding pipeline portion 1200 may receive an image signal 1202, such as from one or more image sensors (not shown), such as the image sensor 230 shown in FIG. 2. For example, the image signal 1202 may be received as input image data. The input image signal 1202 may be received in a defined format, such an unsigned 14-bit Bayer format.

As shown in FIG. 12, the portion of the image processing and coding pipeline portion 1200 includes a sensor input (SEN) unit 1210 for receiving the image signal 1202 as input image data. The sensor input unit 1210 may be similar to the sensor input units 610, 612, 710, 712, 1010 shown in FIGS. 6, 7 and 10, except as described herein or otherwise clear from context. The sensor input unit 1210 may process the input image data and may output image data.

As shown in FIG. 12, the portion of the image processing and coding pipeline portion 1200 includes a sensor readout (SRO) unit 1220. The sensor input unit 1210 may output the input image data to the sensor readout unit 1220 and the sensor readout unit 1220 may receive the input image data from the sensor input unit 1210. The sensor readout unit 1220 may be similar to the sensor readout units 620, 622, 720, 722, 1020 shown in FIGS. 6, 7, and 10, except as described herein or otherwise clear from context. The sensor readout unit 1220 may output the image data as 15-bit Bayer format data. Although not shown in FIG. 12, the image data output by the sensor readout unit 1220 may be stored in memory, which may include compression of the image data, as described in relation to FIGS. 6 and 7. The sensor readout unit 1220 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 12, the portion of the image processing and coding pipeline portion 1200 includes a Bayer-to-Bayer (B2B) unit 1230. The sensor readout unit 1220 may output the image data to the Bayer-to-Bayer unit 1230 and the Bayer-to-Bayer unit 1230 may receive the image data from the sensor readout unit 1220. The Bayer-to-Bayer unit 1230 may convert the 15-bit Bayer format data to the 14-bit Bayer format. The Bayer-to-Bayer unit 1230 may be similar to the Bayer-to-Bayer units 640, 730, 1030 shown in FIGS. 6, 7, and 10, except as described herein or otherwise clear from context. The Bayer-to-Bayer unit 1230 may output the image data as 14-bit Bayer format data.

As shown in FIG. 12, the portion of the image processing and coding pipeline portion 1200 includes a Bayer-to-RGB (B2R) unit 1240. The Bayer-to-Bayer unit 1230 may output the image data to the Bayer-to-RGB unit 1240 and the Bayer-to-RGB unit 1240 may receive the image data from the Bayer-to-Bayer unit 1230. The Bayer-to-RGB unit 1240 may convert the image data from Bayer format to an RGB format, such as a 14-bit RGB format. The Bayer-to-RGB unit 1240 may be similar to the Bayer-to-RGB units 660, 662, 740, 742, 1040 shown in FIGS. 6, 7, and 10, except as described herein or otherwise clear from context. Although not shown expressly in FIG. 12, the Bayer-to-RGB unit 1240 may include an RGB-to-YUV converter, and may convert the RGB format data to YUV format data, and may output YUV format data, such as 14-bit YUV format data, or may convert from Bayer to YUV format.

As shown in FIG. 12, the portion of the image processing and coding pipeline portion 1200 includes a first image compression (CX) unit 1250. The Bayer-to-RGB unit 1240 may output the partially processed image data, such as in the 14-bit RGB format or the 14-bit YUV format, to the first image compression unit 1250 and the first image compression unit 1250 may receive the partially processed image data from the Bayer-to-RGB unit 1240. The first image compression unit 1250 may be similar to the second image compression unit 1140 shown in FIG. 11, except as described herein or otherwise clear from context. RGB format data may be compressed to a compressed RGB format. YUV format data may be compressed to a compressed YUV format.

As shown in FIG. 12, the portion of the image processing and coding pipeline portion 1200 includes a memory, such as RAM, unit 1252. The first image compression unit 1250 may output the partially processed image data to the memory unit 1252 and the memory unit 1252 may receive the partially processed image data from the first image compression unit 1250. The memory unit 1252 may be similar to the second memory unit 1142 shown in FIG. 11, except as described herein or otherwise clear from context.

As shown in FIG. 12, the portion of the image processing and coding pipeline portion 1200 includes an image uncompression (UCX) unit 1254. The memory unit 1252 may output the partially processed image data to the image uncompression unit 1254 and the image uncompression unit 1254 may receive the partially processed image data from the memory unit 1252. The image uncompression unit 1254 may be similar to the second image uncompression unit 1144 shown in FIG. 11, except as described herein or otherwise clear from context.

As shown in FIG. 12, the portion of the image processing and coding pipeline portion 1200 includes a three-dimensional noise reduction (3DNR) unit 1260. The image uncompression unit 1254 may output the partially processed image data to the three-dimensional noise reduction unit 1260 and the three-dimensional noise reduction unit 1260 may receive the partially processed image data, such as in the 14-bit RGB format or the 14-bit YUV format, from the image uncompression unit 1254. The three-dimensional noise reduction unit 1260 may be similar to the three-dimensional noise reduction unit 1150 shown in FIG. 11, except as described herein or otherwise clear from context. The three-dimensional noise reduction unit 1260 may output partially processed image data as indicated at 1270. The three-dimensional noise reduction unit 1260 may output three-dimensional noise reduction data as indicated at 1272. For example, the three-dimensional noise reduction unit 1260 may receive 14-bit YUV format data and may output 14-bit RGB format data as indicated at 1270 and 14-bit YUV format data as indicated at 1272. A data path for the three-dimensional noise reduction data is shown using bold directional lines for clarity.

As shown in FIG. 12, the portion of the image processing and coding pipeline portion 1200 includes a second image compression (CX) unit 1280. The three-dimensional noise reduction unit 1260 may output three-dimensional noise reduction data as indicated at 1272 to the second image compression unit 1280 and the second image compression unit 1280 may receive the three-dimensional noise reduction data from the three-dimensional noise reduction data unit 1260. The second image compression unit 1280 may be similar to the third image compression unit 1156 shown in FIG. 11, except as described herein or otherwise clear from context. The second image compression unit 1280 may output the three-dimensional noise reduction data to the memory unit 1252 and the memory unit 1252 may receive the three-dimensional noise reduction data from the second image compression unit 1280. The memory unit 1252 may store the three-dimensional noise reduction data, such as in the X-bit RGB format or the N-bit YUV format. The memory unit 1252 may output the three-dimensional noise reduction data to the image uncompression unit 1254 and the image uncompression unit 1254 may receive the three-dimensional noise reduction data from the memory unit 1252. The image uncompression unit 1254 may uncompress the three-dimensional noise reduction data. For example, the image uncompression unit 1254 may uncompress the X-bit RGB format three-dimensional noise reduction data to the 14-bit RGB format, or may uncompress the or the N-bit YUV format three-dimensional noise reduction data to the 14-bit YUV format.

Figure 13:
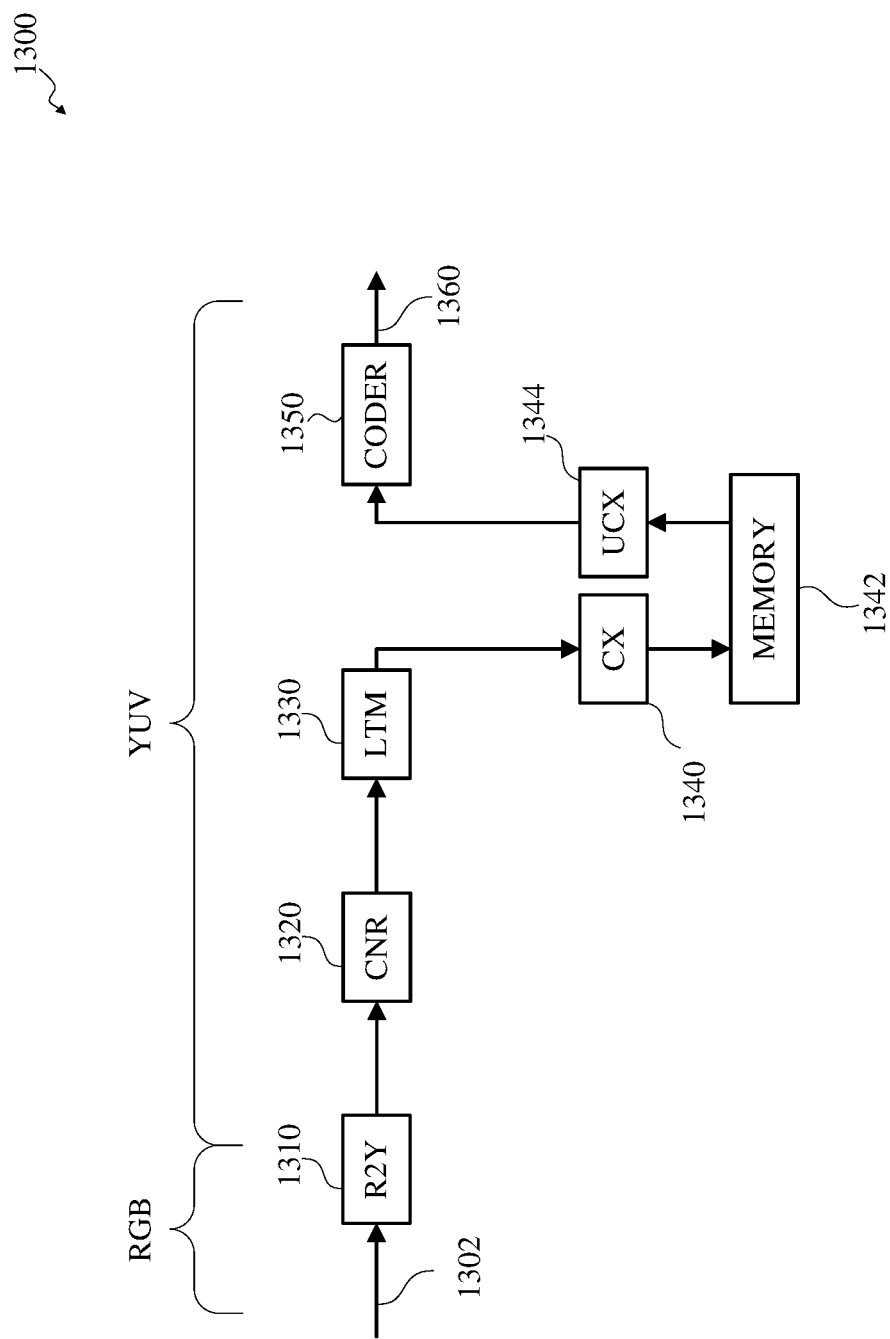
FIG. 13 is a functional block diagram of an example of another image processing and coding pipeline portion in accordance with implementations of this disclosure.

FIG. 13 is a functional block diagram of an example of another image processing and coding pipeline portion 1300 in accordance with implementations of this disclosure. The Image processing and coding pipeline portion 1300 may be included in an image capture device, such as the image capture device 200 shown in FIG. 2, or an image capture apparatus, such as the image capture apparatus 110 shown in FIG. 1 or the image capture apparatus 300 shown in FIG. 3. The Image processing and coding pipeline portion 1300 shown in FIG. 13 may be included in an image processing pipeline including three-dimensional noise reduction omitting electronic image stabilization.

The Image processing and coding pipeline portion 1300 may be similar to the image processing and coding pipeline 400 shown in FIG. 4, or a portion thereof, except as described herein or otherwise clear from context. The Image processing and coding pipeline portion 1300 may be similar to the image signal processor 500 shown in FIG. 5, or a portion thereof, except as described herein or otherwise clear from context. For example, an image processor may include the image processing and coding pipeline portion 1300 subsequent to the image processing and coding pipeline portion 1200 shown in FIG. 12.

The portion of the Image processing and coding pipeline portion 1300 may receive image data 1302, such as the image data 1270 output as shown in FIG. 12. The image data 1302 may be 14-bit RGB image data.

As shown in FIG. 13, the portion of the image processing and coding pipeline portion 1300 includes an RGB-to-YUV (R2Y) unit 1310. The RGB-to-YUV unit 1310 may receive the image data 1302. The RGB-to-YUV unit 1310 may convert the image data from RGB format to a YUV format, such as a 10-bit YUV format. The RGB-to-YUV unit 1310 may be similar to the RGB-to-YUV unit 800 shown in FIG. 8, except as described herein or otherwise clear from context.

As shown in FIG. 13, the portion of the image processing and coding pipeline portion 1300 includes a Chroma Noise Reduction (CNR) unit 1320. The RGB-to-YUV unit 1310 may output the image data to the Chroma Noise Reduction unit 1320 and the Chroma Noise Reduction unit 1320 may receive the image data from the RGB-to-YUV unit 1310. The image data received at the Chroma Noise Reduction unit 1320 may be 10-bit YUV image data. The Chroma Noise Reduction unit 1320 may be similar to the Chroma Noise Reduction unit 1060 shown in FIG. 10, except as described herein or otherwise clear from context.

As shown in FIG. 13, the portion of the Image processing and coding pipeline portion 1300 includes a Local Tone Mapping (LTM) unit 1330. The Chroma Noise Reduction 1320 may output the image data to the Local Tone Mapping unit 1330 and the Local Tone Mapping unit 1330 may receive the image data from the Chroma Noise Reduction 1320. The image data received at the Local Tone Mapping unit 1330 may be 10-bit YUV image data. The Local Tone Mapping unit 1330 may enhance detail and may omit introducing artifacts. For example, the Local Tone Mapping unit 1330 may apply tone mapping, which may be similar to applying an unsharp-mask.

In some implementations, a low-resolution map for local tone mapping may be obtained prior to the Local Tone Mapping unit 1330, and the low-resolution map may be processed prior to Local Tone Mapping and may be used in Local Tone Mapping. Processing the low-resolution map may include warp processing. Processing the low-resolution map may include processing the low-resolution map in response to gamma correction, tone control, or both.

As shown in FIG. 13, the portion of the image processing and coding pipeline portion 1300 includes an image compression (CX) unit 1330. The Local Tone Mapping unit 1330 may output the image data to the image compression unit 1340 and the image compression unit 1340 may receive the image data from the Local Tone Mapping unit 1330. The image compression unit 1340 may compress the image data. For example, the image compression unit 1340 may compress the 10-bit YUV format image data to an N-bit YUV format.

As shown in FIG. 13, the portion of the image processing and coding pipeline portion 1300 includes a memory, such as RAM, unit 1342. The image compression unit 1340 may output the image data to the memory unit 1342 and the memory unit 1342 may receive the image data from the image compression unit 1340. The memory unit 1342 may store the image data, such as in the N-bit YUV format.

As shown in FIG. 13, the portion of the image processing and coding pipeline portion 1300 includes a image uncompression (UCX) unit 1344. The memory unit 1342 may output the image data to the image uncompression unit 1344 and the image uncompression unit 1344 may receive the image data from the memory unit 1342. The image uncompression unit 1344 may uncompress the image data. For example, the image uncompression unit 1344 may uncompress the N-bit YUV format image data to the 10-bit YUV format.

As shown in FIG. 13, the portion of the image processing and coding pipeline portion 1300 includes an encoding (coder) unit 1350. The image uncompression unit 1344 may output the partially processed image data to the encoding unit 1350 and the encoding unit 1350 may receive the partially processed image data from the image uncompression unit 1344. The encoding unit 1350 may output encoded image data as indicated at 1360.

Figure 14:
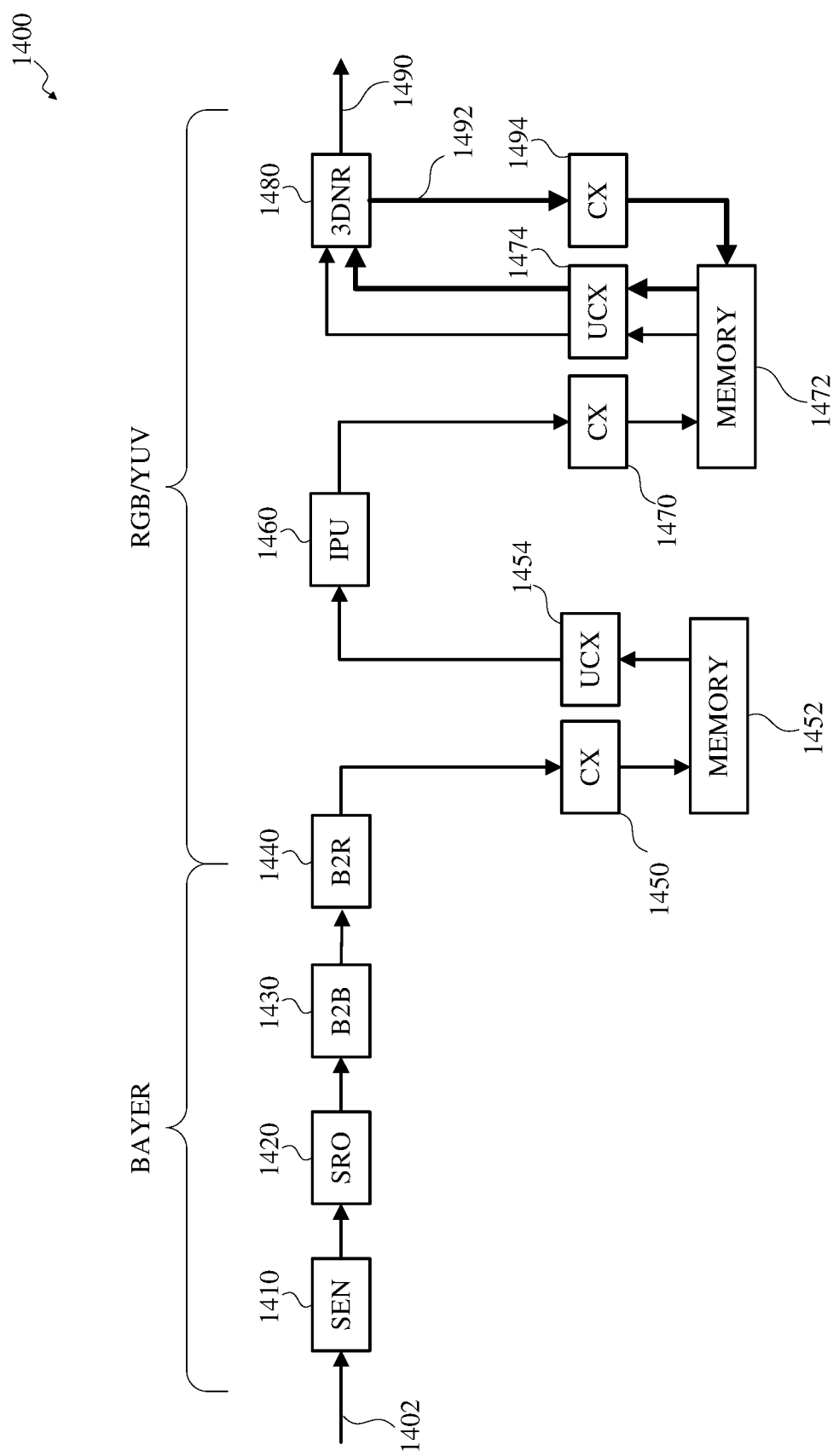
FIG. 14 is a functional block diagram of an example of another image processing and coding pipeline portion for three-dimensional noise reduction in accordance with implementations of this disclosure.

FIG. 14 is a functional block diagram of an example of another image processing and coding pipeline portion 1400 for three-dimensional noise reduction in accordance with implementations of this disclosure. The image processing and coding pipeline portion 1400 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 1400 may be similar to the image processing and coding pipelines, or pipeline portions, shown in FIGS. 4-9, except as described herein or otherwise clear from context. The portion of the image processing and coding pipeline portion 1400 shown in FIG. 14 may implement three-dimensional noise reduction for still image processing with Multi-Frame Noise Reduction (MFNR).

The portion of the image processing and coding pipeline portion 1400 may receive an image signal 1402, such as from one or more image sensors (not shown), such as the image sensor 230 shown in FIG. 2. For example, the image signal 1402 may be received as input image data. The input image signal 1402 may be received in a defined format, such an unsigned 14-bit Bayer format.

As shown in FIG. 14, the portion of the image processing and coding pipeline portion 1400 includes a sensor input (SEN) unit 1410 for receiving the image signal 1402 as input image data. The sensor input unit 1410 may be similar to the sensor input units 610, 612, 710, 712, 1010, 1210 shown in FIGS. 6, 7, 10, and 12, except as described herein or otherwise clear from context. The sensor input unit 1410 may process the input image data and may output image data.

As shown in FIG. 14, the portion of the image processing and coding pipeline portion 1400 includes a sensor readout (SRO) unit 1420. The sensor input unit 1410 may output the input image data to the sensor readout unit 1420 and the sensor readout unit 1420 may receive the input image data from the sensor input unit 1410. The sensor readout unit 1420 may be similar to the sensor readout units 620, 622, 720, 722, 1020, 1220 shown in FIGS. 6, 7, 10, and 12, except as described herein or otherwise clear from context. The sensor readout unit 1420 may output the image data as 15-bit Bayer format data. Although not shown in FIG. 14, the image data output by the sensor readout unit 1420 may be stored in memory, which may include lossless compression of the image data, as described in relation to FIGS. 6 and 7, or may omit compression of the image data. The sensor readout unit 1420 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 14, the portion of the image processing and coding pipeline portion 1400 includes a Bayer-to-Bayer (B2B) unit 1430. The sensor readout unit 1420 may output the image data to the Bayer-to-Bayer unit 1430 and the Bayer-to-Bayer unit 1430 may receive the image data from the sensor readout unit 1420. The Bayer-to-Bayer unit 1430 may convert the 15-bit Bayer format data to the 14-bit Bayer format. The Bayer-to-Bayer unit 1430 may be similar to the Bayer-to-Bayer units 640, 730, 1030, 1230 shown in FIGS. 6, 7, 10, and 12, except as described herein or otherwise clear from context. The Bayer-to-Bayer unit 1430 may output the image data as 14-bit Bayer format data.

As shown in FIG. 14, the portion of the image processing and coding pipeline portion 1400 includes a Bayer-to-RGB (B2R) unit 1440. The Bayer-to-Bayer unit 1430 may output the image data to the Bayer-to-RGB unit 1440 and the Bayer-to-RGB unit 1440 may receive the image data from the Bayer-to-Bayer unit 1430. The Bayer-to-RGB unit 1440 may convert the image data from Bayer format to an RGB format, such as a 14-bit RGB format. The Bayer-to-RGB unit 1440 may be similar to the Bayer-to-RGB units 660, 662, 740, 742, 1040, 1240 shown in FIGS. 6, 7, 10, and 12, except as described herein or otherwise clear from context. Although not shown expressly in FIG. 14, the Bayer-to-RGB unit 1440 may include an RGB-to-YUV converter, and may convert the RGB format data to YUV format data, and may output YUV format data, such as 14-bit YUV format data, or may convert from Bayer to YUV format.

As shown in FIG. 14, the portion of the image processing and coding pipeline portion 1400 includes a first image compression (CX) unit 1450. The Bayer-to-RGB unit 1440 may output the partially processed image data, such as in the 14-bit RGB format or the 14-bit YUV format, to the first image compression unit 1450 and the first image compression unit 1450 may receive the partially processed image data from the Bayer-to-RGB unit 1440. The first image compression unit 1450 may be similar to the first image compression unit 1250 shown in FIG. 12, except as described herein or otherwise clear from context.

As shown in FIG. 14, the portion of the image processing and coding pipeline portion 1400 includes a first memory, such as RAM, unit 1452. The first image compression unit 1450 may output the partially processed image data to the first memory unit 1452 and the first memory unit 1452 may receive the partially processed image data from the first image compression unit 1450. The first memory unit 1452 may be similar to the memory unit 1252 shown in FIG. 12, except as described herein or otherwise clear from context.

As shown in FIG. 14, the portion of the image processing and coding pipeline portion 1400 includes a first image uncompression (UCX) unit 1454. The first memory unit 1452 may output the partially processed image data to the first image uncompression unit 1454 and the first image uncompression unit 1454 may receive the partially processed image data from the first memory unit 1452. The first image uncompression unit 1454 may be similar to the first image uncompression unit 1254 shown in FIG. 12, except as described herein or otherwise clear from context.

As shown in FIG. 14, the portion of the image processing and coding pipeline portion 1400 includes an Image Processing (IPU) unit 1460. The first image uncompression unit 1454 may output the partially processed image data to the image processing unit 1460 and the image processing unit 1460 may receive the partially processed image data from the first image uncompression unit 1454, such as in the 14-bit RGB format or the 14-bit YUV format. The image processing unit 1460 may be similar to the image processing unit 1130 shown in FIG. 11, except as described herein or otherwise clear from context.

As shown in FIG. 14, the portion of the image processing and coding pipeline portion 1400 includes a second image compression (CX) unit 1470. The image processing unit 1460 may output the partially processed image data to the second image compression unit 1470 and the second image compression unit 1470 may receive the partially processed image data from the image processing unit 1460. The second image compression unit 1470 may be similar to the second image compression unit 1140 shown in FIG. 11, except as described herein or otherwise clear from context.

As shown in FIG. 14, the portion of the image processing and coding pipeline portion 1400 includes a second memory, such as RAM, unit 1472. The second image compression unit 1470 may output the partially processed image data to the second memory unit 1472 and the second memory unit 1472 may receive the partially processed image data from the second image compression unit 1470. The second memory unit 1472 may be similar to the second memory unit 1142 shown in FIG. 11, except as described herein or otherwise clear from context.

As shown in FIG. 14, the portion of the image processing and coding pipeline portion 1400 includes a second image uncompression (UCX) unit 1474. The second memory unit 1472 may output the partially processed image data to the second image uncompression unit 1474 and the second image uncompression unit 1474 may receive the partially processed image data from the second memory unit 1472. The second image uncompression unit 1474 may be similar to the second image uncompression unit 1144 shown in FIG. 11, except as described herein or otherwise clear from context.

As shown in FIG. 14, the portion of the image processing and coding pipeline portion 1400 includes a three-dimensional noise reduction (3DNR) unit 1480. The second image uncompression unit 1474 may output the partially processed image data to the three-dimensional noise reduction unit 1480 and the three-dimensional noise reduction unit 1480 may receive the partially processed image data from the second image uncompression unit 1474, such as in the 14-bit RGB format or the 14-bit YUV format. The three-dimensional noise reduction unit 1480 may be similar to the three-dimensional noise reduction unit 1150 shown in FIG. 11, except as described herein or otherwise clear from context. The three-dimensional noise reduction unit 1480 may output partially processed image data as indicated at 1490. The three-dimensional noise reduction unit 1480 may output three-dimensional noise reduction data as indicated at 1492. A data path for the three-dimensional noise reduction data is shown using bold directional lines for clarity.

As shown in FIG. 14, the portion of the image processing and coding pipeline portion 1400 includes a third image compression (CX) unit 1494. The three-dimensional noise reduction unit 1480 may output three-dimensional noise reduction data as indicated at 1492 to the third image compression unit 1494 and the third image compression unit 1494 may receive the three-dimensional noise reduction data from the three-dimensional noise reduction unit 1480. The third image compression unit 1494 may be similar to the third image compression unit 1156 shown in FIG. 11, except as described herein or otherwise clear from context. The third image compression unit 1494 may output the three-dimensional noise reduction data to the second memory unit 1472 and the second memory unit 1472 may receive the three-dimensional noise reduction data from the third image compression unit 1494. The second memory unit 1472 may store the three-dimensional noise reduction data. The second memory unit 1472 may output the three-dimensional noise reduction data to the second image uncompression unit 1474 and the second image uncompression unit 1474 may receive the three-dimensional noise reduction data from the second memory unit 1472. The second image uncompression unit 1474 may uncompress the three-dimensional noise reduction data.

Figure 15:
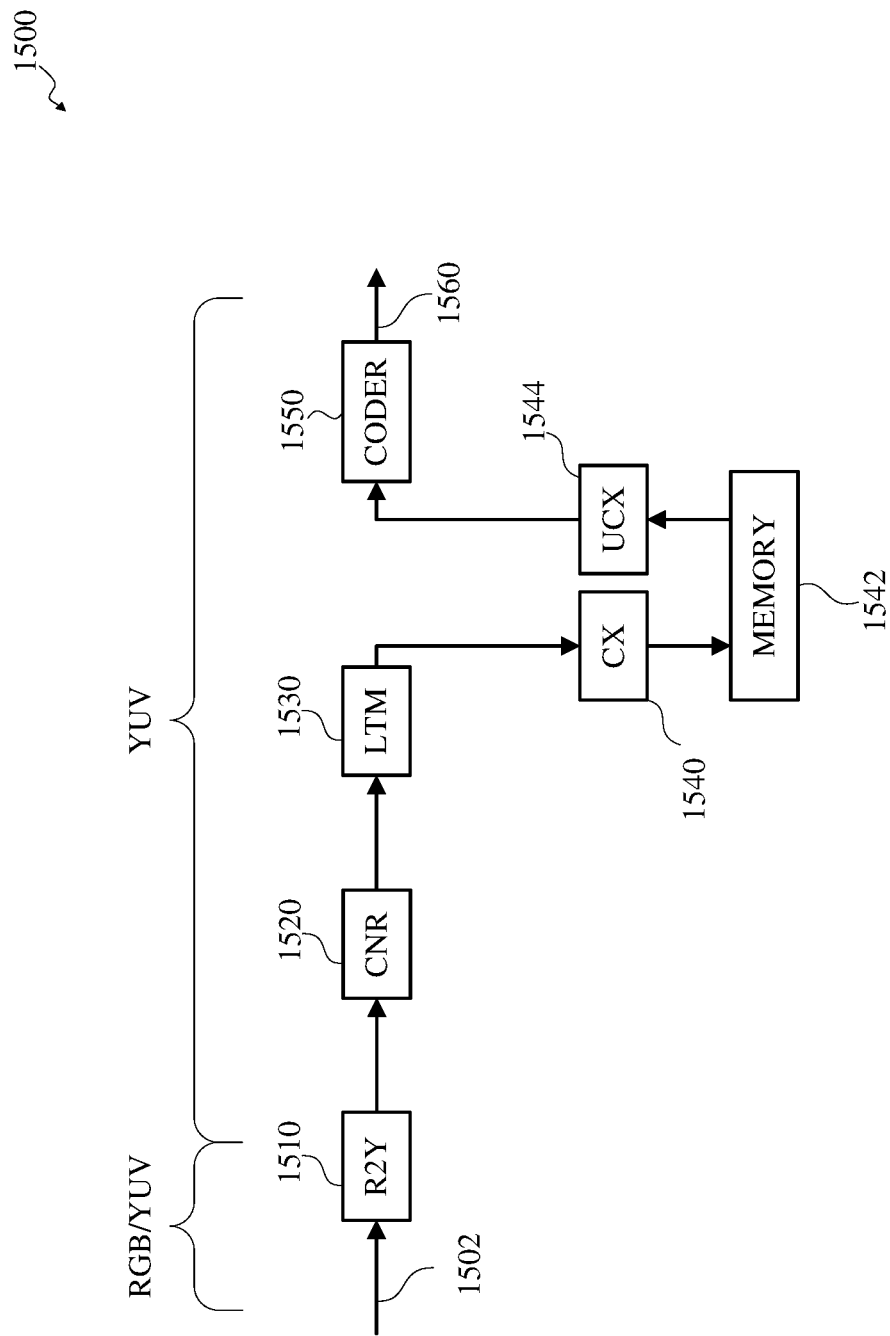
FIG. 15 is a functional block diagram of an example of another image processing and coding pipeline portion in accordance with implementations of this disclosure.

FIG. 15 is a functional block diagram of an example of another image processing and coding pipeline portion 1500 in accordance with implementations of this disclosure. The Image processing and coding pipeline portion 1500 may be included in an image capture device, such as the image capture device 200 shown in FIG. 2, or an image capture apparatus, such as the image capture apparatus 110 shown in FIG. 1 or the image capture apparatus 300 shown in FIG. 3. The Image processing and coding pipeline portion 1500 shown in FIG. 15 may be included in an image processing pipeline including three-dimensional noise reduction for still image processing with Multi-Frame Noise Reduction (MFNR).

The Image processing and coding pipeline portion 1500 may be similar to the image processing and coding pipeline 400 shown in FIG. 4, or a portion thereof, except as described herein or otherwise clear from context. The Image processing and coding pipeline portion 1500 may be similar to the image signal processor 500 shown in FIG. 5, or a portion thereof, except as described herein or otherwise clear from context. For example, an image processor may include the image processing and coding pipeline portion 1500 subsequent to the image processing and coding pipeline portion 1400 shown in FIG. 14.

The portion of the Image processing and coding pipeline portion 1500 may receive image data 1502, such as the image data 1490 output as shown in FIG. 14. The image data 1502 may be 14-bit YUV image data or 14-bit RGB image data.

As shown in FIG. 15, the portion of the image processing and coding pipeline portion 1500 includes an RGB-to-YUV (R2Y) unit 1510. The RGB-to-YUV unit 1510 may receive the image data 1502. The RGB-to-YUV unit 1510 may convert the image data from RGB format to a YUV format, such as a 10-bit YUV format. The RGB-to-YUV unit 1510 may be similar to the RGB-to-YUV unit 800 shown in FIG. 8, except as described herein or otherwise clear from context. In some implementations, the RGB-to-YUV unit 1510 may receive 14-bit YUV data and may convert the 14-bit YUV data to 10-bit YUV data, which may include converting the 14-bit YUV data to 14-bit RGB data and converting the 14-bit RGB data to 10-bit YUV data.

As shown in FIG. 15, the portion of the image processing and coding pipeline portion 1500 includes a Chroma Noise Reduction (CNR) unit 1520. The RGB-to-YUV unit 1510 may output the image data to the Chroma Noise Reduction unit 1520 and the Chroma Noise Reduction unit 1520 may receive the image data from the RGB-to-YUV unit 1510. The image data received at the Chroma Noise Reduction unit 1520 may be 10-bit YUV image data. The Chroma Noise Reduction unit 1520 may be similar to the Chroma Noise Reduction unit 1060 shown in FIG. 10, except as described herein or otherwise clear from context.

As shown in FIG. 15, the portion of the Image processing and coding pipeline portion 1500 includes a Local Tone Mapping (LTM) unit 1530. The Chroma Noise Reduction 1520 may output the image data to the Local Tone Mapping unit 1530 and the Local Tone Mapping unit 1530 may receive the image data from the Chroma Noise Reduction 1520. The image data received at the Local Tone Mapping unit 1530 may be 10-bit YUV image data. The Local Tone Mapping unit 1530 may enhance detail and may omit introducing artifacts. For example, the Local Tone Mapping unit 1530 may apply tone mapping, which may be similar to applying an unsharp-mask.

In some implementations, a low-resolution map for local tone mapping may be obtained prior to the Local Tone Mapping unit 1530, and the low-resolution map may be processed prior to Local Tone Mapping and may be used in Local Tone Mapping. Processing the low-resolution map may include warp processing. Processing the low-resolution map may include processing the low-resolution map in response to gamma correction, tone control, or both.

As shown in FIG. 15, the portion of the image processing and coding pipeline portion 1500 includes an image compression (CX) unit 1530. The Local Tone Mapping unit 1530 may output the image data to the image compression unit 1540 and the image compression unit 1540 may receive the image data from the Local Tone Mapping unit 1530. The image compression unit 1540 may compress the image data. For example, the image compression unit 1540 may compress the 10-bit YUV format image data to an N-bit YUV format.

As shown in FIG. 15, the portion of the image processing and coding pipeline portion 1500 includes a memory, such as RAM, unit 1542. The image compression unit 1540 may output the image data to the memory unit 1542 and the memory unit 1542 may receive the image data from the image compression unit 1540. The memory unit 1542 may store the image data, such as in the N-bit YUV format.

As shown in FIG. 15, the portion of the image processing and coding pipeline portion 1500 includes a image uncompression (UCX) unit 1544. The memory unit 1542 may output the image data to the image uncompression unit 1544 and the image uncompression unit 1544 may receive the image data from the memory unit 1542. The image uncompression unit 1544 may uncompress the image data. For example, the image uncompression unit 1544 may uncompress the N-bit YUV format image data to the 10-bit YUV format.

As shown in FIG. 15, the portion of the image processing and coding pipeline portion 1500 includes an encoding (coder) unit 1550. The image uncompression unit 1544 may output the partially processed image data to the encoding unit 1550 and the encoding unit 1550 may receive the partially processed image data from the image uncompression unit 1544. The encoding unit 1550 may output encoded image data as indicated at 1560.

Figure 16:
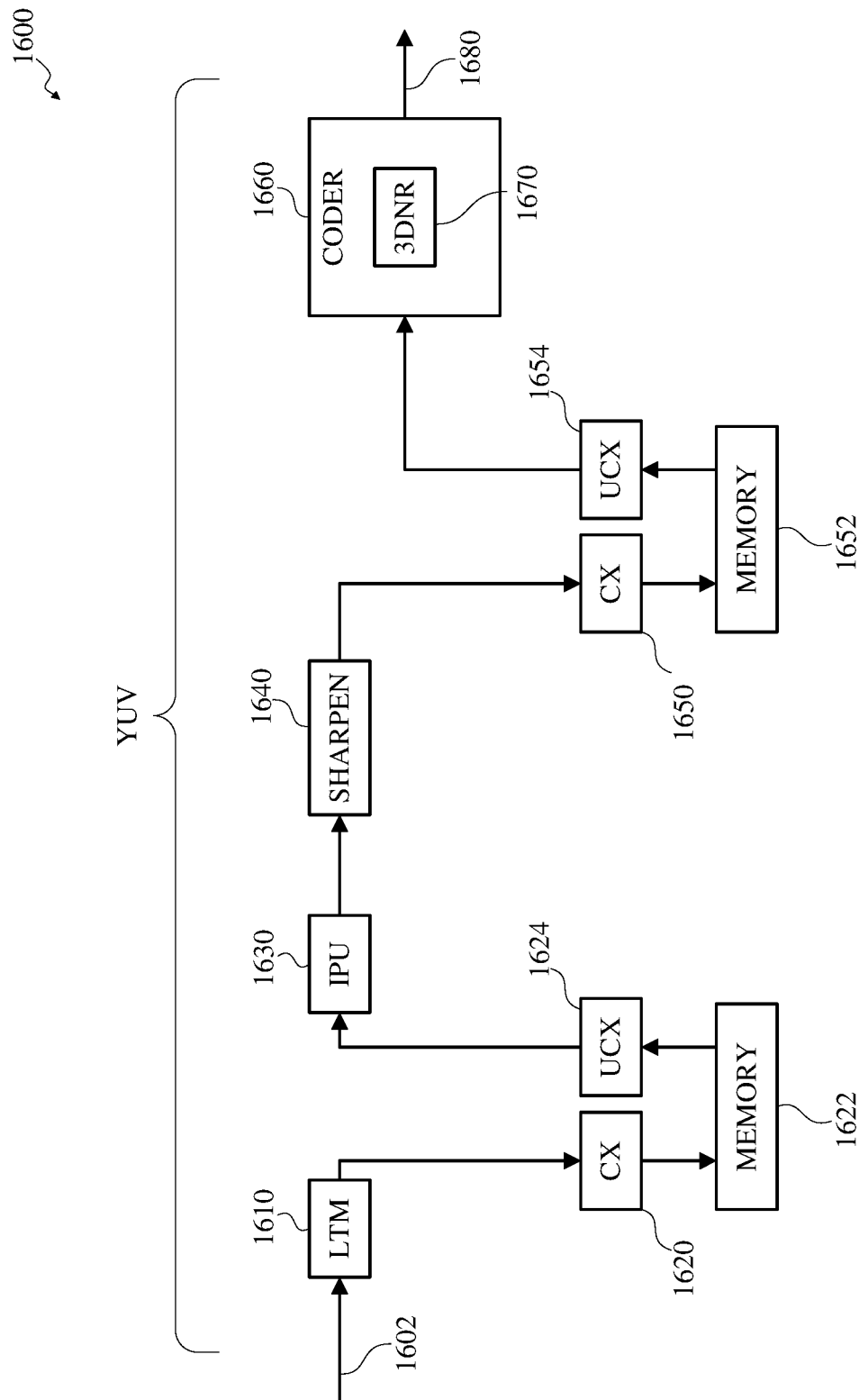
FIG. 16 is a functional block diagram of an example of another image processing and coding pipeline portion for three-dimensional noise reduction in accordance with implementations of this disclosure.

FIG. 16 is a functional block diagram of an example of another image processing and coding pipeline portion 1600 for three-dimensional noise reduction in accordance with implementations of this disclosure. The image processing and coding pipeline portion 1600 may be included in an image capture device, such as the image capture device 200 shown in FIG. 2, or an image capture apparatus, such as the image capture apparatus 160 shown in FIG. 1 or the image capture apparatus 300 shown in FIG. 3. The image processing and coding pipeline portion 1600 may be similar to the image processing and coding pipelines, or pipeline portions, shown in FIGS. 4-9, except as described herein or otherwise clear from context. The portion of the image processing and coding pipeline portion 1600 shown in FIG. 16 may implement three-dimensional noise reduction for high resolution, such as 4K120 resolution image data.

The portion of the image processing and coding pipeline portion 1600 may receive a partially processed image signal 1602, such as from the Chroma Noise Reduction unit 1060 shown in FIG. 10. For example, the image signal 1602 may be received in a 10-bit YUV format.

As shown in FIG. 16, the portion of the image processing and coding pipeline portion 1600 includes a Local Tone Mapping (LTM) unit 1610. The Local Tone Mapping unit 1610 may be similar to the Local Tone Mapping unit 920 shown in FIG. 9, except as described herein or otherwise clear from context.

As shown in FIG. 16, the portion of the image processing and coding pipeline portion 1600 includes a first image compression (CX) unit 1620. The Local Tone Mapping unit 1610 may output the partially processed image data to the first image compression unit 1620 and the first image compression unit 1620 may receive the partially processed image data from the Local Tone Mapping unit 1610. The first image compression unit 1620 may be similar to the first image compression unit 930 shown in FIG. 9, except as described herein or otherwise clear from context.

As shown in FIG. 16, the portion of the image processing and coding pipeline portion 1600 includes a first memory, such as RAM, unit 1622. The first image compression unit 1620 may output the partially processed image data to the first memory unit 1622 and the first memory unit 1622 may receive the partially processed image data from the first image compression unit 1620. The first memory unit 1622 may store the partially processed image data, such as in the unsigned N-bit YUV format. The first memory unit 1622 may be similar to the first image memory 932 shown in FIG. 9, except as described herein or otherwise clear from context.

As shown in FIG. 16, the portion of the image processing and coding pipeline portion 1600 includes a first image uncompression (UCX) unit 1624. The first memory unit 1622 may output the partially processed image data to the first image uncompression unit 1624 and the first image uncompression unit 1624 may receive the partially processed image data from the first memory unit 1622. The first image uncompression unit 1624 may uncompress the partially processed image data. For example, the first image uncompression unit 1624 may uncompress the unsigned N-bit YUV format image data to the unsigned 10-bit YUV format. The first image uncompression unit 1624 may be similar to the first image uncompression unit 934 shown in FIG. 9, except as described herein or otherwise clear from context.

As shown in FIG. 16, the portion of the image processing and coding pipeline portion 1600 includes an Image Processing (IPU) unit 1630. The first image uncompression unit 1624 may output the partially processed image data to the image processing unit 1630 and the image processing unit 1630 may receive the partially processed image data from the first image uncompression unit 1624, such as in the unsigned 10-bit YUV format. The image processing unit 1630 may be similar to the image processing unit 940 shown in FIG. 9, except as described herein or otherwise clear from context.

As shown in FIG. 16, the portion of the image processing and coding pipeline portion 1600 includes an image sharpening (sharpen) unit 1640. The image processing unit 1630 may output the partially processed image data to the image sharpening unit 1640 and the image sharpening unit 1640 may receive the partially processed image data from the image processing unit 1630. The image sharpening unit 1640 may recover image detail reduced by temporal denoising or warping.

As shown in FIG. 16, the portion of the image processing and coding pipeline portion 1600 includes a second image compression (CX) unit 1650. The image sharpening unit 1640 may output the partially processed image data to the second image compression unit 1650 and the second image compression unit 1650 may receive the partially processed image data from the image sharpening unit 1640. The second image compression unit 1650 may be similar to the first image compression unit 1620, except as described herein or otherwise clear from context.

As shown in FIG. 16, the portion of the image processing and coding pipeline portion 1600 includes a second memory, such as RAM, unit 1652. The second image compression unit 1650 may output the partially processed image data to the second memory unit 1652 and the second memory unit 1652 may receive the partially processed image data from the second image compression unit 1650. The second memory unit 1652 may be similar to the first memory unit 1622, except as described herein or otherwise clear from context.

As shown in FIG. 16, the portion of the image processing and coding pipeline portion 1600 includes a second image uncompression (UCX) unit 1654. The second memory unit 1652 may output the partially processed image data to the second image uncompression unit 1654 and the second image uncompression unit 1654 may receive the partially processed image data from the second memory unit 1652. The second image uncompression unit 1654 may be similar to the first image uncompression unit 1624, except as described herein or otherwise clear from context.

As shown in FIG. 16, the portion of the image processing and coding pipeline portion 1600 includes an encoding (coder) unit 1660. The second image uncompression unit 1654 may output the partially processed image data to the encoding unit 1660 and the encoding unit 1660 may receive the partially processed image data from the second image uncompression unit 1654. The encoding unit 1660 may include a three-dimensional noise reduction (3DNR) unit 1670. The three-dimensional noise reduction unit 1670 be similar to the three-dimensional noise reduction unit 960 shown in FIG. 9, except as described herein or otherwise clear from context. The encoding unit 1660 may output encoded image data as indicated at 1680.

Figure 17:
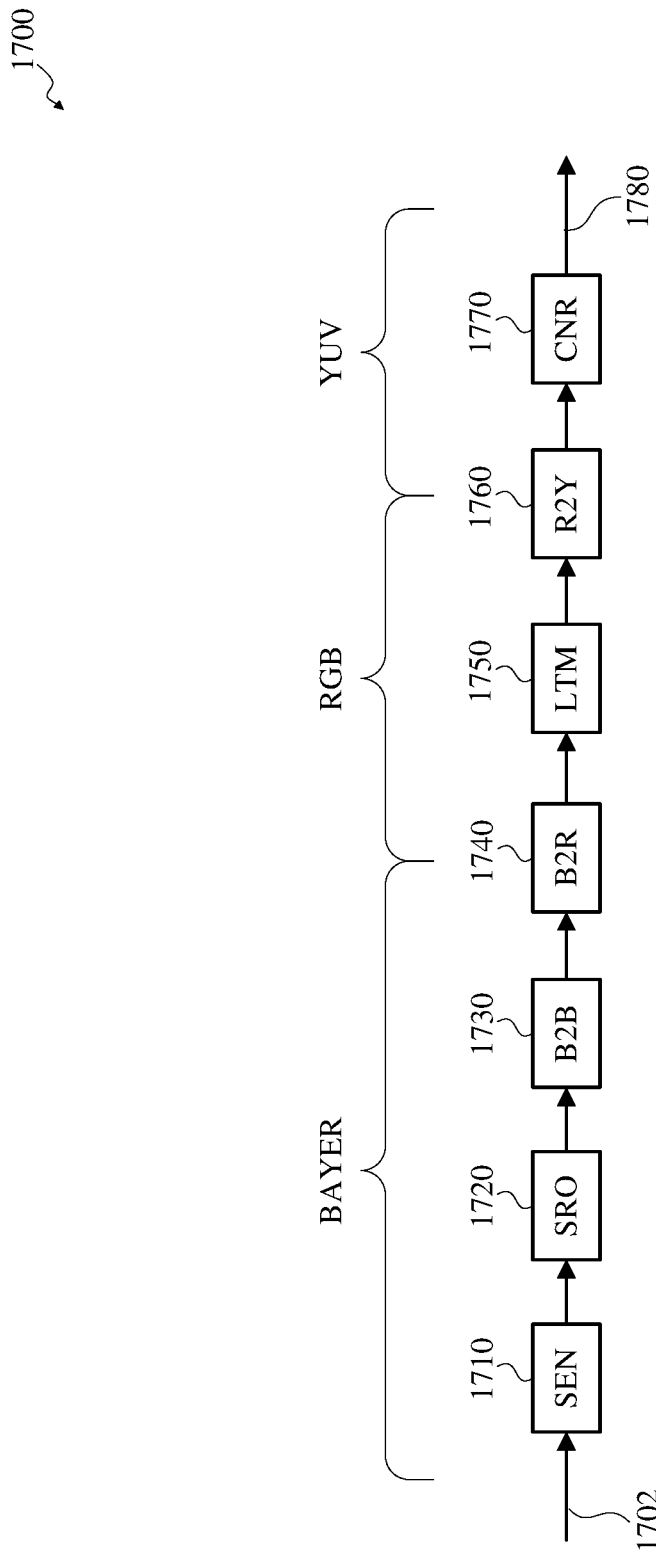
FIG. 17 is a functional block diagram of an example of an image processing and coding pipeline portion for local tone mapping in accordance with implementations of this disclosure.

FIG. 17 is a functional block diagram of an example of an image processing and coding pipeline portion 1700 for local tone mapping in accordance with implementations of this disclosure. The image processing and coding pipeline portion 1700 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 1700 may be similar to the image processing and coding pipelines, or pipeline portions, shown in FIGS. 4-9, except as described herein or otherwise clear from context. The portion of the image processing and coding pipeline portion 1700 shown in FIG. 17 may implement local tone mapping.

The portion of the image processing and coding pipeline portion 1700 may receive an image signal 1702, such as from one or more image sensors (not shown), such as the image sensor 230 shown in FIG. 2. For example, the image signal 1702 may be received as input image data. The input image signal 1702 may be received in a defined format, such a 14-bit Bayer format.

As shown in FIG. 17, the portion of the image processing and coding pipeline portion 1700 includes a sensor input (SEN) unit 1710 for receiving the image signal 1702 as input image data. The sensor input unit 1710 may be similar to the sensor input units 610, 612, 710, 712 shown in FIGS. 6 and 7, except as described herein or otherwise clear from context. The sensor input unit 1710 may process the input image data and may output image data.

As shown in FIG. 17, the portion of the image processing and coding pipeline portion 1700 includes a sensor readout (SRO) unit 1720. The sensor input unit 1710 may output the input image data to the sensor readout unit 1720 and the sensor readout unit 1720 may receive the input image data from the sensor input unit 1710. The sensor readout unit 1720 may be similar to the sensor readout units 620, 622, 720, 722 shown in FIGS. 6 and 7, except as described herein or otherwise clear from context. The sensor readout unit 1720 may output the image data as 15-bit Bayer format data. Although not shown in FIG. 17, the image data output by the sensor readout unit 1720 may be stored in memory, which may include compression of the image data, as described in relation to FIGS. 6 and 7. The sensor readout unit 1720 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 17, the portion of the image processing and coding pipeline portion 1700 includes a Bayer-to-Bayer (B2B) unit 1730. The sensor readout unit 1720 may output the image data to the Bayer-to-Bayer unit 1730 and the Bayer-to-Bayer unit 1730 may receive the image data from the sensor readout unit 1720. The Bayer-to-Bayer unit 1730 may convert the 15-bit Bayer format data to the 14-bit Bayer format. The Bayer-to-Bayer unit 1730 may be similar to the Bayer-to-Bayer units 640, 730 shown in FIGS. 6 and 7, except as described herein or otherwise clear from context. The Bayer-to-Bayer unit 1730 may output the image data as 14-bit Bayer format data.

As shown in FIG. 17, the portion of the image processing and coding pipeline portion 1700 includes a Bayer-to-RGB (B2R) unit 1740. The Bayer-to-Bayer unit 1730 may output the image data to the Bayer-to-RGB unit 1740 and the Bayer-to-RGB unit 1740 may receive the image data from the Bayer-to-Bayer unit 1730. The Bayer-to-RGB unit 1740 may convert the image data from Bayer format to an RGB format, such as a 14-bit RGB format. The Bayer-to-RGB unit 1740 may be similar to the Bayer-to-RGB units 660,

662, 740, 742 shown in FIGS. 6 and 7, except as described herein or otherwise clear from context.

As shown in FIG. 17, the portion of the image processing and coding pipeline portion 1700 includes a Local Tone Mapping (LTM) unit 1750. The Local Tone Mapping unit 1750 may be similar to the Local Tone Mapping unit 920 shown in FIG. 9, except as described herein or otherwise clear from context. The Bayer-to-RGB unit 1740 may output the image data to the Local Tone Mapping unit 1750 and the Local Tone Mapping unit 1750 may receive the image data from the Bayer-to-RGB unit 1740. The Local Tone Mapping unit 1750 may perform local tone mapping for wide dynamic range (WDR) images.

As shown in FIG. 17, the portion of the image processing and coding pipeline portion 1700 includes an RGB-to-YUV (R2Y) unit 1760. The Local Tone Mapping unit 1750 may output the image data to the RGB-to-YUV unit 1760 and the RGB-to-YUV unit 1760 may receive the image data from the Bayer-to-RGB unit 1740. The RGB-to-YUV unit 1760 may convert the image data from RGB format to a YUV format, such as a 10-bit YUV format. The RGB-to-YUV unit 1760 may be similar to the RGB-to-YUV unit 800 shown in FIG. 8, except as described herein or otherwise clear from context. An example, of the RGB-to-YUV unit 1760 is shown in FIG. 18.

As shown in FIG. 17, the portion of the image processing and coding pipeline portion 1700 includes a Chroma Noise Reduction (CNR) unit 1770. The RGB-to-YUV unit 1760 may output the image data to the Chroma Noise Reduction unit 1770 and the Chroma Noise Reduction unit 1770 may receive the image data from the RGB-to-YUV unit 1760. The Image data received at the Chroma Noise Reduction unit 1770 may be 10-bit YUV image data. The Chroma Noise Reduction unit 1770 may be similar to the Chroma Noise Reduction unit 910 shown in FIG. 9, except as described herein or otherwise clear from context. The Chroma Noise Reduction unit 1770 may output partially processed image data as indicated at 1780.

Figure 18:
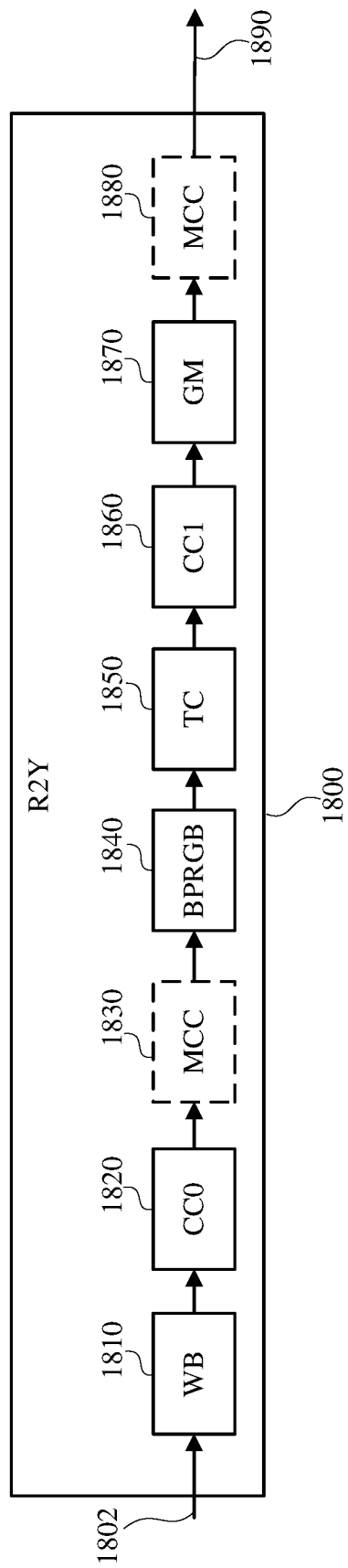
FIG. 18 is a functional block diagram of an example of an RGB-to-YUV unit of an image processing and coding pipeline in accordance with implementations of this disclosure.

FIG. 18 is a functional block diagram of an example of an RGB-to-YUV (R2Y) unit 1800 of an image processing and coding pipeline in accordance with implementations of this disclosure. The RGB-to-YUV unit 1800 may be included in an image capture device, such as the image capture device 200 shown in FIG. 2, or an image capture apparatus, such as the image capture apparatus 110 shown in FIG. 1 or the image capture apparatus 300 shown in FIG. 3. The RGB-to-YUV unit 1800 shown in FIG. 18 may be included in an image processing pipeline including Local Tone Mapping processing for still image data and video data. The RGB-to-YUV unit 1800 may convert image data from an RGB format to a YUV format and may implement color correction and chroma denoising. The RGB-to-YUV unit 1800 may include other elements not shown in FIG. 18 for simplicity and clarity. The RGB-to-YUV unit 1800 may be similar to the RGB-to-YUV unit 1760 shown in FIG. 17, except as described herein or otherwise clear from context.

The RGB-to-YUV unit 1800 may receive image data 1802, such as the image data output by the Local Tone Mapping unit 1750 shown in FIG. 17. The image data 1802 may be 14-bit RGB image data.

As shown in FIG. 18, the RGB-to-YUV unit 1800 includes a white balance (WB) unit 1810. The white balance unit 1810 may receive the image data 1802, such as from the Local Tone Mapping unit 1750 shown in FIG. 17. The image data received at the white balance unit 1810 may be 14-bit RGB image data. The white balance unit 1810 may perform white balance correction on the image data.

As shown in FIG. 18, the RGB-to-YUV unit 1800 includes a first color correction (CC0) unit 1820. The white balance unit 1810 may output the image data to the first color correction unit 1820 and the first color correction unit 1820 may receive the image data from the white balance unit 1810. The image data received at the first color correction unit 1820 may be 14-bit RGB image data. The first color correction unit 1820 may implement linear color rendering, which may include applying a 3×3 color matrix.

As shown in FIG. 18, the RGB-to-YUV unit 1800 may include a Multi-Axis Color Correction (MCC) unit 1830. The first color correction unit 1820 may output the image data to the multi-axis color correction unit 1830 and the multi-axis color correction unit 1830 may receive the image data from the first color correction unit 1820. The image data received at the multi-axis color correction unit 1830 may be 14-bit RGB image data. The multi-axis color correction unit 1830 may implement non-linear color rendering. For example, the multi-axis color correction unit 1830 may perform color non-linear rendering, such as in the Hue, Saturation, Value (HSV) space. The multi-axis color correction unit 1830 is shown using a broken line boarder to indicate that the multi-axis color correction unit 1830 may be omitted or image processing using the RGB-to-YUV unit 1800 may omit using the multi-axis color correction unit 1830.

As shown in FIG. 18, the RGB-to-YUV unit 1800 includes a blackpoint RGB removal (BPRGB) unit 1840. In some implementations, image processing using the RGB-to-YUV unit 1800 may omit using the multi-axis color correction unit 1830 and the first color correction unit 1820 may output the image data to the blackpoint RGB removal unit 1840 and the blackpoint RGB removal unit 1840 may receive the image data from the first color correction unit 1820. In some implementations, image processing using the RGB-to-YUV unit 1800 may include using the multi-axis color correction unit 1830 and the multi-axis color correction unit 1830 may output the image data to the blackpoint RGB removal unit 1840 and the blackpoint RGB removal unit 1840 may receive the image data from the multi-axis color correction unit 1830.

The image data received at the blackpoint RGB removal unit 1840 may be 14-bit RGB image data, which may include respective R (red), G (green), and B (blue) channel 8-bit least-significant-bit (LSB) histogram data, or the histogram data may be otherwise obtained prior to blackpoint removal. Blackpoint removal may include applying offsets, which may be field-variable additive values. In some implementations, low intensity values, such as values within a defined intensity threshold, such as less than or equal to, $2^8$, may be processed for obtaining the histogram data and values exceeding the intensity threshold may be omitted from the histogram data processing. The histogram data may be obtained using configurable downshift and clipping, such as based on one or more of X[7:0], X[8:1], X[9:2], X[10:3], X[11:4], X[12:5] or X[13:6] for a respective color channel X=[R, G, B], which may include identifying, obtaining, or selecting a defined cardinality of bits, such as eight bits, from among the image data, which may be, for example, 14-bit RGB format data. The defined cardinality of bits may correspond with the least significant bits of the respective image data, or signal, subsequent to downshifting the data. The downshift may be configurable, such as based on a control parameter, which may be a firmware controlled parameter. Clipping may indicate that respective pixel values above defined relative thresholds, such as 256, 512, 1024, 2048, 4096, or 8192, respectively, may be omitted from the histogram data.

As shown in FIG. 18, the RGB-to-YUV unit 1800 includes a Tone Control (TC) unit 1850. The blackpoint RGB removal unit 1840 may output the image data to the Tone Control unit 1850 and the Tone Control unit 1850 may receive the image data from the blackpoint RGB removal unit 1840. The image data received at the Tone Control unit 1850 may be 14-bit RGB image data, which may include Y (luminance) channel 12-bit histogram data and Y channel thumbnail data with configurable sampling which may be obtained subsequent to blackpoint removal at 1840 and prior to tone control at 1850. The Tone Control unit 1850 may apply dynamic tone mapping to the Y channel (luminance) data, which may be based on, for example, image capture conditions, such as light conditions or scene conditions. The Tone Control unit 1850 may perform tone control using, for example, a gain lookup table including $2^{10}$ values.

As shown in FIG. 18, the RGB-to-YUV unit 1800 includes a second color correction (CC1) unit 1860 for color matrix correction. The Tone Control unit 1850 may output the image data to the second color correction unit 1860 and the second color correction unit 1860 may receive the image data from the Tone Control unit 1850. The image data received at the second color correction unit 1860 may be 14-bit RGB image data. The second color correction unit 1860 may implement linear color rendering, which may include applying a 3×3 color matrix. The second color correction unit 1860 may convert the 14-bit RGB image data to 10-bit RGB image data.

As shown in FIG. 18, the RGB-to-YUV unit 1800 includes a Gamma (GM) unit 1870. The second color correction unit 1860 may output the image data to the Gamma unit 1870 and the Gamma unit 1870 may receive the image data from the second color correction unit 1860. The image data received at the Gamma unit 1870 may be 10-bit RGB image data. The Gamma unit 1870 may apply a lookup-table independently per channel for color rendering (gamma curve application). Using a lookup-table, which may be an array, may reduce resource utilization, such as processor utilization, using an array indexing operation rather than more complex computation.

As shown in FIG. 18, the RGB-to-YUV unit 1800 may include a Multi-Axis Color Correction (MCC) unit 1880. The Gamma unit 1870 may output the image data to the multi-axis color correction unit 1880 and the multi-axis color correction unit 1880 may receive the image data from the Gamma unit 1870. The image data received at the multi-axis color correction unit 1880 may be 10-bit RGB image data. The multi-axis color correction unit 1880 may implement non-linear color rendering. For example, the multi-axis color correction unit 1880 may perform color non-linear rendering, such as in the Hue, Saturation, Value space. The multi-axis color correction unit 1880 is shown using a broken line boarder to indicate that the multi-axis color correction unit 1880 may be omitted or image processing using the RGB-to-YUV unit 1800 may omit using the multi-axis color correction unit 1880.

Although not shown in FIG. 18, the RGB-to-YUV unit 1800 may include other elements, such as a unit to convert the RGB format image data to YUV format image data. The RGB-to-YUV unit 1800 may output the image data, such as in a 10-bit YUV format, as indicated at 1890.

Figure 19:
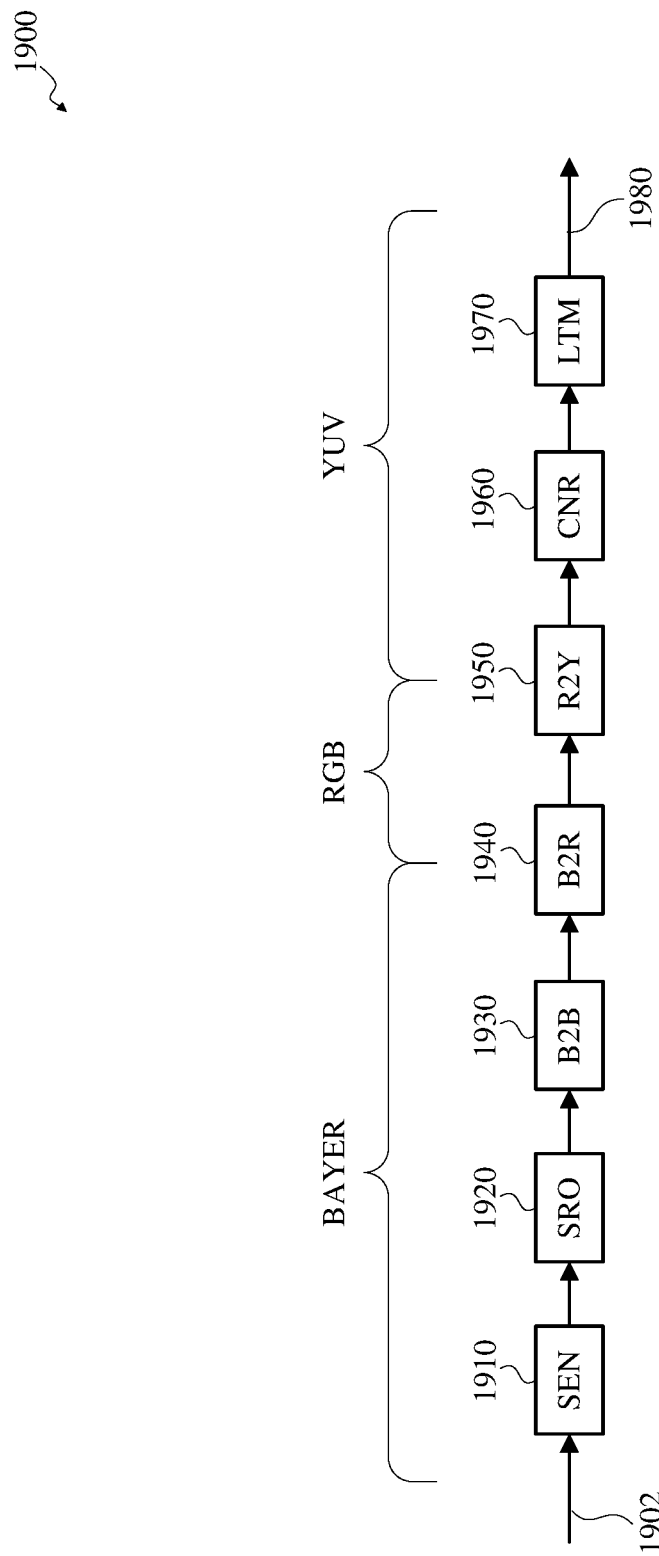
FIG. 19 is a functional block diagram of another example of an image processing and coding pipeline portion for local tone mapping in accordance with implementations of this disclosure.

FIG. 19 is a functional block diagram of another example of an image processing and coding pipeline portion 1900 for local tone mapping in accordance with implementations of this disclosure. The image processing and coding pipeline portion 1900 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline portion 1900 may be similar to the image processing and coding pipelines, or pipeline portions, shown in FIGS. 4-9, except as described herein or otherwise clear from context. The portion of the image processing and coding pipeline portion 1900 shown in FIG. 19 may implement local tone mapping.

The portion of the image processing and coding pipeline portion 1900 may receive an image signal 1902, such as from one or more image sensors (not shown), such as the image sensor 230 shown in FIG. 2. For example, the image signal 1902 may be received as input image data. The input image signal 1902 may be received in a defined format, such a 14-bit Bayer format.

As shown in FIG. 19, the portion of the image processing and coding pipeline portion 1900 includes a sensor input (SEN) unit 1910 for receiving the image signal 1902 as input image data. The sensor input unit 1910 may be similar to the sensor input units 610, 612, 710, 712 shown in FIGS. 6 and 7, except as described herein or otherwise clear from context. The sensor input unit 1910 may process the input image data and may output image data.

As shown in FIG. 19, the portion of the image processing and coding pipeline portion 1900 includes a sensor readout (SRO) unit 1920. The sensor input unit 1910 may output the input image data to the sensor readout unit 1920 and the sensor readout unit 1920 may receive the input image data from the sensor input unit 1910. The sensor readout unit 1920 may be similar to the sensor readout units 620, 622, 720, 722 shown in FIGS. 6 and 7, except as described herein or otherwise clear from context. The sensor readout unit 1920 may output the image data as 15-bit Bayer format data. Although not shown in FIG. 19, the image data output by the sensor readout unit 1920 may be stored in memory, which may include compression of the image data, as described in relation to FIGS. 6 and 7. The sensor readout unit 1920 may obtain the image capture and processing control statistics, which may include histogram data, thumbnail image data, or both, using weighting parameters, such as radial model weighting parameters, two-dimensional (2D) map weighting parameters, or a combination thereof, which may include using a multiplicative or an additive model.

As shown in FIG. 19, the portion of the image processing and coding pipeline portion 1900 includes a Bayer-to-Bayer (B2B) unit 1930. The sensor readout unit 1920 may output the image data to the Bayer-to-Bayer unit 1930 and the Bayer-to-Bayer unit 1930 may receive the image data from the sensor readout unit 1920. The Bayer-to-Bayer unit 1930 may convert the 15-bit Bayer format data to the 14-bit Bayer format. The Bayer-to-Bayer unit 1930 may be similar to the Bayer-to-Bayer units 640, 730 shown in FIGS. 6 and 7, except as described herein or otherwise clear from context. The Bayer-to-Bayer unit 1930 may output the image data as 14-bit Bayer format data.

As shown in FIG. 19, the portion of the image processing and coding pipeline portion 1900 includes a Bayer-to-RGB (B2R) unit 1940. The Bayer-to-Bayer unit 1930 may output the image data to the Bayer-to-RGB unit 1940 and the Bayer-to-RGB unit 1940 may receive the image data from the Bayer-to-Bayer unit 1930. The Bayer-to-RGB unit 1940 may convert the image data from Bayer format to an RGB format, such as a 14-bit RGB format. The Bayer-to-RGB unit 1940 may be similar to the Bayer-to-RGB units 660, 662, 740, 742 shown in FIGS. 6 and 7, except as described herein or otherwise clear from context.

As shown in FIG. 19, the portion of the image processing and coding pipeline portion 1900 includes an RGB-to-YUV (R2Y) unit 1950. The Bayer-to-RGB unit 1940 may output the image data to the RGB-to-YUV unit 1950 and the RGB-to-YUV unit 1950 may receive the image data from the Bayer-to-RGB unit 1940. The RGB-to-YUV unit 1950 may convert the image data from RGB format to a YUV format, such as a 10-bit YUV format. The RGB-to-YUV unit 1950 may be similar to the RGB-to-YUV unit 800 shown in FIG. 8, except as described herein or otherwise clear from context. An example, of the RGB-to-YUV unit 1950 is shown in FIG. 20.

As shown in FIG. 19, the portion of the image processing and coding pipeline portion 1900 includes a Chroma Noise Reduction (CNR) unit 1960. The RGB-to-YUV unit 1950 may output the image data to the Chroma Noise Reduction unit 1960 and the Chroma Noise Reduction unit 1960 may receive the image data from the RGB-to-YUV unit 1950. The Image data received at the Chroma Noise Reduction unit 1960 may be 10-bit YUV image data. The Chroma Noise Reduction unit 1960 may be similar to the Chroma Noise Reduction unit 910 shown in FIG. 9, except as described herein or otherwise clear from context.

As shown in FIG. 19, the portion of the image processing and coding pipeline portion 1900 includes a Local Tone Mapping (LTM) unit 1970. The Local Tone Mapping unit 1970 may be similar to the Local Tone Mapping unit 920 shown in FIG. 9, except as described herein or otherwise clear from context. The Chroma Noise Reduction unit 1960 may output the image data to the Local Tone Mapping unit 1970 and the Local Tone Mapping unit 1970 may receive the image data from the Chroma Noise Reduction unit 1960. The Local Tone Mapping unit 1970 may perform local tone mapping in an unsharp mask mode. The Local Tone Mapping unit 1970 may output partially processed image data as indicated at 1980.

Figure 20:
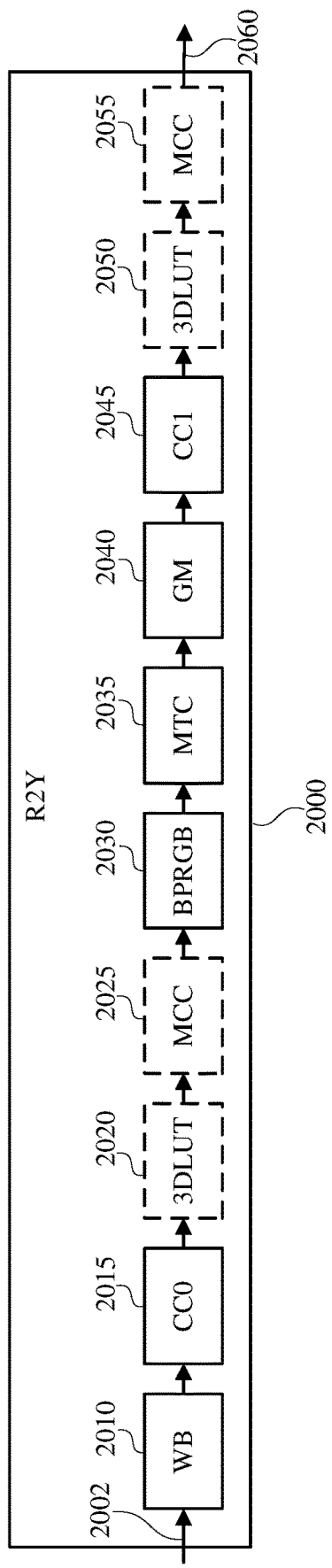
FIG. 20 is a functional block diagram of another example of an RGB-to-YUV unit of an image processing and coding pipeline in accordance with implementations of this disclosure.

FIG. 20 is a functional block diagram of another example of an RGB-to-YUV (R2Y) unit 2000 of an image processing and coding pipeline in accordance with implementations of this disclosure. The RGB-to-YUV unit 2000 may be included in an image capture device, such as the image capture device 200 shown in FIG. 2, or an image capture apparatus, such as the image capture apparatus 110 shown in FIG. 1 or the image capture apparatus 300 shown in FIG. 3. The RGB-to-YUV unit 2000 shown in FIG. 20 may be included in an image processing pipeline including Local Tone Mapping processing for still image data and video data. The RGB-to-YUV unit 2000 may convert image data from an RGB format to a YUV format and may implement color correction and chroma denoising. The RGB-to-YUV unit 2000 may include other elements not shown in FIG. 20 for simplicity and clarity. The RGB-to-YUV unit 2000 may be similar to the RGB-to-YUV unit 1950 shown in FIG. 19, except as described herein or otherwise clear from context.

The RGB-to-YUV unit 2000 may receive image data 2002, such as the image data output by the Bayer-to-RGB unit 1940 shown in FIG. 19. The image data 2002 may be 14-bit RGB image data.

As shown in FIG. 20, the RGB-to-YUV unit 2000 includes a white balance (WB) unit 2010. The white balance unit 2010 may receive the image data 2002, such as from the Bayer-to-RGB unit 1940 shown in FIG. 19. The image data received at the white balance unit 2010 may be 14-bit RGB image data. The white balance unit 2010 may perform white balance correction on the image data.

As shown in FIG. 20, the RGB-to-YUV unit 2000 includes a first color correction (CC0) unit 2015. The white balance unit 2010 may output the image data to the first color correction unit 2015 and the first color correction unit 2015 may receive the image data from the white balance unit 2010. The image data received at the first color correction unit 2015 may be 14-bit RGB image data. The first color correction unit 2015 may implement linear color rendering, which may include applying a 3×3 color matrix.

As shown in FIG. 20, the RGB-to-YUV unit 2000 may include a three-dimensional lookup table (3DLUT) unit 2020. The first color correction unit 2015 may output the image data to the three-dimensional lookup table unit 2020 and the three-dimensional lookup table unit 2020 may receive the image data from the first color correction unit 2015. The image data received at the three-dimensional lookup table unit 2020 may be 14-bit RGB image data. The three-dimensional lookup table unit 2020 may be a three-dimensional lookup table, which may map RGB input values to RGB output values through a non-linear function for non-linear color rendering. The three-dimensional lookup table unit 2020 is shown using a broken line boarder to indicate that the three-dimensional lookup table unit 2020 may be omitted or image processing using the RGB-to-YUV unit 2000 may omit using the three-dimensional lookup table unit 2020.

As shown in FIG. 20, the RGB-to-YUV unit 2000 may include a Multi-Axis Color Correction (MCC) unit 2025. In some implementations, the three-dimensional lookup table unit 2020 may be omitted and the first color correction unit 2015 may output the image data to the multi-axis color correction unit 2025 and the multi-axis color correction unit 2025 may receive the image data from the first color correction unit 2015. In some implementations, the three-dimensional lookup table unit 2020 may be included and the three-dimensional lookup table unit 2020 may output the image data to the multi-axis color correction unit 2025 and the multi-axis color correction unit 2025 may receive the image data from the three-dimensional lookup table unit 2020.

The image data received at the multi-axis color correction unit 2025 may be 14-bit RGB image data. The multi-axis color correction unit 2025 may implement non-linear color rendering. For example, the multi-axis color correction unit 2025 may perform color non-linear rendering, such as in the Hue, Saturation, Value (HSV) space. The multi-axis color correction unit 2025 is shown using a broken line boarder to indicate that the multi-axis color correction unit 2025 may be omitted or image processing using the RGB-to-YUV unit 2000 may omit using the multi-axis color correction unit 2025.

As shown in FIG. 20, the RGB-to-YUV unit 2000 includes a blackpoint RGB removal (BPRGB) unit 2030. In some implementations, image processing using the RGB-to-YUV unit 2000 may omit using the multi-axis color correction unit 2025 and the first color correction unit 2015 may output the image data to the blackpoint RGB removal unit 2030 and the blackpoint RGB removal unit 2030 may receive the image data from the first color correction unit 2015. In some implementations, image processing using the RGB-to-YUV unit 2000 may include using the multi-axis color correction unit 2025 and the multi-axis color correction unit 2025 may output the image data to the blackpoint RGB removal unit 2030 and the blackpoint RGB removal unit 2030 may receive the image data from the multi-axis color correction unit 2025.

The image data received at the blackpoint RGB removal unit 2030 may be 14-bit RGB image data, which may include respective R (red), G (green), and B (blue) channel 8-bit weighted least-significant-bit (LSB) histogram data, or the histogram data may be otherwise obtained prior to blackpoint removal (offsets). In some implementations, low intensity values, such as values within a defined intensity threshold, such as less than or equal to, $2^8$, may be processed for obtaining the histogram data and values exceeding the intensity threshold may be omitted from the histogram data processing.

As shown in FIG. 20, the RGB-to-YUV unit 2000 includes a Multiple Tone Control (Multi-TC) unit 2035. The blackpoint RGB removal unit 2030 may output the image data to the Multiple Tone Control unit 2035 and the Multiple Tone Control unit 2035 may receive the image data from the blackpoint RGB removal unit 2030. The image data received at the Multiple Tone Control unit 2035 may be 14-bit RGB image data, which may include Y (luminance) channel 12-bit, 10-bit, or both, weighted histogram data and Y channel thumbnail data with configurable sampling which may be obtained subsequent to blackpoint removal at 2030 and prior to tone control at 2035. The Multiple Tone Control unit 2035 may apply dynamic tone mapping to the Y channel (luminance) data, which may be based on, for example, image capture conditions, such as light conditions or scene conditions. The tone mapping may include local tone mapping, global tone mapping, or a combination thereof. The Multiple Tone Control unit 2035 may perform tone control using, for example, a gain lookup table including $2^{10}$ values.

In some implementations, the Y channel (luminance) thumbnail may have a defined maximum resolution, such as 64×64. The input image may be divided into, or processed as, M×N tiles, such as 4×3 tiles. The tile size may be configurable. A histogram, such as a histogram including $2^{10}$ values, may be obtained for each tile. The Multiple Tone Control unit 2035 may use gain tables, such as M×N, such as 12, gain tables. Each gain table may include $2^{10}$ values. The gain tables may be spatially interpolated using bilinear interpolation relative to the center of each respective tile. Quantization may be limited by multiplying a gain obtained by the Multiple Tone Control unit 2035 by a gain obtained using global tone control before application to a current pixel.

The tone mapping statistics, such as the histogram data and the thumbnail data, may be obtained using a weight map, which may respectively weight regions of interest in the imagers prior to statistics aggregation. The weights may be obtained based on a radial model, a two-dimensional (2D) low resolution map, or a combination thereof, which may include using a multiplicative or an additive model. The radial model may be configurable using a lookup table, which may include 1024 values, and a configurable center. One or more Pixels outside the radial model may have a respective weight of 0 or 1. The two-dimensional low-resolution map may be a 64×64 map. One or more Pixels outside the two-dimensional low-resolution map may have a respective weight of 0 or 1.

Lookup table parameters, such as the gain values, and weight maps for statistics generation may have double buffering and may be configurable during frame processing. For example, a lookup table may be a 10-bit lookup table for global tone control. Multiple tone control may include applying M×N, or M×N+1, lookup tables, which may be 10-bit lookup tables to respective local regions of the image. For example, for M=4 and N=3, thirteen 1024 value lookup tables may be used.

As shown in FIG. 20, the RGB-to-YUV unit 2000 includes a Gamma (GM) unit 2040. The Multiple Tone Control unit 2035 may output the image data to the Gamma unit 2040 and the Gamma unit 2040 may receive the image data from the Multiple Tone Control unit 2035. The image data received at the Gamma unit 2040 may be 14-bit RGB image data. The Gamma unit 2040 may apply a lookup-table independently per channel for color rendering (gamma curve application). Using a lookup-table, which may be an array, may reduce resource utilization, such as processor utilization, using an array indexing operation rather than more complex computation. The Gamma unit 2040 may convert the 14-bit RGB image data to 10-bit RGB image data.

As shown in FIG. 20, the RGB-to-YUV unit 2000 includes a second color correction (CC1) unit 2045 for color matrix correction. The Gamma unit 2040 may output the image data to the second color correction unit 2045 and the second color correction unit 2045 may receive the image data from the Gamma unit 2040. The image data received at the second color correction unit 2045 may be 10-bit RGB image data. The second color correction unit 2045 may implement linear color rendering, which may include applying a 3×3 color matrix.

As shown in FIG. 20, the RGB-to-YUV unit 2000 may include a three-dimensional lookup table (3DLUT) unit 2050. The second color correction unit 2045 may output the image data to the three-dimensional lookup table unit 2050 and the three-dimensional lookup table unit 2050 may receive the image data from the second color correction unit 2045. The image data received at the three-dimensional lookup table unit 2050 may be 10-bit RGB image data. The three-dimensional lookup table unit 2050 may be a three-dimensional lookup table, which may map RGB input values to RGB output values through a non-linear function for non-linear color rendering. The three-dimensional lookup table unit 2050 is shown using a broken line boarder to indicate that the three-dimensional lookup table unit 2050 may be omitted or image processing using the RGB-to-YUV unit 2000 may omit using the three-dimensional lookup table unit 2050.

As shown in FIG. 20, the RGB-to-YUV unit 2000 may include a Multi-Axis Color Correction (MCC) unit 2055. In some implementations, the three-dimensional lookup table unit 2050 may be omitted and the second color correction unit 2045 may output the image data to the multi-axis color correction unit 2055 and the multi-axis color correction unit 2055 may receive the image data from the second color correction unit 2045. In some implementations, the three-dimensional lookup table unit 2050 may be included and the three-dimensional lookup table unit 2050 may output the image data to the multi-axis color correction unit 2055 and the multi-axis color correction unit 2055 may receive the image data from the three-dimensional lookup table unit 2050.

The image data received at the multi-axis color correction unit 2055 may be 10-bit RGB image data. The multi-axis color correction unit 2055 may implement non-linear color rendering. For example, the multi-axis color correction unit 2055 may perform color non-linear rendering, such as in the Hue, Saturation, Value space. The multi-axis color correction unit 2055 is shown using a broken line boarder to indicate that the multi-axis color correction unit 2055 may be omitted or image processing using the RGB-to-YUV unit 2000 may omit using the multi-axis color correction unit 2055.

Although not shown in FIG. 20, the RGB-to-YUV unit 2000 may include other elements, such as a unit to convert the RGB format image data to YUV format image data. The RGB-to-YUV unit 2000 may output the image data, such as in a 10-bit YUV format, as indicated at 2060.

Figure 21:
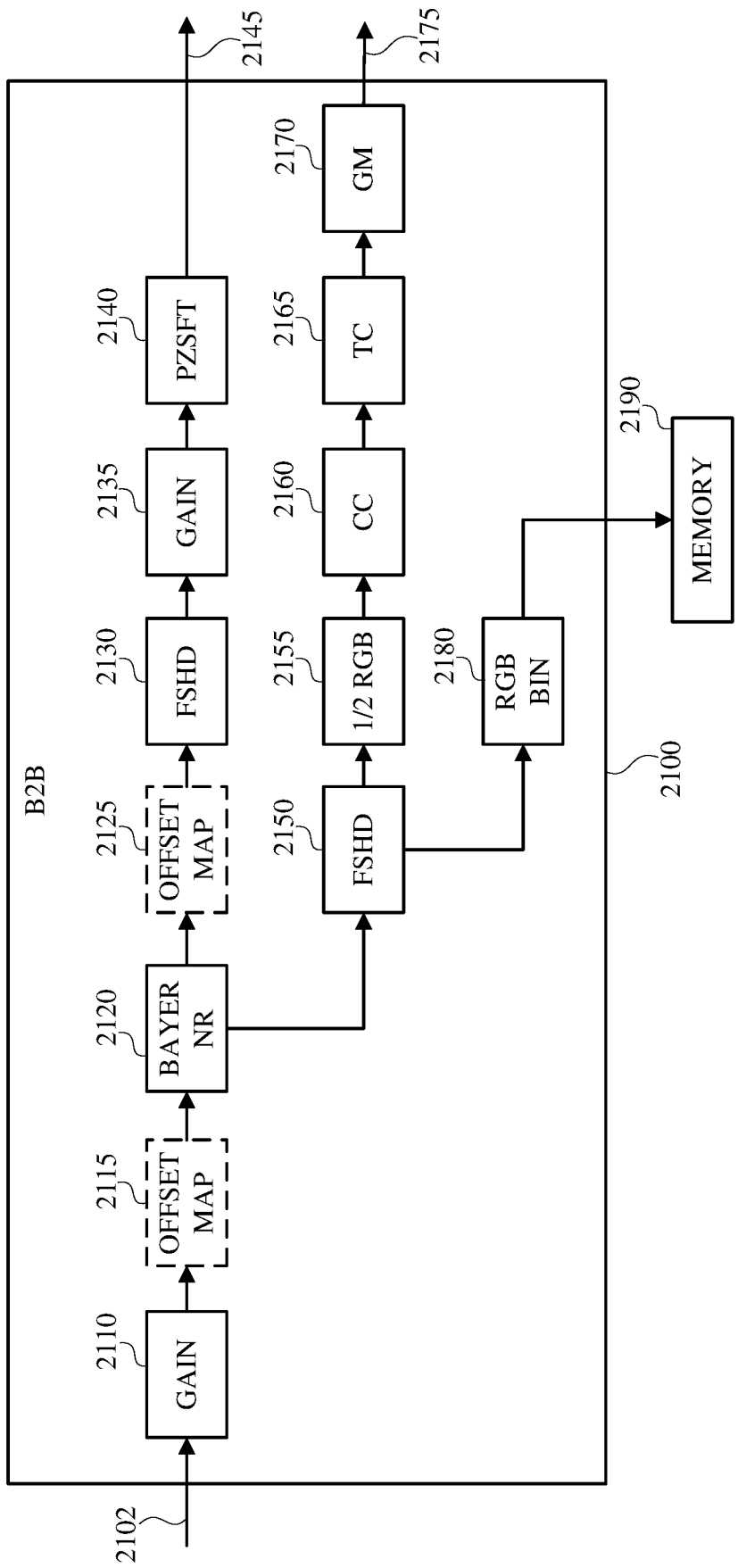
FIG. 21 is a functional block diagram of an example of an Bayer-to-Bayer unit of an image processing and coding pipeline in accordance with implementations of this disclosure.

FIG. 21 is a functional block diagram of an example of an Bayer-to-Bayer (B2B) unit 2100 of an image processing and coding pipeline in accordance with implementations of this disclosure. The Bayer-to-Bayer unit 2100 may be included in an image capture device, such as the image capture device 210 shown in FIG. 2, or an image capture apparatus, such as the image capture apparatus 110 shown in FIG. 1 or the image capture apparatus 300 shown in FIG. 3. The Bayer-to-Bayer unit 2100 shown in FIG. 21 may be included in an image processing pipeline including spherical image processing. The Bayer-to-Bayer unit 2100 may be similar to the Bayer-to-Bayer unit 640 shown in FIG. 6, except as described herein or otherwise clear from context.

The Bayer-to-Bayer unit 2100 may receive image data 2102, such as the image data output by one or more of the sensor readout units 620, 622 shown in FIG. 16 or the sensor readout unit 1920 shown in FIG. 19. The image data 2102 may be signed 15-bit Bayer format image data.

As shown in FIG. 21, the Bayer-to-Bayer unit 2100 includes a first gain unit 2110. The first gain unit 2110 may receive the image data 2102, such as from the sensor readout unit 1920 shown in FIG. 19. The image data received at the first gain unit 2110 may be signed 15-bit Bayer format image data.

As shown in FIG. 21, the Bayer-to-Bayer unit 2100 includes a first offset map unit 2115. The first gain unit 2110 may output the image data to the first offset map unit 2115 and the first offset map unit 2115 may receive the image data from the first gain unit 2110. The image data received at the first offset map unit 2115 may be signed 15-bit Bayer format image data. The first offset map unit 2115 is shown using a broken line boarder to indicate that the first offset map unit 2115 may be omitted or image processing using the Bayer-to-Bayer unit 2100 may omit using the first offset map unit 2115.

The first offset map unit 2115 may apply an offset map to the image data. The offset map may have a configurable size. In some implementations, the configurable size may have a maximum size of 129×129. The offset map may have a non-uniform grid. Applying the offset map may include saturation management, which may preserve saturated areas on respective images based on R, G, and B values. The values of the offset map may be modified per-frame and double buffering may be used for the map values. The first offset map unit 2115 may, prior to Bayer noise removal (denoising), compensate for non-uniform blackpoint removal, such as due to non-uniform thermal heating of the sensor or image capture device.

As shown in FIG. 21, the Bayer-to-Bayer unit 2100 may include a Bayer Noise Reduction (Bayer NR) unit 2120. The first offset map unit 2115 may output the image data to the Bayer Noise Reduction unit 2120 and the Bayer Noise Reduction unit 2120 may receive the image data from the first offset map unit 2115. The image data received at the Bayer Noise Reduction unit 2120 may be signed 15-bit Bayer format image data. The Bayer Noise Reduction unit 2120 may convert the signed 15-bit Bayer format image data to unsigned 14-bit Bayer format image data.

As shown in FIG. 21, the Bayer-to-Bayer unit 2100 includes a second offset map unit 2125. The Bayer Noise Reduction unit 2120 may output the image data to the second offset map unit 2125 and the second offset map unit 2125 may receive the image data from the Bayer Noise Reduction unit 2120. The image data received at the second offset map unit 2125 may be signed 15-bit Bayer format image data. The second offset map unit 2125 is shown using a broken line boarder to indicate that the second offset map unit 2125 may be omitted or image processing using the Bayer-to-Bayer unit 2100 may omit using the second offset map unit 2125. For example, the first offset map unit 2115 or the second offset map unit 2125 may be selected based on saturation management. The image data received at the second offset map unit 2125 may be unsigned 14-bit Bayer format image data.

The second offset map unit 2125 may apply an offset map to the image data. The offset map may have a configurable size. In some implementations, the configurable size may have a maximum size of 129×129. The offset map may have a non-uniform grid. Applying the offset map may include saturation management, which may preserve saturated areas on respective images based on R, G, and B values. The values of the offset map may be modified per-frame and double buffering may be used for the map values. The second offset map unit 2125 may, subsequent to Bayer noise removal (denoising), compensate for flare, such as flare on hemispherical lenses. The second offset map unit 2125 may implement local contrast enhancement, such a dehazing or local tone mapping.

As shown in FIG. 21, the Bayer-to-Bayer unit 2100 may include a first lens shading (FSHD) unit 2130. In some implementations, the second offset map unit 2125 may be omitted and the Bayer Noise Reduction unit 2120 may output the image data to the first lens shading unit 2130 and the first lens shading unit 2130 may receive the image data from the Bayer Noise Reduction unit 2120. In some implementations, the second offset map unit 2125 may be used and the second offset map unit 2125 may output the image data to the first lens shading unit 2130 and the first lens shading unit 2130 may receive the image data from the second offset map unit 2125. The image data received at the first lens shading unit 2130 may be unsigned 14-bit Bayer format image data. The first lens shading unit 2130 may perform lens shading correction, such as luminance lens shading correction, color lens shading correction, or both. In some implementations, the first lens shading unit 2130 may perform exposure compensation between two or more sensors of a multi-sensor image capture apparatus, such as between two hemispherical lenses.

The first lens shading unit 2130 may apply map based gains, radial model gain, or a combination, such as a multiplicative combination, thereof. Using the first lens shading unit 2130 may include saturation management, which may preserve saturated areas on respective images. Map and lookup table values for the first lens shading unit 2130 may be configured or modified on a per-frame basis and double buffering may be used.

As shown in FIG. 21, the Bayer-to-Bayer unit 2100 includes a second gain unit 2135. The first lens shading unit 2130 may output the image data to the second gain unit 2135 and the second gain unit 2135 may receive the image data from the first lens shading unit 2130. The image data received at the first gain unit 2110 may be unsigned 14-bit Bayer format image data.

As shown in FIG. 21, the Bayer-to-Bayer unit 2100 includes a PZSFT unit 2140. The second gain unit 2135 may output the image data to the PZSFT unit 2140 and the PZSFT unit 2140 may receive the image data from the second gain unit 2135. The image data received at the PZSFT unit 2140 may be 14-bit Bayer format image data. The PZSFT unit 2140 may perform offset shifts for the image data. The PZSFT unit 2140 may output the image data as indicated at 2145.

As shown in FIG. 21, the Bayer-to-Bayer unit 2100 includes a second lens shading (FSHD) unit 2150. The Bayer Noise Reduction unit 2120 may output the image data to the second lens shading unit 2150 and the second lens shading unit 2150 may receive the image data from the Bayer Noise Reduction unit 2120. The image data received at the second lens shading unit 2150 may be unsigned 14-bit Bayer format image data. The second lens shading unit 2150 may perform lens shading correction, such as luminance lens shading correction, color lens shading correction, or both. In some implementations, the second lens shading unit 2150 may perform exposure compensation between two or more sensors of a multi-sensor image capture apparatus.

As shown in FIG. 21, the Bayer-to-Bayer unit 2100 includes a half-RGB (½ RGB) unit 2155. The second lens shading unit 2150 may output the image data to the half-RGB unit 2155 and the half-RGB unit 2155 may receive the image data from the second lens shading unit 2150.

As shown in FIG. 21, the Bayer-to-Bayer unit 2100 includes a color correction (CC) unit 2160. The half-RGB unit 2155 may output the image data to the color correction unit 2160 and the color correction unit 2160 may receive the image data from the half-RGB unit 2155. The color correction unit 2160 may obtain subsampled data for local tone mapping, such as indicated at 1970 in FIG. 19, which may be used, for example, for applying an unsharp mask.

As shown in FIG. 21, the Bayer-to-Bayer unit 2100 includes a Tone Control (TC) unit 2165. The color correction unit 2160 may output the image data to the Tone Control unit 2165 and the Tone Control unit 2165 may receive the image data from the color correction unit 2160. The Tone Control unit 2165 may obtain subsampled data for local tone mapping, such as indicated at 1970 in FIG. 19, which may be used, for example, for applying an unsharp mask.

As shown in FIG. 21, the Bayer-to-Bayer unit 2100 includes a Gamma (GM) unit 2170. The Tone Control unit 2165 may output the image data to the gamma unit 2170 and the gamma unit 2170 may receive the image data from the Tone Control unit 2165. The Gamma unit 2170 may apply a lookup-table independently per channel for color rendering (gamma curve application). Using a lookup-table, which may be an array, may reduce resource utilization, such as processor utilization, using an array indexing operation rather than more complex computation. The gamma unit 2170 may output the image data as indicated at 2175. The gamma unit 2170 may obtain subsampled data for local tone mapping, such as indicated at 1970 in FIG. 19, which may be used, for example, for applying an unsharp mask.

As shown in FIG. 21, the Bayer-to-Bayer unit 2100 includes an RGB binning (RGB BIN) unit 2180. The second lens shading unit 2150 may output the image data to the RGB binning unit 2180 and the RGB binning unit 2180 may receive the image data from the second lens shading unit 2150. The image data received at the RGB binning unit 2180 may be unsigned 14-bit Bayer format image data. The RGB binning unit 2180 may include a configurable binning factor, such as a binning factor configurable in the range from four to sixteen, such as four, eight, or sixteen. The RGB Binning unit 2180 may operate in parallel with the half-RGB unit 2155.

The RGB binning unit 2180 may output the unsigned 14-bit RGB format image data to an external memory 2190, which may be similar to the memory 652 shown in FIG. 6, and which may include compressing the unsigned 14-bit RGB format image data. The output of the RGB binning unit 2180 may be a binned image, which may include low-resolution image data or low-resolution image map data. The output of the RGB binning unit 2180 may be used to extract statistics for combing images, such as combining hemispherical images. The output of the RGB binning unit 2180 may be used to estimate flare on one or more lenses, such as hemispherical lenses. The RGB binning unit 2180 may obtain G channel values for the binned image by averaging Gr channel values and Gb channel values. The RGB binning unit 2180 may obtain one or more portions of or values for the binned image by averaging pixel values in spatial areas identified based on the binning factor.

Although not shown separately in FIG. 21, an image processing pipeline including the Bayer-to-Bayer unit 2100, such as for spherical image processing, may include an RGB-to-YUV unit, such as the RGB-to-YUV unit 800 shown in FIG. 8. The RGB-to-YUV unit may obtain tone mapping statistics, such as histogram data and thumbnail data, using a weight map, which may weight respective regions of interest prior to statistics aggregation. The weights may be obtained based on a radial model, a two-dimensional (2D) low resolution map, or a combination thereof, which may include using a multiplicative or an additive model. The radial model may be configurable using a lookup table, which may include 1024 values, and a configurable center. One or more Pixels outside the radial model may have a respective weight of 0 or 1. The two-dimensional low-resolution map may be a 64×64 map. One or more Pixels outside the two-dimensional low-resolution map may have a respective weight of 0 or 1. Although not shown separately in FIG. 21, an image processing pipeline including the Bayer-to-Bayer unit 2100, such as for spherical image processing, may include a statistics unit, such as a statistics unit for auto-exposure, auto-white balance estimation, or the like. The statistics unit may obtain respective statistics using a weight map, which may weight respective regions of interest prior to statistics aggregation. The weights may be obtained based on a radial model, a two-dimensional (2D) low resolution map, or a combination thereof, which may include using a multiplicative or an additive model. The radial model may be configurable using a lookup table, which may include 1024 values, and a configurable center. One or more pixels outside the radial model may have a respective weight of 0 or 1. The two-dimensional low-resolution map may be a 64×64 map. One or more Pixels outside the two-dimensional low-resolution map may have a respective weight of 0 or 1. The weighting may be independent of image capture apparatus orientation. For example, lens distortion compensation may weight samples near a stitch line relatively highly.

FIG. 22 is a diagram of an example of a radial map for image processing parameters in accordance with implementations of this disclosure. The radial map for image processing parameters may be implemented in an image signal processor, such as in a sensor readout unit, such as the sensor readout unit 620, 622, 720, 722, 1020, 1220, 1420, 1720, 1920 shown in FIG. 6, 7, 10, 12, 13, 17, or 19.

A current frame 2200 received by the sensor readout unit, or a portion thereof, may be divided into an interior ($W_{in}$) portion 2210 and an exterior ($W_{out}$) portion 2220, which may be determined based on a defined, configurable, center (x, y) and a defined, configurable radius (r) from the center describing a circular area 2230. Weighting values from a defined lookup table may be applied within the interior area ($W_{in}$) 2210, and a defined weight may be applied to the exterior area ($W_{out}$) 2220.

Where certain elements of these implementations may be partially or fully implemented using known components, only those portions of such known components that are necessary for an understanding of this disclosure have been described. Detailed descriptions of other portions of such known components have been omitted so as not to obscure the disclosure. The drawings are for the purpose of illustration and description only and are not intended as a definition of the limits of the disclosure.

As used in the specification and in the claims, the singular form of "a," "an," and "the" include plural referents unless the context clearly dictates otherwise.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An image processor for image analysis and processing comprising:
   a sensor readout component configured to receive Bayer format image data corresponding to an input image;
   a Bayer-to-Bayer component;
   a Bayer-to-RGB component configured to obtain RGB format image data based on the Bayer format image data;
   an RGB-to-YUV component configured to obtain YUV format image data based on the RGB format image data, wherein to obtain the YUV format image data, the RGB-to-YUV component is configured to:
      divide the image into a plurality of non-overlapping tiles having a defined width and a defined height;
      obtain a histogram for a respective tile from the plurality of non-overlapping tiles, wherein the RGB-to-YUV component is configured to obtain the histogram using a weight map that weights respective regions of interest in the image prior to statistics aggregation;
      obtain a gain table for the respective tile; and
      obtain a gain value for a portion of the respective tile by bilinear interpolation relative to the center of the respective tile; and
   a noise reduction component configured to obtain noise reduced image data based on the YUV format image data;
   wherein the image processor is configured to output processed image data based on the noise reduced image data.

2. The image processor of claim 1, wherein to obtain the YUV format image data the RGB-to-YUV component is configured to:
   obtain the weight map using a radial model, a two-dimensional low-resolution map, or a combination of the radial model and the two-dimensional low-resolution map.

3. The image processor of claim 1, wherein to obtain the YUV format image data the RGB-to-YUV component is configured to obtain the weight map using a combination of a radial model and a two-dimensional low-resolution map, wherein the combination is an additive combination or a multiplicative combination.

4. The image processor of claim 1, wherein to obtain the YUV format image data the RGB-to-YUV component is configured to obtain the weight map using a radial model that is configurable using a lookup table or a combination of the radial model and a two-dimensional low-resolution map.

5. The image processor of claim 4, wherein a pixel outside the model is assigned a weight of one.

6. The image processor of claim 1, wherein:
   the Bayer-to-Bayer component includes a statistics unit configured to obtain weighted statistics for spherical image processing.

7. The image processor of claim 6, wherein the statistics unit is configured to obtain the weighted statistics for auto-exposure processing.

8. The image processor of claim 6, wherein the statistics unit is configured to obtain the weighted statistics for auto-white balance estimation.

9. The image processor of claim 1, wherein the RGB-to-YUV component includes a multiple tone control unit that implements a double-buffer for multiple tone control parameters.

10. An image processor for image analysis and processing comprising:
    a sensor readout component configured to receive Bayer format image data corresponding to an input image;
    a Bayer-to-Bayer component that includes a statistics unit configured to obtain weighted statistics for spherical image processing;
    a Bayer-to-RGB component configured to obtain RGB format image data based on the Bayer format image data;
    an RGB-to-YUV component configured to obtain YUV format image data based on the RGB format image data, wherein to obtain the YUV format image data, the RGB-to-YUV component is configured to:
       divide the image into a plurality of non-overlapping tiles having a defined width and a defined height;
       obtain a histogram for a respective tile from the plurality of non-overlapping tiles, wherein the RGB-to-YUV component is configured to obtain the histogram using a weight map that weights respective regions of interest in the image prior to statistics aggregation;
       obtain a gain table for the respective tile; and
       obtain a gain value for a portion of the respective tile by bilinear interpolation relative to the center of the respective tile; and
    a noise reduction component configured to obtain noise reduced image data based on the YUV format image data;
    wherein the image processor is configured to output processed spherical image data based on the noise reduced image data.

11. The image processor of claim 10, wherein to obtain the YUV format image data the RGB-to-YUV component is configured to:
    obtain the weight map using a radial model, a two-dimensional low-resolution map, or a combination of the radial model and the two-dimensional low-resolution map.

12. The image processor of claim 10, wherein to obtain the YUV format image data the RGB-to-YUV component is configured to obtain the weight map using a combination of a radial model and a two-dimensional low-resolution map, wherein the combination is an additive combination or a multiplicative combination.

13. The image processor of claim 10, wherein to obtain the YUV format image data the RGB-to-YUV component is configured to obtain the weight map using a radial model that is configurable using a lookup table or a combination of the radial model and a two-dimensional low-resolution map.

14. The image processor of claim 10, wherein the statistics unit is configured to obtain the weighted statistics for auto-white balance estimation.

15. The image processor of claim 10, wherein the statistics unit is configured to obtain the weighted statistics for auto-exposure processing.

16. An image processor for image analysis and processing comprising:
    a sensor readout component configured to receive Bayer format image data corresponding to an input image;

a Bayer-to-RGB component configured to obtain RGB format image data based on the Bayer format image data;

an RGB-to-YUV component configured to obtain YUV format image data based on the RGB format image data, wherein the RGB-to-YUV component includes a multiple tone control unit that implements a double-buffer for multiple tone control parameters, wherein to obtain the YUV format image data, the RGB-to-YUV component is configured to:

divide the image into a plurality of non-overlapping tiles having a defined width and a defined height;

obtain a histogram for a respective tile from the plurality of non-overlapping tiles, wherein the RGB-to-YUV component is configured to obtain the histogram using a weight map that weights respective regions of interest in the image prior to statistics aggregation;

obtain a gain table for the respective tile; and obtain a gain value for a portion of the respective tile by bilinear interpolation relative to the center of the respective tile; and a noise reduction component configured to obtain noise reduced image data based on the YUV format image data;

wherein the image processor is configured to output processed image data based on the noise reduced image data.

\* \* \* \* \*